United States Patent
Chun et al.

(10) Patent No.: US 11,540,246 B2
(45) Date of Patent: Dec. 27, 2022

(54) METHOD AND DEVICE FOR SELECTING PUBLIC LAND MOBILE NETWORK (PLMN) IN WIRELESS COMMUNICATION SYSTEM

(71) Applicant: LG ELECTRONICS INC., Seoul (KR)

(72) Inventors: Sungduck Chun, Seoul (KR); Laeyoung Kim, Seoul (KR); Hyunsook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/272,630

(22) PCT Filed: Sep. 2, 2019

(86) PCT No.: PCT/KR2019/011272
§ 371 (c)(1),
(2) Date: Mar. 1, 2021

(87) PCT Pub. No.: WO2020/046093
PCT Pub. Date: Mar. 5, 2020

(65) Prior Publication Data
US 2021/0352608 A1      Nov. 11, 2021

Related U.S. Application Data

(60) Provisional application No. 62/725,279, filed on Aug. 31, 2018.

(30) Foreign Application Priority Data

Jan. 2, 2019   (KR) .................. 10-2019-0000180

(51) Int. Cl.
*H04W 60/04*    (2009.01)
*H04W 48/18*    (2009.01)
(Continued)

(52) U.S. Cl.
CPC .......... *H04W 60/04* (2013.01); *H04M 1/724* (2021.01); *H04W 48/18* (2013.01); *G06F 3/04842* (2013.01); *H04W 84/042* (2013.01)

(58) Field of Classification Search
CPC ..... H04W 60/04; H04W 48/18; H04W 48/16; H04W 84/042; H04W 24/04;
(Continued)

(56) References Cited

U.S. PATENT DOCUMENTS

| 2010/0011106 A1* | 1/2010 | Ohashi ................... H04L 69/28 |
| | | 709/226 |
| 2019/0053139 A1* | 2/2019 | Basu Mallick ....... H04W 48/16 |

FOREIGN PATENT DOCUMENTS

| JP | 2014-060685 | | 4/2014 |
| JP | 2014060685 A | * | 4/2014 |
| JP | 2016-028535 | | 2/2016 |

OTHER PUBLICATIONS

3GPP TS 22.011 V16.2.0, Service accessibility (Release 16), (Jun. 2018), pp. 1-33 (Year: 2018).*

3GPP TSG-SA WG1 Meeting #83, S1-182637, Aug. 20-24, 2018, pp. 1-4 (Year: 2018).*

(Continued)

*Primary Examiner* — Farid Seyedvosoghi
(74) *Attorney, Agent, or Firm* — Lee Hong Degerman Kang Waimey

(57) ABSTRACT

According to an embodiment of the present invention, a method for selecting a public land mobile network (PLMN) by a user equipment (UE) in a wireless communication system comprises: in a manual network selection mode, displaying one or more first PLMN items corresponding to one or more first PLMNs on a display of the UE; when an input for a second PLMN item among the one or more PLMN items is received, controlling a communication module of the UE to attempt to register the UE on a second
(Continued)

PLMN corresponding to the second PLMN item; when the registration on the second PLMN fails, providing access to restricted local operator service (RLOS), and displaying, on the display, one or more third PLMN items corresponding to one or more third PLMNs included in an RLOS PLMN list configured in a universal subscriber identity module (USIM) of the UE; and when an input for a fourth PLMN item among the one or more third PLMN items is received, controlling the communication module to initiate registration for access to the RLOS of a fourth PLMN corresponding to the fourth PLMN item, whereby it is possible to use not only excellent but also highly secure RLOS.

20 Claims, 21 Drawing Sheets

(51) Int. Cl.
　　*H04M 1/724*　　(2021.01)
　　*G06F 3/04842*　　(2022.01)
　　*H04W 84/04*　　(2009.01)

(58) Field of Classification Search
　　CPC .............. H04M 1/724; H04M 1/72469; G06F 3/04842; G06F 3/0488; Y02D 30/70
　　See application file for complete search history.

(56) References Cited

OTHER PUBLICATIONS

3GPP TS 22.101 V16.0.0, Service aspects; Service principles (Release 16), (Jun. 2018), pp. 1-100 (Year: 2018).*
PCT International Application No. PCT/KR2019/011272, International Search Report dated Dec. 30, 2019, 4 pages.
3rd Generation Partnership Project; Technical Specification Group Services and System Aspects; Service accessibility (Release 16), 3GPP TS 22.011 V16.2.0, Jun. 2018, 33 pages.
Intel, "Clarification on the PLMN selection mode for RLOS", S1-182637, 3GPP TSG-SA WG1 Meeting #83, Aug. 2018, 4 pages.
3rd Generation Partnership Project; Technical Specification Group Services and System Aspects; Service aspects; Service principles (Release 16), 3GPP TS 22.101 V16.0.0, Jun. 2018, 100 pages.

* cited by examiner

[FIG. 1]
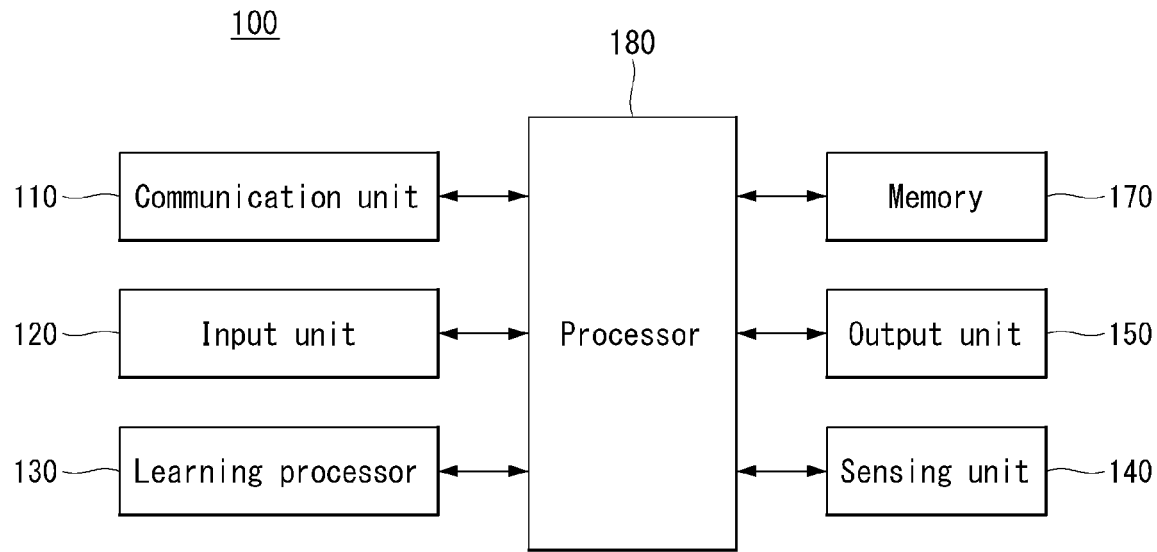
[FIG. 2]
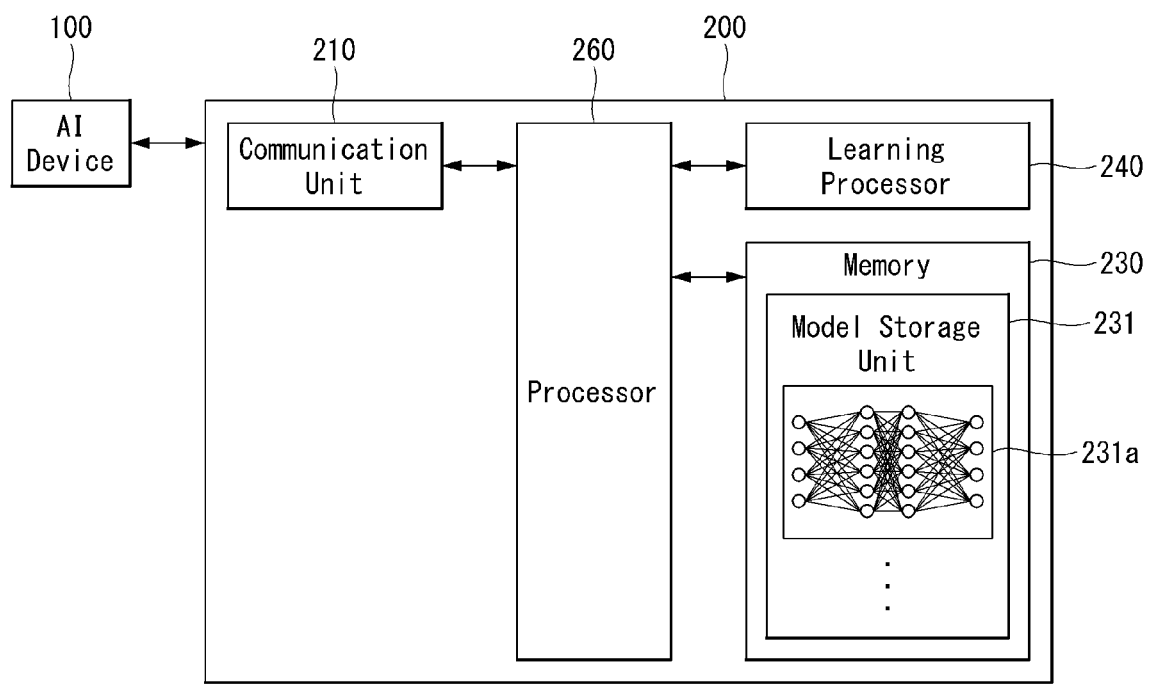

[FIG. 3]
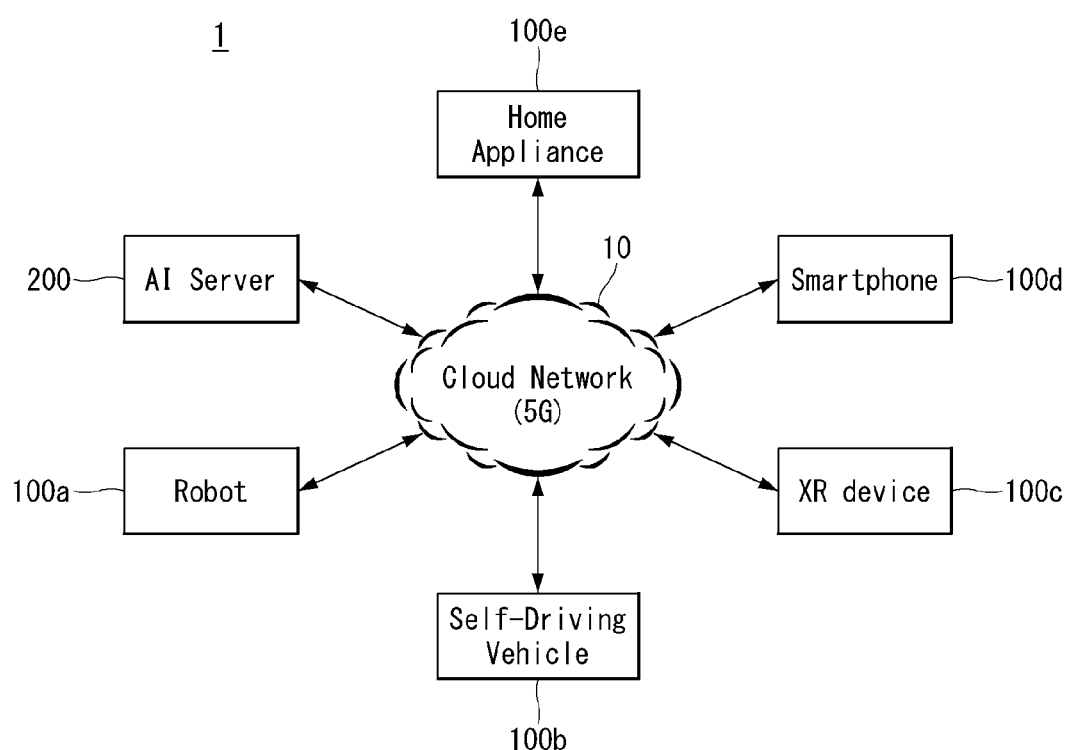

[FIG. 4]
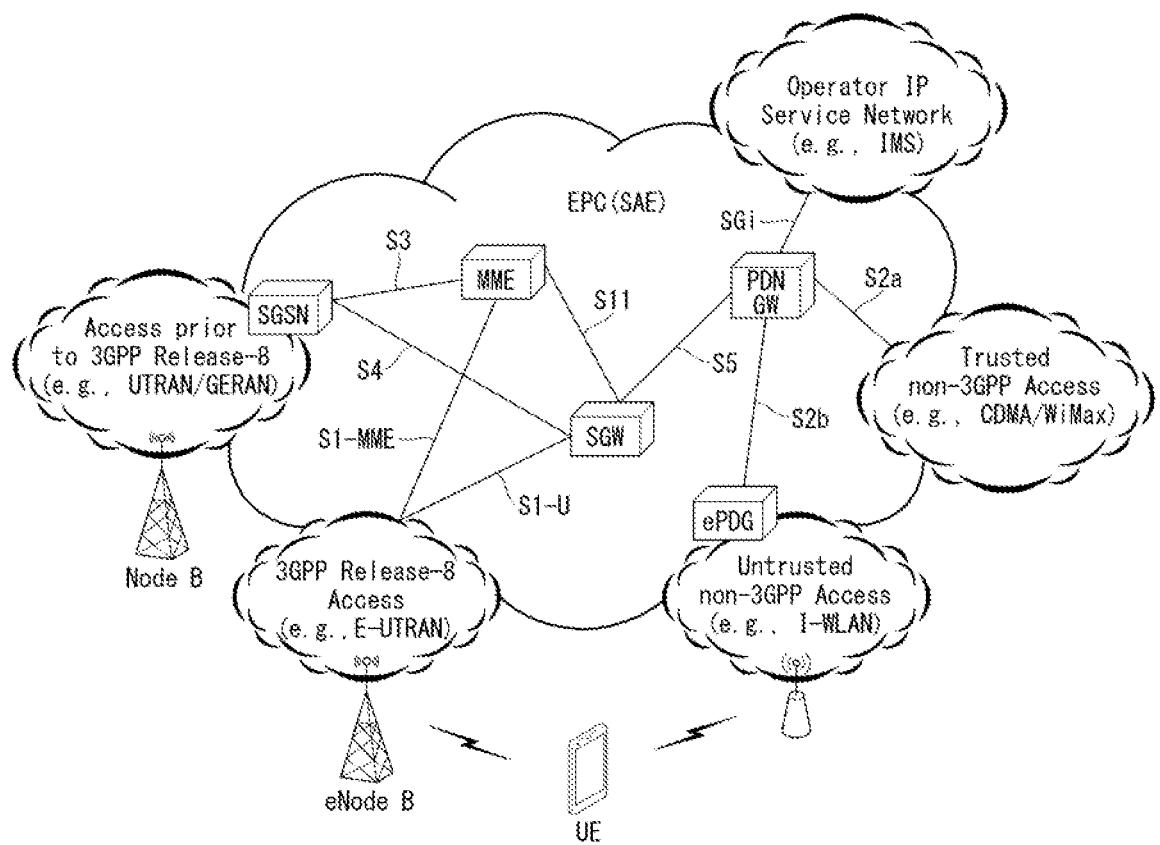

[FIG. 5]
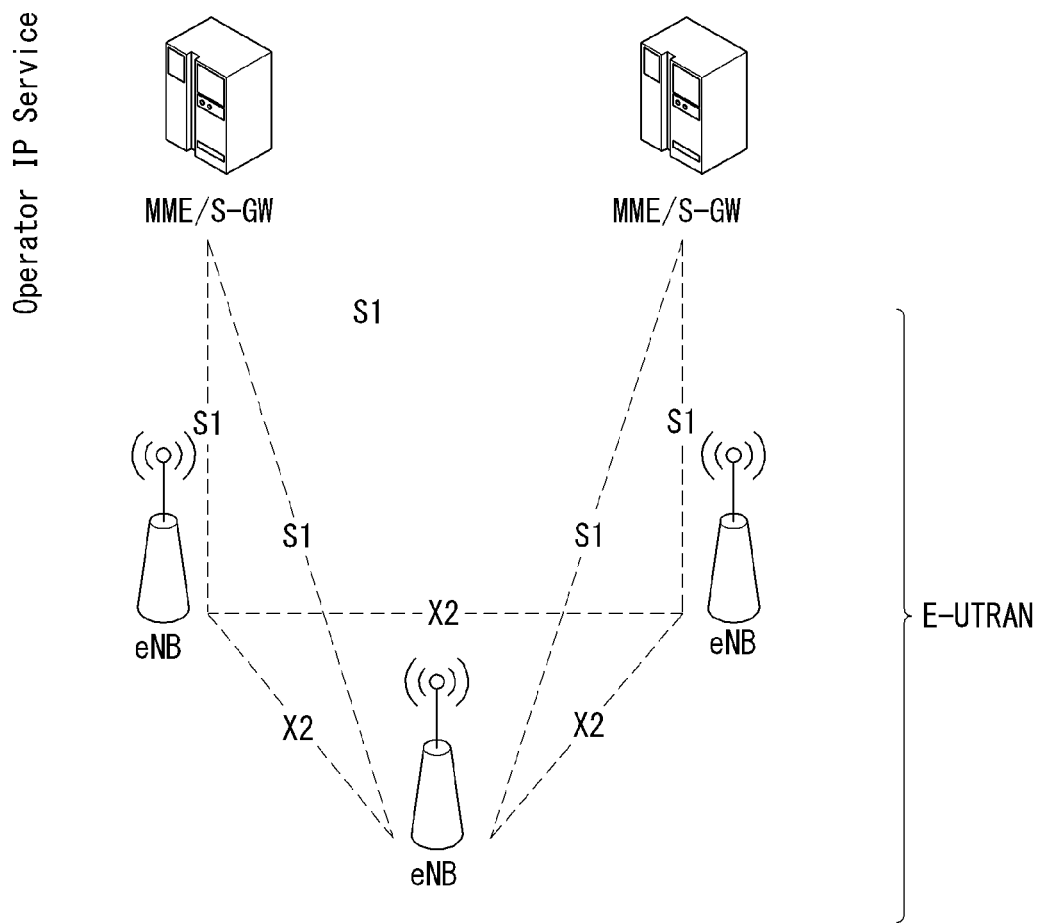

[FIG. 6]
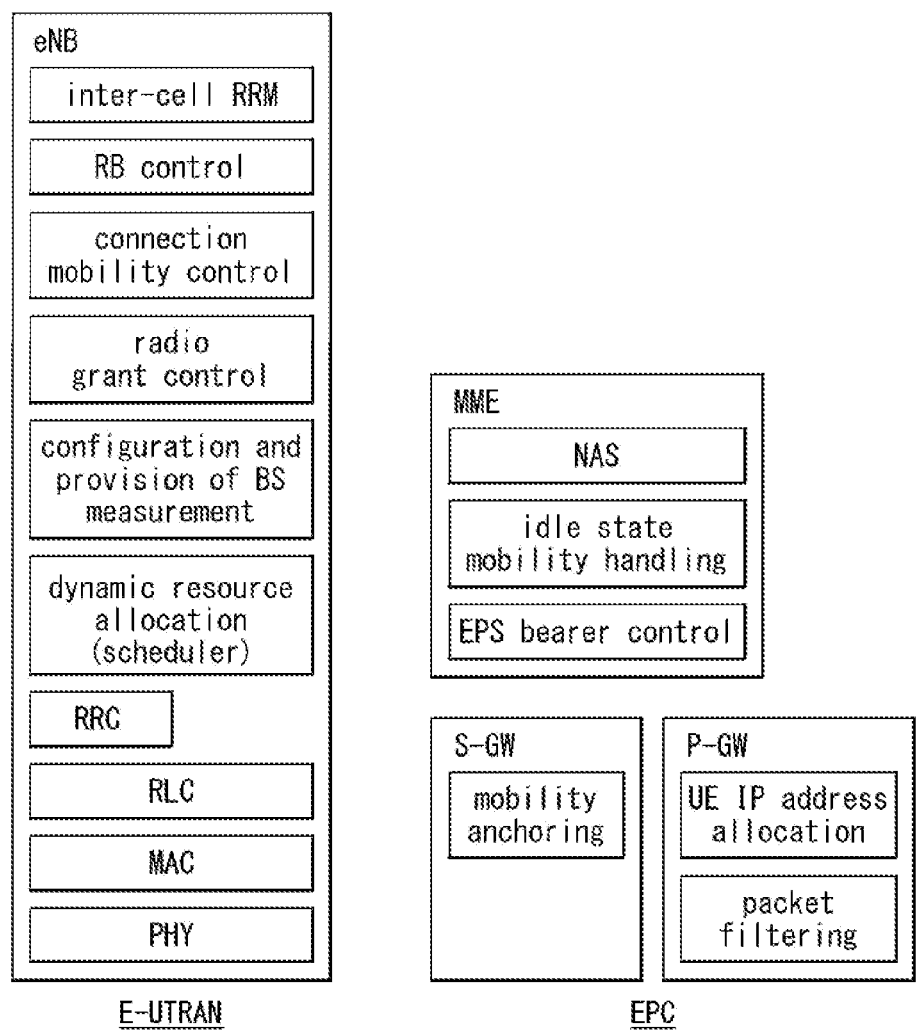

[FIG. 7]
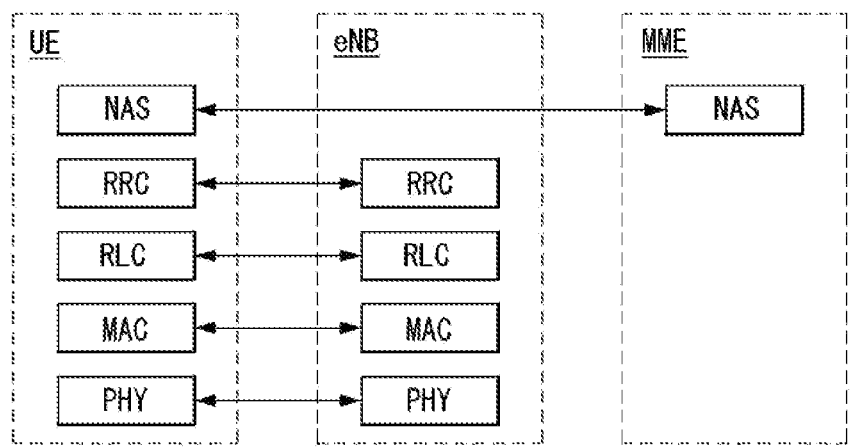
[FIG. 8]
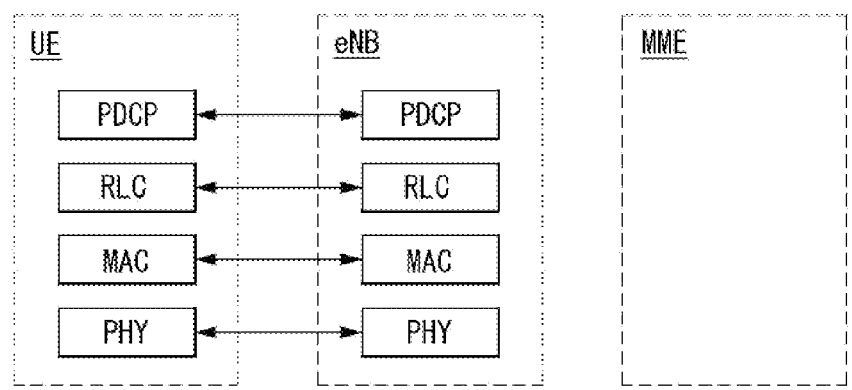

[FIG. 9]
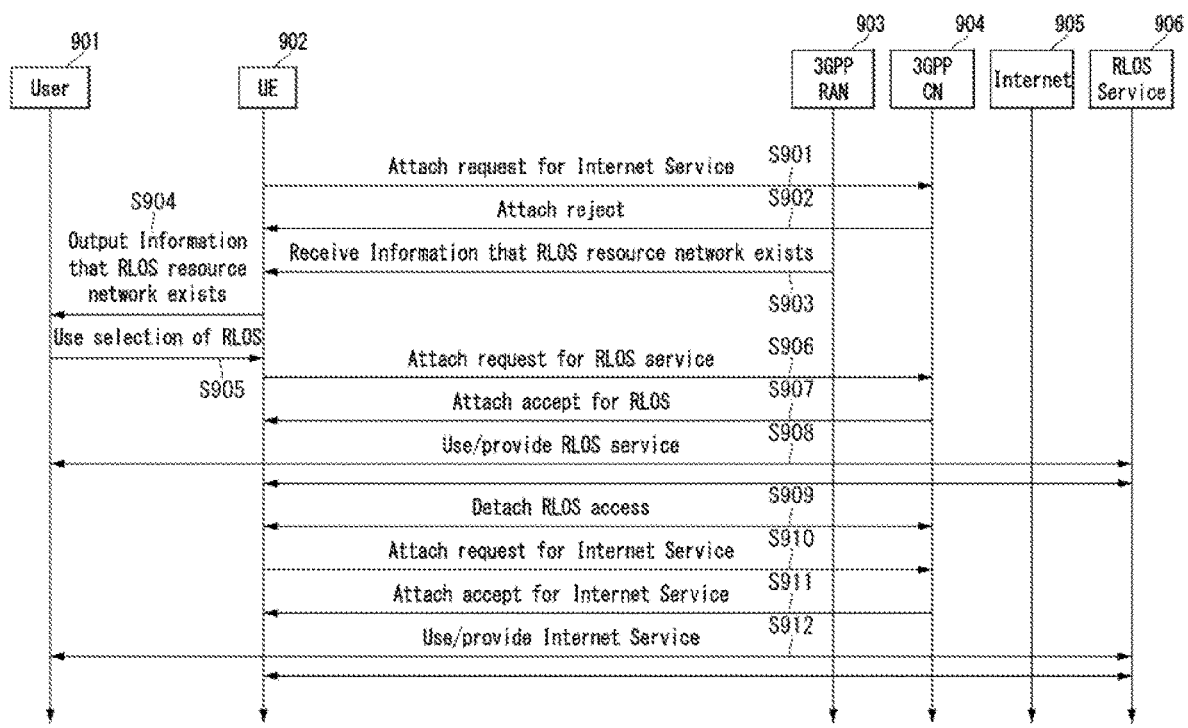

【FIG. 10】
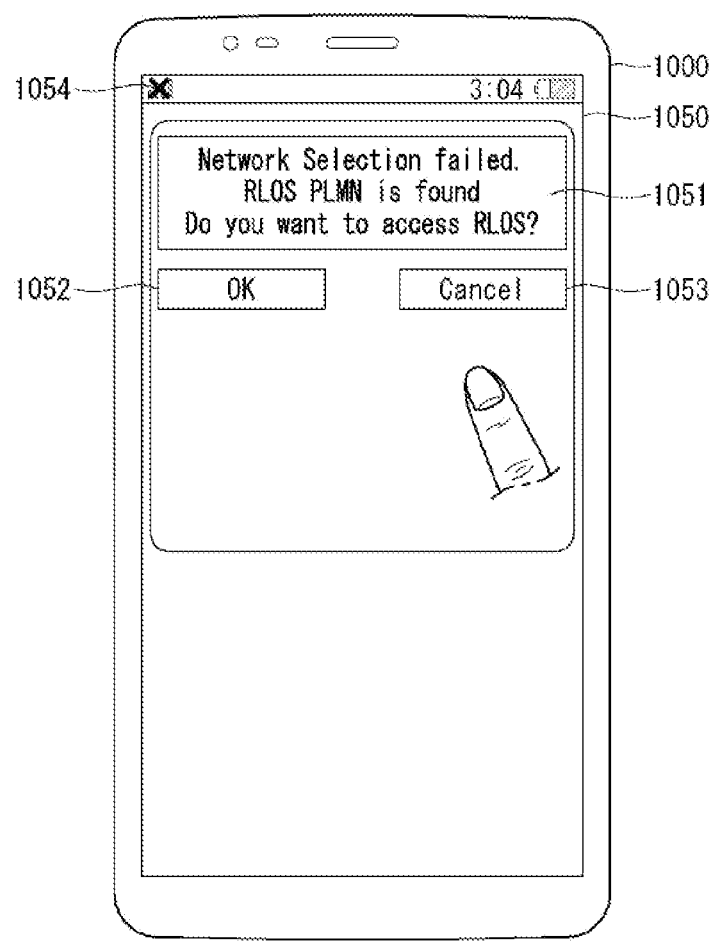

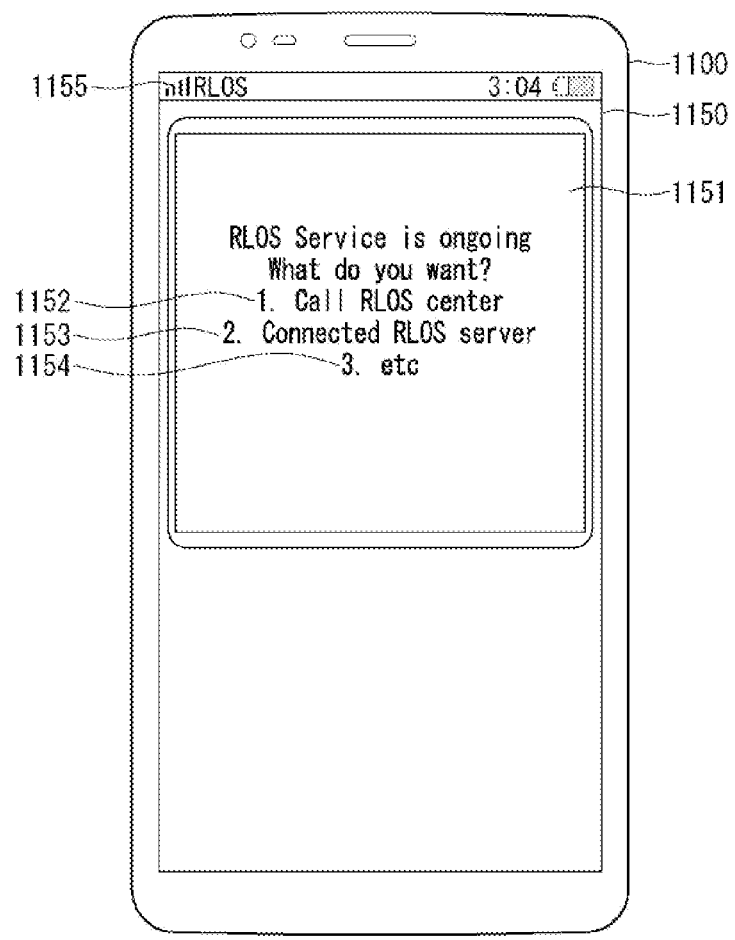
[FIG. 11]

[FIG. 12]
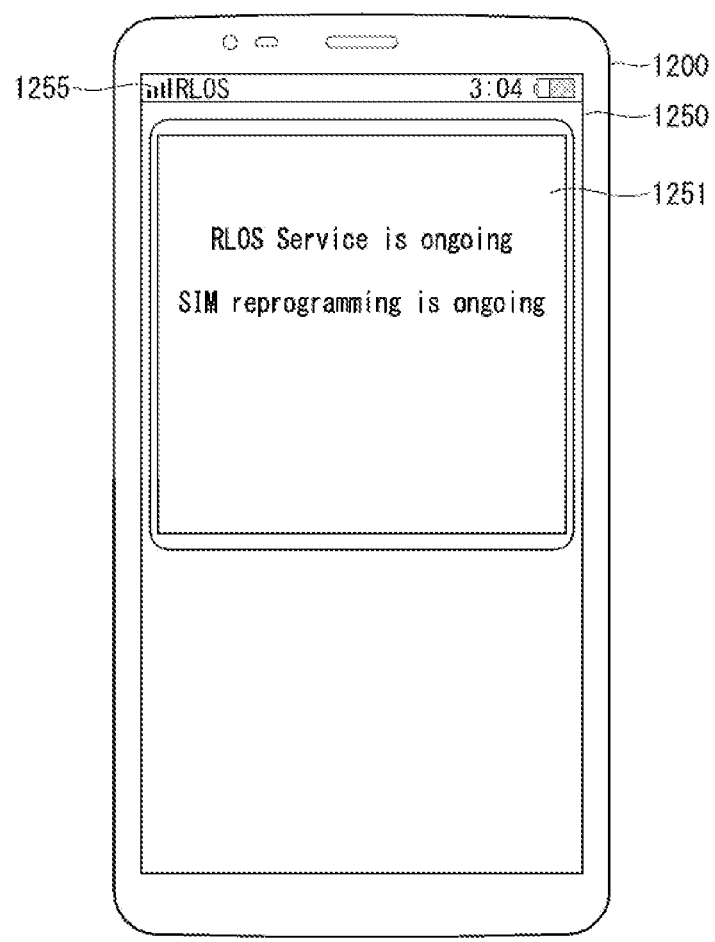

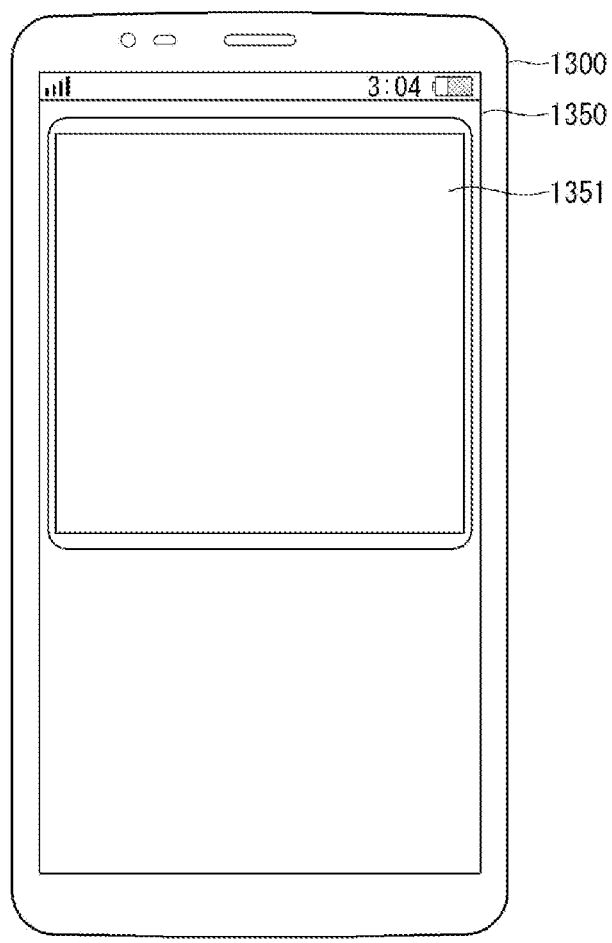
[FIG. 13]

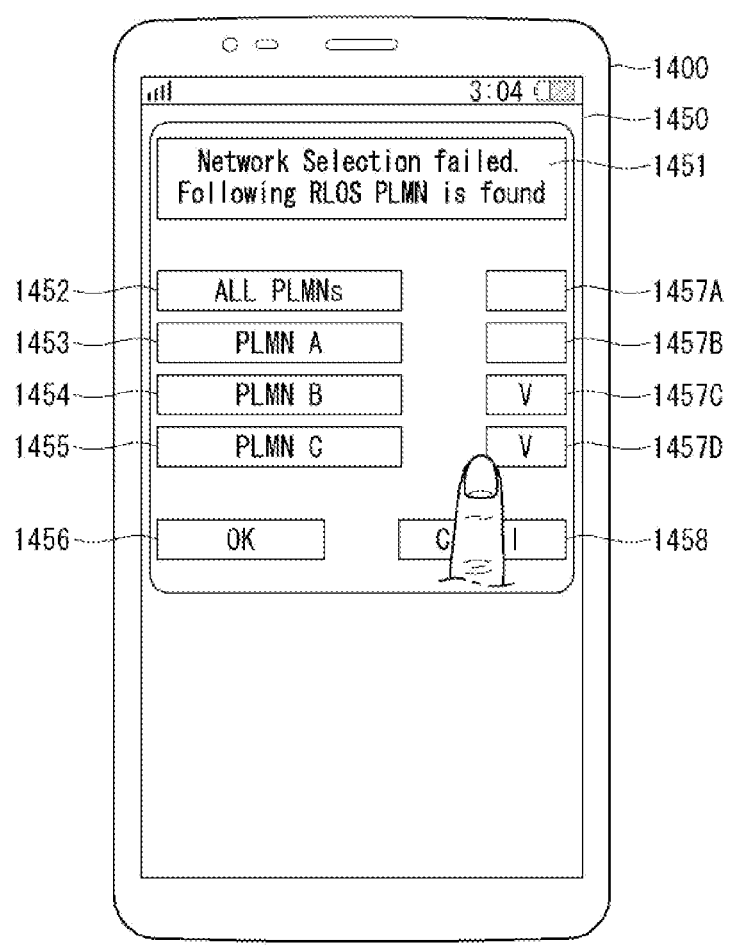
[FIG. 14]

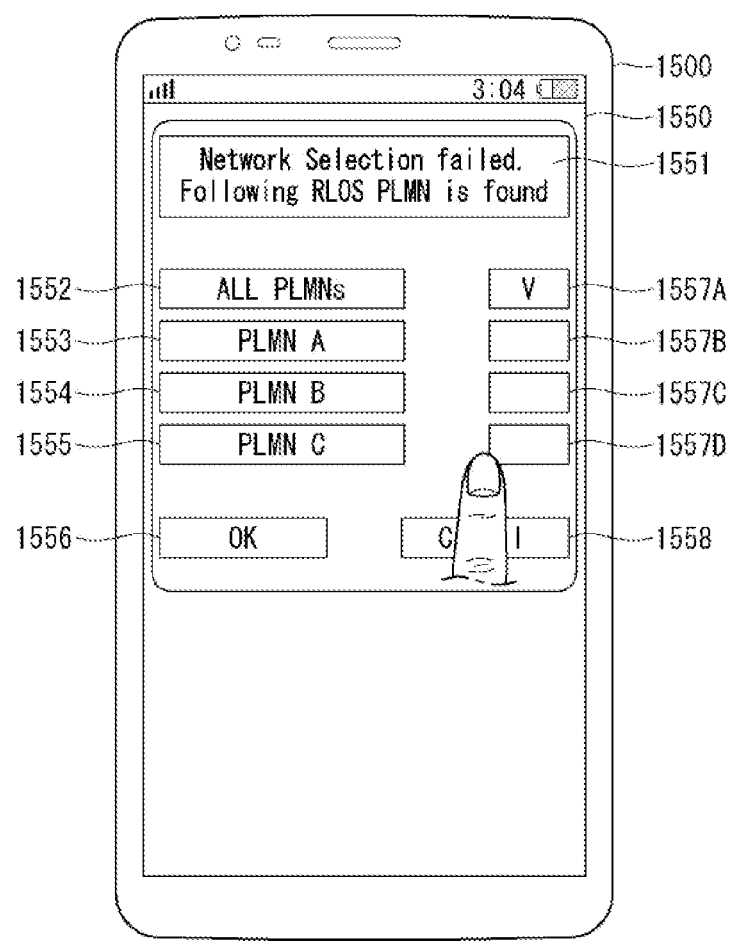
[FIG. 15]

[FIG. 16]
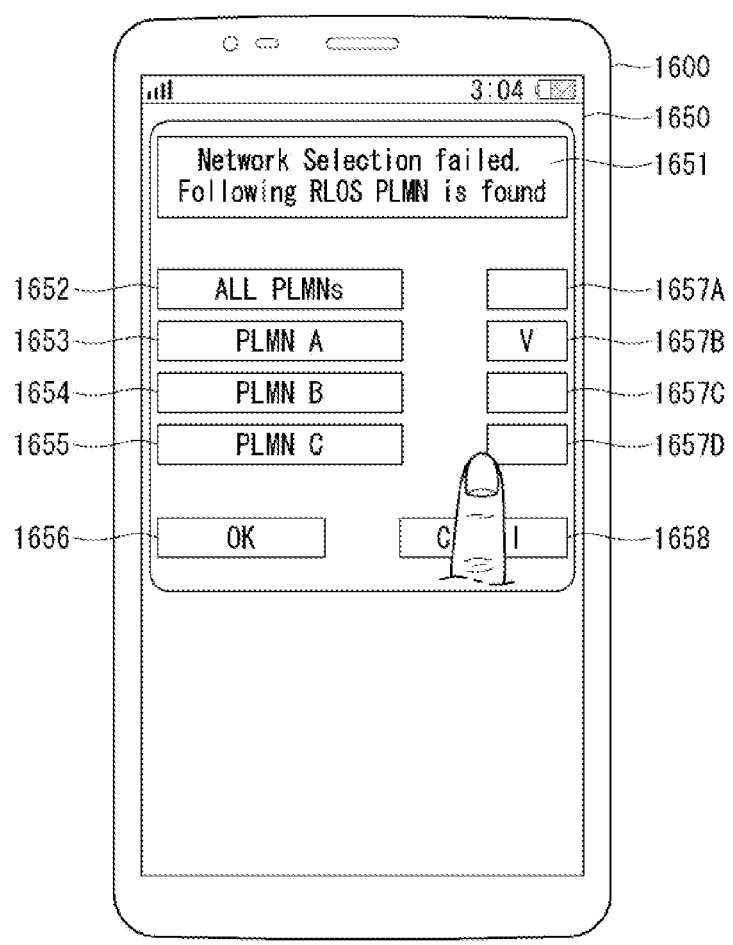

[FIG. 17]
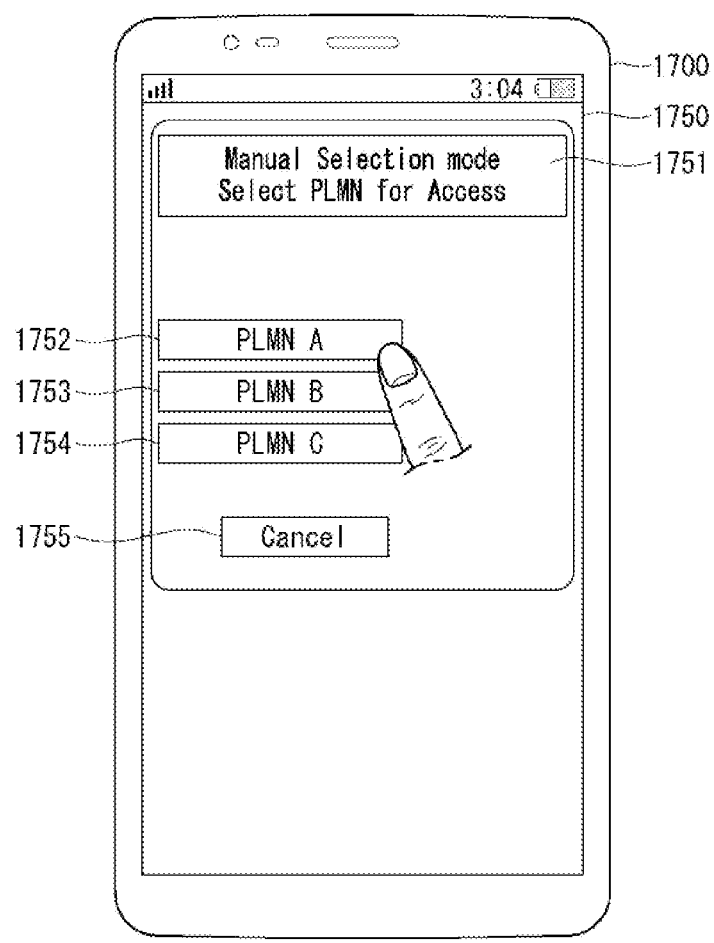

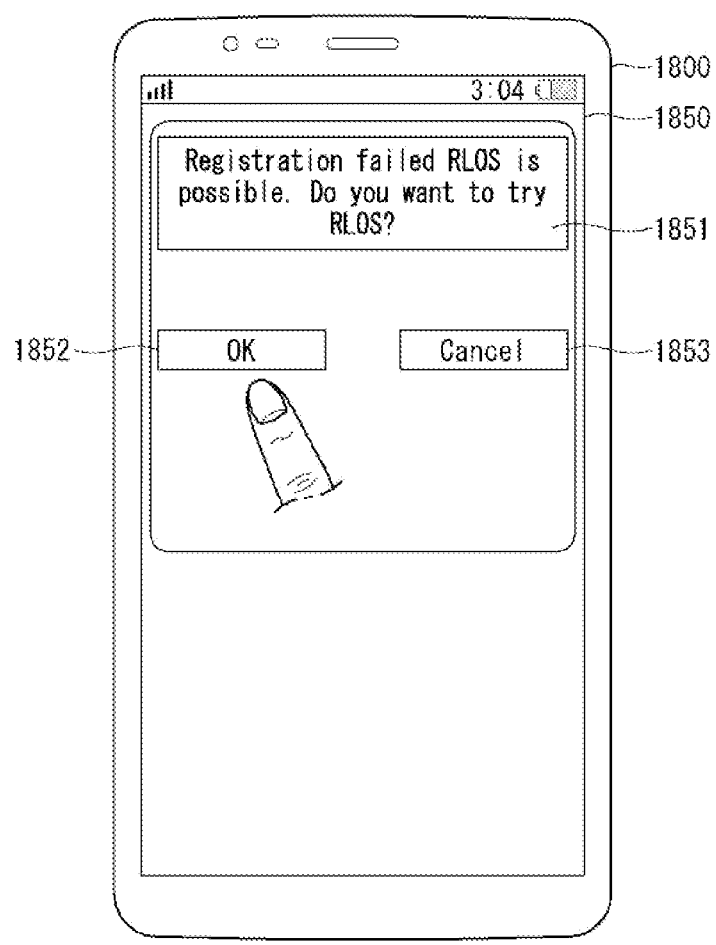
[FIG. 18]

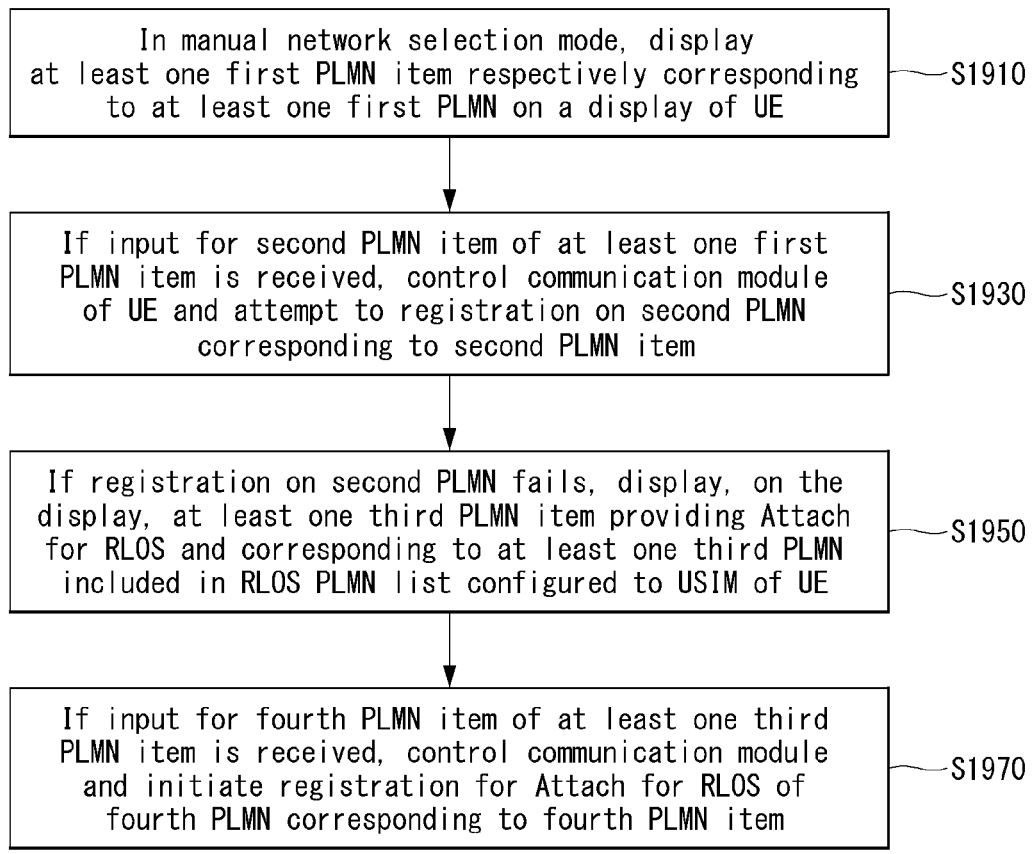
[FIG. 19]

[FIG. 20]
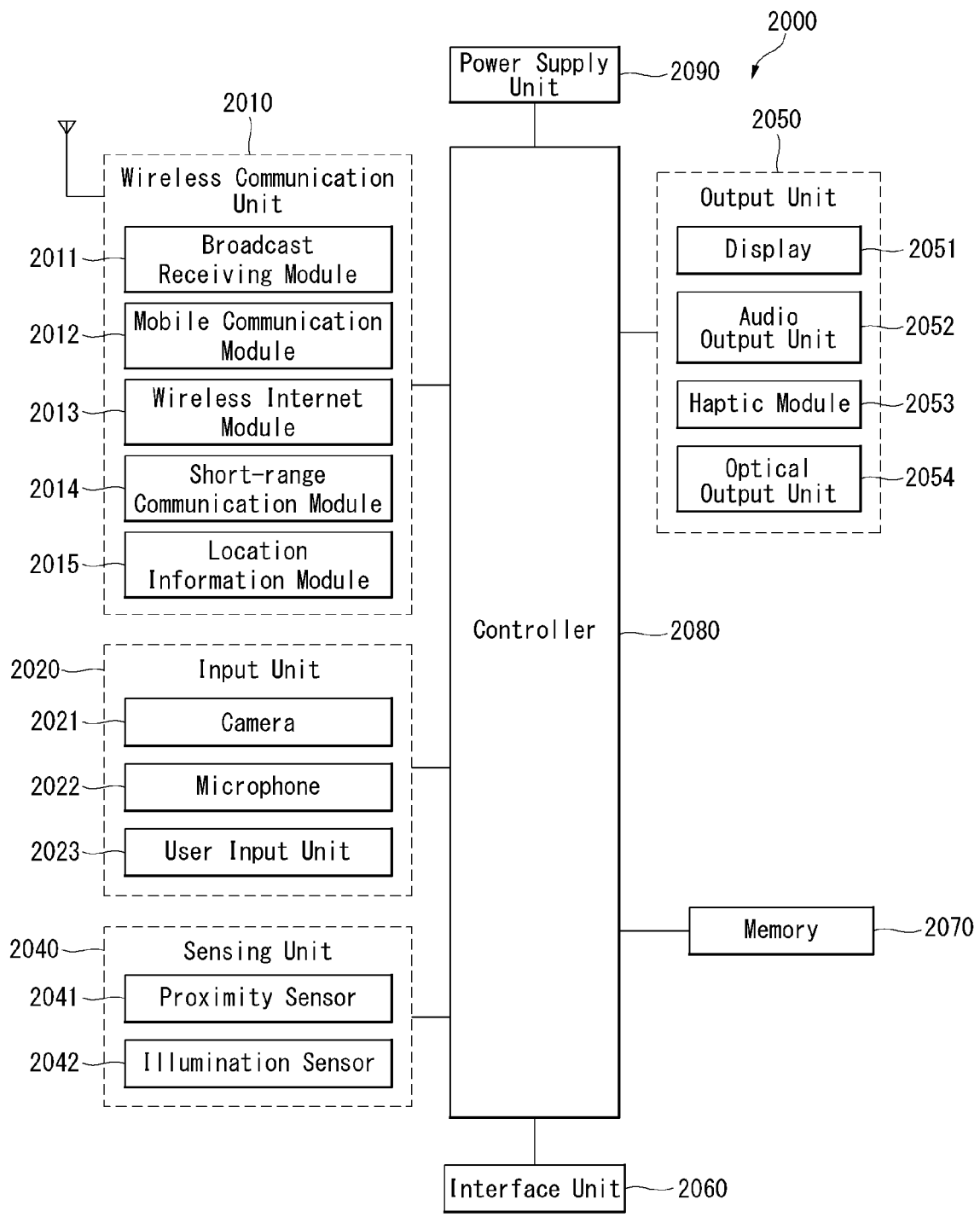

【FIG. 21】
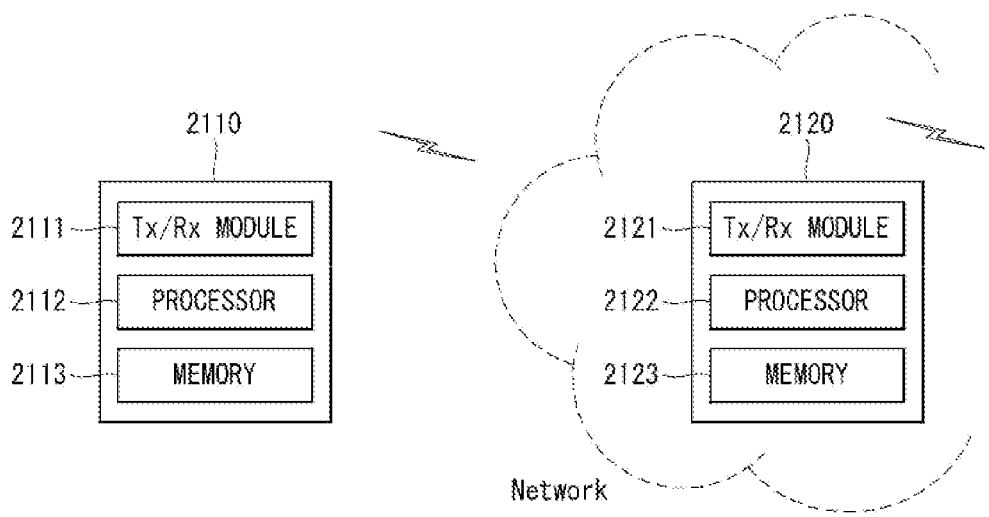
【FIG. 22】
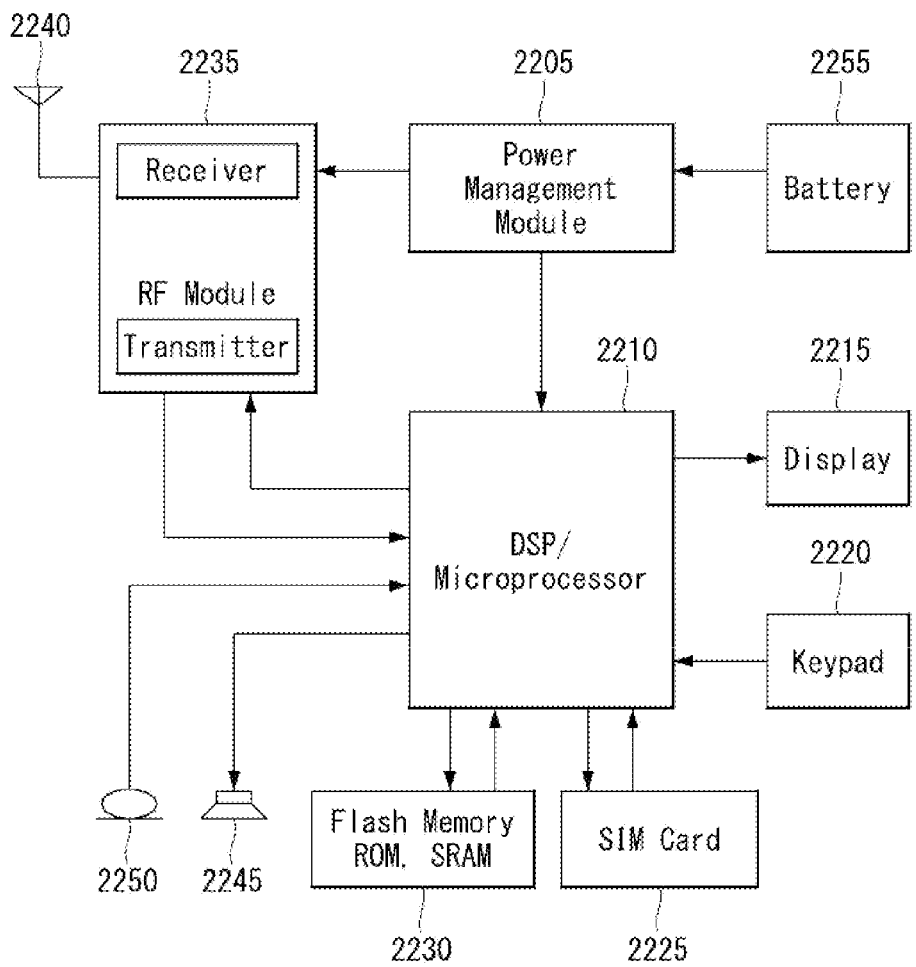

[FIG. 23]
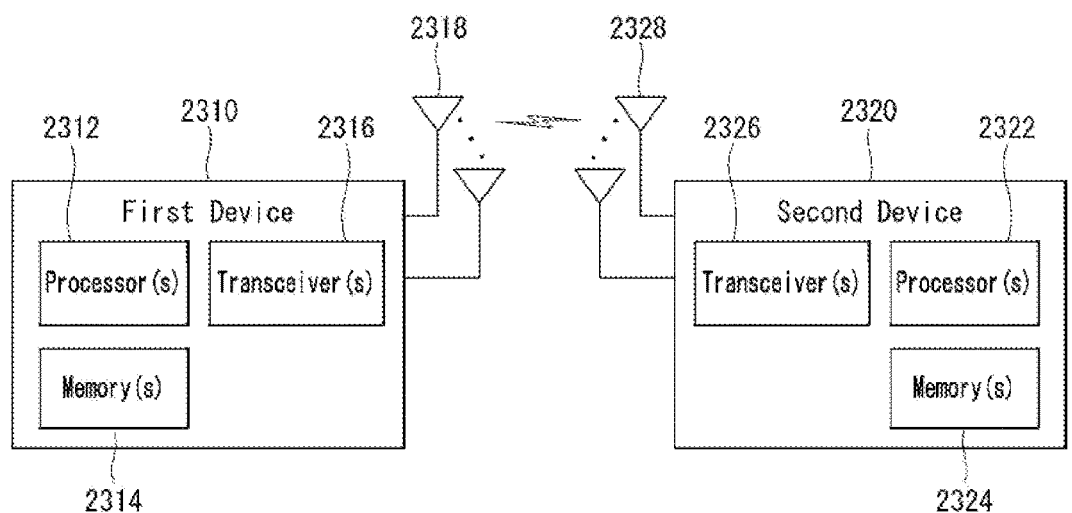
[FIG. 24]
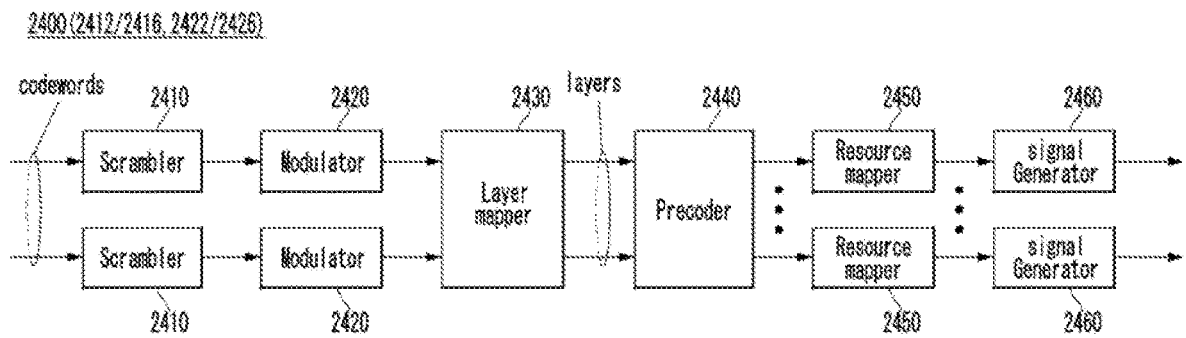

[FIG. 25]
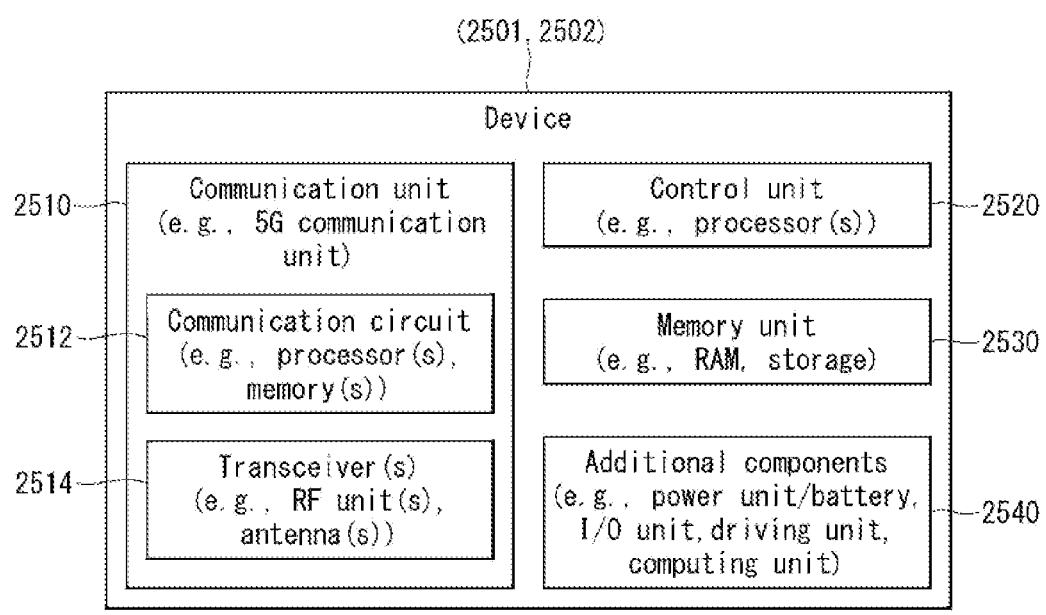

METHOD AND DEVICE FOR SELECTING PUBLIC LAND MOBILE NETWORK (PLMN) IN WIRELESS COMMUNICATION SYSTEM

CROSS-REFERENCE TO RELATED APPLICATIONS

This application is the National Stage filing under 35 U.S.C. 371 of International Application No. PCT/KR2019/011272, filed on Sep. 2, 2019, which claims the benefit of earlier filing date and right of priority to Korean Application No. 10-2019-0000180, filed on Jan. 2, 2019 and also claims the benefit of U.S. Provisional Application No. 62/725,279, filed on Aug. 31, 2018, the contents of which are all hereby incorporated by reference herein their entirety.

TECHNICAL FIELD

The present disclosure relates to a wireless communication system, and more particularly to a method and device for selecting some of a plurality of public land mobile networks (PLMNs) providing a restricted local operator service.

BACKGROUND ART

In a wireless communication system, mobile communication systems have been developed to provide a voice service while ensuring the activity of a user. However, the area of the mobile communication system has extended to a data service in addition to a voice. Due to the current explosive increase in traffic, there is a shortage of resources, and thus users demand a higher speed service. Accordingly, there is a need for a more advanced mobile communication system.

Requirements for a next-generation mobile communication system need to able to support the accommodation of explosive data traffic, a dramatic increase in the data rate per user terminal, the accommodation of a significant increase in the number of connected devices, very low end-to-end latency, and high-energy efficiency. To this end, various technologies, such as dual connectivity, massive multiple input multiple output (MIMO), in-band full duplex, non-orthogonal multiple access (NOMA), super wideband support, and device networking, are researched.

DISCLOSURE

Technical Problem

The present disclosure provides a device for efficiently selecting a public land mobile network (PLMN) in a wireless communication system.

The technical objects to be achieved by the present disclosure are not limited to those that have been described hereinabove merely by way of example, and other technical objects that are not mentioned can be clearly understood by those skilled in the art, to which the present disclosure pertains, from the following descriptions.

Technical Solution

In one aspect, there is provided a method for selecting, by a user equipment (UE), a public land mobile network (PLMN) in a wireless communication system, the method comprising: in a manual network selection mode, displaying at least one first PLMN item respectively corresponding to at least one first PLMN on a display of the UE; if an input for a second PLMN item of the at least one first PLMN item is received, controlling a communication module of the UE to attempt to a registration on a second PLMN corresponding to the second PLMN item; if the registration on the second PLMN fails, displaying, on the display, at least one third PLMN item that provides attach for a restricted local operator service (RLOS) and respectively corresponds to at least one third PLMN included in an RLOS PLMN list configured to a universal subscriber identity module (USIM) of the UE; and if an input for a fourth PLMN item of the at least one third PLMN item is received, controlling the communication module to initiate a registration for Attach for a RLOS of a fourth PLMN corresponding to the fourth PLMN item.

Displaying the at least one third PLMN item may comprise displaying, on the display, the at least one third PLMN item and at least one switch for selecting each of the at least one third PLMN item.

Initiating the registration for the Attach for the RLOS of the fourth PLMN may comprise, if an input for a switch for selecting the fourth PLMN item among the at least one switch is received, initiating the registration for the Attach for the RLOS of the fourth PLMN.

The at least one switch may include all selection switches configured to select all the at least one third PLMN item, and at least one individual selection switch configured to select each of the at least one third PLMN item.

The method may further comprise displaying, on the display, a first icon indicating that a registration on the first PLMN has failed.

The method may further comprise displaying, on one area of the display, a second icon indicating that the Attach for the RLOS of the fourth PLMN has been accepted.

Displaying, on the display, the at least one third PLMN item may comprise if the registration on the second PLMN fails, displaying, on the display, a first tab for receiving whether there is Attach for an RLOS, and if an input for the first tab is received, displaying the at least one third PLMN item on the display.

The method may further comprise, if the Attach for the RLOS of the fourth PLMN is accepted, displaying, on the display, a first text for receiving whether to initiate a call to a RLOS center of the fourth PLMN, and if an input for the first text is received, controlling the communication module to initiate the call to the RLOS center of the fourth PLMN.

The method may further comprise, if the Attach for the RLOS of the fourth PLMN is accepted, displaying a second text for inquiring whether to display information related to the fourth PLMN, and if an input for the second text is received, displaying information related to the fourth PLMN on the display.

The method may further comprise, if the Attach for the RLOS of the fourth PLMN is accepted, displaying, on the display, ongoing state information for the RLOS of the fourth PLMN.

In another aspect, there is provided a user equipment (UE) selecting a public land mobile network (PLMN) in a wireless communication system, the UE comprising a communication module; a display; at least one processor; and at least one computer memory operationally connected to the at least one processor, wherein the at least one computer memory is configured to store instructions that allow the at least one processor to, in a manual network selection mode, display at least one first PLMN item respectively corresponding to at least one first PLMN on the display; if an input for a second PLMN item of the at least one first PLMN item is received, control the communication module and attempt to a registration on a second PLMN corresponding to the second PLMN item; if the registration on the second PLMN fails, display, on the display, at least one third PLMN item, that provides attach for a restricted local operator service (RLOS) and respectively corresponds to at least one third PLMN included in an RLOS PLMN list configured to a universal subscriber identity module (USIM) of the UE; and if an input for a fourth PLMN item of the at least one third PLMN item is received, control the communication module and initiate a registration for Attach for a RLOS of a fourth PLMN corresponding to the fourth PLMN item.

Displaying the at least one third PLMN item may comprise displaying, on the display, the at least one third PLMN item and at least one switch for selecting each of the at least one third PLMN item.

Initiating the registration for the Attach for the RLOS of the fourth PLMN may comprise, if an input for a switch for selecting the fourth PLMN item among the at least one switch is received, initiating the registration for the Attach for the RLOS of the fourth PLMN.

The at least one switch may include all selection switches configured to select all the at least one third PLMN item, and at least one individual selection switch configured to select each of the at least one third PLMN item.

The UE may further comprise displaying, on the display, a first icon indicating that a registration on the first PLMN has failed.

The UE may further comprise displaying, on one area of the display, a second icon indicating that the Attach for the RLOS of the fourth PLMN has been accepted.

Displaying, on the display, the at least one third PLMN item may comprise, if the registration on the second PLMN fails, displaying, on the display, a first tab for receiving whether there is Attach for an RLOS, and if an input for the first tab is received, displaying the at least one third PLMN item on the display.

The UE may further comprise, if the Attach for the RLOS of the fourth PLMN is accepted, displaying, on the display, a first text for receiving whether to initiate a call to a RLOS center of the fourth PLMN, and if an input for the first text is received, controlling the communication module to initiate the call to the RLOS center of the fourth PLMN.

The UE may further comprise, if the Attach for the RLOS of the fourth PLMN is accepted, displaying a second text for inquiring whether to display information related to the fourth PLMN, and if an input for the second text is received, displaying information related to the fourth PLMN on the display.

The UE may further comprise, if the Attach for the RLOS of the fourth PLMN is accepted, displaying, on the display, ongoing state information for the RLOS of the fourth PLMN.

Advantageous Effects

Embodiments of the present disclosure can use a restricted local operator service (RLOS) with both high excellence and security by using the RLOS provided by a predetermined PLMN or a PLMN selected by a user among a plurality of PLMNs providing the RLOS.

Embodiments of the present disclosure can predetermine which service to use considering the charging factor, etc. from a user perspective.

Effects that could be achieved with the present disclosure are not limited to those that have been described hereinabove merely by way of example, and other effects and advantages of the present disclosure will be more clearly understood from the following description by a person skilled in the art to which the present disclosure pertains.

DESCRIPTION OF DRAWINGS

The accompanying drawings, which are included to provide a further understanding of the present disclosure and constitute a part of the detailed description, illustrate embodiments of the present disclosure and serve to explain technical features of the present disclosure together with the description.

FIG. 1 illustrates an AI device 100 according to an embodiment of the present disclosure.

FIG. 2 illustrates an AI server 200 according to an embodiment of the present disclosure.

FIG. 3 illustrates an AI system 1 according to an embodiment of the present disclosure.

FIG. 4 illustrates various reference points.

FIG. 5 illustrates an example of a network structure of an evolved universal terrestrial radio access network (E-UTRAN) to which the present disclosure is applicable.

FIG. 6 illustrates an example of a general architecture of E-UTRAN and EPC.

FIG. 7 illustrates an example of a structure of a radio interface protocol in a control plane between a UE and eNB.

FIG. 8 illustrates an example of a structure of a radio interface protocol in a user plane between a UE and eNB.

FIG. 9 is a flow chart illustrating a method for a user equipment (UE) to use a restricted local operator service (RLOS) in accordance with an embodiment of the present disclosure.

FIG. 10 illustrates an example where a UE outputs a user screen on a display in accordance with an embodiment of the present disclosure.

FIG. 11 illustrates an example where a UE displays information indicating, that attach for RLOS service has been accepted, on a display in accordance with an embodiment of the present disclosure.

FIG. 12 illustrates an example where a UE displays ongoing state information for RLOS service on a display in accordance with an embodiment of the present disclosure.

FIG. 13 illustrates an example where a UE displays information indicating, that the use of RLOS service has been terminated, on a display in accordance with an embodiment of the present disclosure.

FIGS. 14 to 16 illustrate an example where a UE receives selection of RLOS service in accordance with an embodiment of the present disclosure.

FIG. 17 illustrates an example where a UE receives selection of some PLMNs of a plurality of PLMNs from a user in accordance with an embodiment of the present disclosure.

FIG. 18 illustrates an example where a UE receives, from a user, a selection for whether to initiate attach for RLOS service in accordance with an embodiment of the present disclosure.

FIG. 19 is a flow chart illustrating a method for a UE to select a network (PLMN) providing RLOS service in accordance with an embodiment of the present disclosure.

FIG. 20 is a block diagram illustrating a mobile terminal related to the present disclosure.

FIG. 21 illustrates an example of configuration of a node device applied to implementations of the present disclosure.

FIG. 22 is a block configuration diagram illustrating in detail a UE of FIG. 21.

FIG. 23 illustrates a wireless device applicable to the present disclosure.

FIG. 24 illustrates a signal processing circuit for a transmission signal.

FIG. 25 illustrates another example of a portable device applied to the present disclosure.

MODE FOR INVENTION

Reference will now be made in detail to implementations of the disclosure, examples of which are illustrated in the accompanying drawings. A detailed description to be disclosed below together with the accompanying drawing is to describe exemplary implementations of the present disclosure and not to describe a unique implementation for carrying out the present disclosure. The detailed description below includes details to provide a complete understanding of the present disclosure. However, those skilled in the art know that the present disclosure can be carried out without the details.

In some cases, in order to prevent a concept of the present disclosure from being ambiguous, known structures and devices may be omitted or illustrated in a block diagram format based on core functions of each structure and device.

In the present disclosure, a base station (BS) means a terminal node of a network directly performing communication with a terminal. In the present disclosure, specific operations described to be performed by the base station may be performed by an upper node of the base station, if necessary or desired. That is, it is obvious that in the network consisting of multiple network nodes including the base station, various operations performed for communication with the terminal can be performed by the base station or network nodes other than the base station. The 'base station (BS)' may be replaced with terms such as a fixed station, Node B, evolved-NodeB (eNB), a base transceiver system (BTS), an access point (AP), gNB (general NB), and the like. Further, a 'terminal' may be fixed or movable and may be replaced with terms such as user equipment (UE), a mobile station (MS), a user terminal (UT), a mobile subscriber station (MSS), a subscriber station (SS), an advanced mobile station (AMS), a wireless terminal (WT), a machinetype communication (MTC) device, a machine-to-machine (M2M) device, a device-todevice (D2D) device, and the like.

In the present disclosure, downlink (DL) means communication from the base station to the terminal, and uplink (UL) means communication from the terminal to the base station. In the downlink, a transmitter may be a part of the base station, and a receiver may be a part of the terminal. In the uplink, the transmitter may be a part of the terminal, and the receiver may be a part of the base station.

Specific terms used in the following description are provided to help the understanding of the present disclosure, and may be changed to other forms within the scope without radio service (GPRS)/enhanced data rates for GSM evolution (EDGE).

The OFDMA may be implemented as radio technology such as IEEE 802.11(Wi-Fi), IEEE 802.16 (WiMAX), IEEE 802-20, E-UTRA (evolved UTRA), and the like. The UTRA is a part of a universal mobile telecommunication system (UMTS). 3rd generation partnership project (3GPP) long term evolution (LTE), as a part of an evolved UMTS (E-UMTS) using EUTRA, adopts the OFDMA in the downlink and the SC-FDMA in the uplink. LTE-A (advanced) is the evolution of 3GPP LTE.

Embodiments of the present disclosure can be supported by standard documents disclosed in at least one of wireless access systems including the IEEE 802, 3GPP, and 3GPP2 specifications. In other words, in embodiments of the present disclosure, those steps or parts omitted for the purpose of clearly describing technical principles of the present disclosure can be supported by the documents above. All the terms disclosed in the present disclosure can also be explained by the standard documents.

3GPP LTE/LTE-A is primarily described for clear description, but technical features of the present disclosure are not limited thereto.

Terms used in the present disclosure are defined as follows.

IP Multimedia Subsystem or IP Multimedia Core Network Subsystem (IMS): an architectural framework for providing standardization for delivering voice or other multimedia services on internet protocol (IP).

Universal Mobile Telecommunication System (UMTS): the 3rd generation mobile communication technology based on global system for mobile communication (GSM) developed by the 3GPP.

Evolved Packet System (EPS): a network system consisting of an evolved packet core (EPC), that is an internet protocol (IP) based packet switched core network, and an access network such as LTE and UTRAN. The EPS is a network of an evolved version of UMTS.

NodeB: a base station of a UMTS network. It is installed outdoor, and its coverage has a scale of a macro cell.

eNodeB: a base station of an EPS network. It is installed outdoor, and its coverage has a scale of a macro cell.

Home NodeB: it is installed indoors as a base station of the UMTS network, and its coverage has a scale of a macro cell.

Home eNodeB: it is installed indoors as a base station of the EPS network, and its coverage has a scale of a macro cell.

User Equipment (UE): the UE may refer to terms such as a terminal, a mobile equipment (ME), and a mobile station (MS). The UE can be a portable device such as a notebook computer, a cellular phone, a personal digital assistant (PDA), a smart phone, and a multimedia device, or a non-portable device such as a personal computer (PC) and a vehicle-mounted device. The term of UE may refer to an MTC UE in the description related to MTC.

Machine Type Communication (MTC): communication performed by machines without human intervention. It may be called Machine-to-Machine (M2M) communication.

MTC terminal (MTC UE or MTC device or MTC apparatus): a terminal (e.g., a vending machine, meter, etc.) having a communication function (e.g., communication with an MTC server over PLMN) over a mobile communication network and performing a MTC function.

Radio Access Network (RAN): a unit including a Node B and a radio network controller (RNC) and eNodeB controlling the Node B in the 3GPP network. The RAN exists at a UE end and provides a connection to a core network.

Home Location Register (HLR)/Home Subscriber Server (HSS): a database containing subscriber information within the 3GPP network. The HSS can perform functions such as configuration storage, identity management, user state storage, etc.

Public Land Mobile Network (PLMN): a network configured for the purpose of providing mobile communication services to individuals. The PLMN can be configured for each operator.

Non-Access Stratum (NAS): a functional layer for exchanging signalling and a traffic message between a UE and a core network at the UMTS and EPS protocol stacks. The NAS mainly functions to support mobility of the UE and support a session management procedure for establishing and maintaining an IP connection between the UE and PDN GW.

Service Capability Exposure Function (SCEF): an entity within the 3GPP architecture for service capability exposure that provides a means to safely expose the services and capabilities provided by 3GPP network interfaces.

Mobility Management Entity (MME): a network node in the EPS network which performs mobility management and session management functions.

Packet Data Network Gateway (PDN-GW): a network node in the EPS network which performs UE IP address allocation, packet screening and filtering, and charging data collection functions.

Serving GW (Serving Gateway): a network node in the EPS network which performs functions such as mobility anchor, packet routing, idle mode packet buffering, and triggering of paging for the UE of MME.

Policy and Charging Rule Function (PCRF): a node in the EPS network which performs policy decision to dynamically apply differentiated QoS and billing policies per each service flow.

Open Mobile Alliance Device Management (OMA DM): A protocol designed to manage mobile devices, such as mobile phones, PDAs, and portable computers, which performs functions such as device configuration, firmware upgrade, and error report Operation Administration and Maintenance (OAM): A network management function group which provides network fault indication, performance information, and data and diagnostic functions.

Packet Data Network (PDN): a network in which a server (e.g., MMS server, WAP server, etc.) supporting a specific service is located.

PDN connection: a connection from the UE to the PDN, i.e., the association (connection) between the UE represented by the IP address and the PDN represented by the APN.

EPS Mobility Management (EMM): a sublayer of the NAS layer, where the EMM may be in an "EMM-Registered" or "EMM-Deregistered" state depending on whether the UE is network attached or detached.

EMM Connection Management (ECM) connection: A signaling connection for the exchange of NAS messages, established between the UE and the MME. An ECM connection is a logical connection consisting of an RRC connection between the UE and an eNB and S1 signaling connection between the eNB and the MME. When the ECM connection is established/terminated, the RRC and S1 signaling connections are established/terminated as well. To the UE, the established ECM connection means having an RRC connection established with the eNB, and to the MME, it means having an S1 signaling connection established with the eNB. Depending on whether the NAS signaling connection, i.e., the ECM connection is established, the ECM may have an "ECM-Connected" or "ECM-Idle" state.

Access-Stratum (AS): It includes a protocol stack between the UE and the radio (or access) network and is responsible for transmitting data and network control signals.

NAS configuration Management Object (MO): A management object (MO) used to configure the UE with parameters related to NAS functionality.

Packet Data Network (PDN): A network in which a server (e.g., multimedia messaging service (MMS) server, wireless application protocol (WAP) server, etc.) supporting a specific service is located.

PDN connection: a logical connection between the UE and the PDN, represented by one IP address (one IPv4 address and/or one IPv6 prefix).

Access Point Name (APN): a string that refers to or identifies a PDN. In order to access the requested service or network, it goes through a specific P-GW, which means a predefined name (string) in the network so that the P-GW can be found. (e.g., internet.mnc012.mcc345. gprs)

Access Network Discovery and Selection Function (ANDSF): it is a network entity and provides policies that allow the UE to discover and select an available access on a per operator basis.

EPC path (or infrastructure data path): a user plane communication path through EPC.

E-UTRAN Radio Access Bearer (E-RAB): it refers to the concatenation of a S1 bearer and a corresponding data radio bearer. If there is an E-RAB, there is an one-to-one mapping between the E-RAB and the EPS bearer of the NAS.

GPRS Tunneling Protocol (GTP): a group of IP-based communications protocols used to carry general packet radio service (GPRS) within GSM, UMTS and LTE networks. Within the 3GPP architecture, GTP and proxy mobile IPv6-based interfaces are specified on various interface points. GTP can be decomposed into several protocols (e.g., GTP-C, GTP-U and GTP'). GTP-C is used within a GPRS core network for signalling between gateway GPRS support nodes (GGSN) and serving GPRS support nodes (SGSN). GTP-C allows the SGSN to activate a session (e.g., PDN context activation), deactivate the same session, adjust the quality of service parameters, or renew a session for a subscriber, that has just operated from another SGSN, for the user. GTP-U is used to carry user data within the GPRS core network and between the radio access network and the core network. FIG. 1 illustrates a schematic structure of an evolved packet system (EPS) including an evolved packet core (EPC).

Cell as a radio resource: the 3GPP LTE/LTE-A system has used a concept of a cell to manage radio resources, and a cell related to the radio resource is distinguished from a cell of a geographic area. The "cell" related to the radio resource is defined as a combination of downlink (DL) resources and uplink (UL) resources, i.e., a combination of DL carriers and UL carriers. The cell may be configured with DL resource only or a combination of DL resources and UL resources. If carrier aggregation is supported, a linkage between a carrier frequency of the DL resource and a carrier frequency of the UL resource may be indicated by system information. Here, the carrier frequency refers to a center frequency of each cell or carrier. In particular, a cell operating on a primary frequency is called a primary cell or Pcell, and a cell operating on a secondary frequency is called a secondary cell or Scell. The Scell refers to a cell that can be configured after radio resource control (RRC) connection establishment is achieved and can be used for providing additional radio resources. Depending on capabilities of the UE, the Scell together with the Pcell can form a set of serving cells for the UE. For the UE that is in a RRC_CONNECTED state but is not configured with carrier aggregation, or does not support carrier aggregation, there is only one serving cell configured with only the Pcell. The "cell" of the geographic area can be understood as a coverage in which a node can provide services using a carrier, and the "cell" of the radio resource is related to a bandwidth (BW) that is a frequency range configured by the carrier. Since a downlink coverage that is a range within which the node can transmit a valid signal and an uplink coverage that is a range within which the node can receive the valid signal from the UE depend on the carrier carrying the corresponding signal, the coverage of the node is associated with the coverage of the "cell" of the radio resource the node uses. Thus, the term "cell" may be used to sometimes denote the coverage of the service by the node, sometimes denote the radio resource, and sometimes denote a range that a signal using the radio resources can reach with a valid strength.

The EPC is a key element of system architecture evolution (SAE) to improve the performance of 3GPP technologies. The SAE corresponds to a research project to determine a network structure supporting mobility between various kinds of networks. The SAE aims to provide an optimized packet-based system, for example, supporting various radio access technologies on an IP basis and providing more improved data transfer capability.

More specifically, the EPC is a core network of an IP mobile communication system for the 3GPP LTE system and can support packet-based real-time and non-real time services. In the existing mobile communication system (i.e., in the 2nd or 3rd mobile communication system), functions of the core network have been implemented through two separate sub-domains including a circuit-switched (CS) sub-domain for voice and a packet-switched (PS) sub-domain for data. However, in the 3GPP LTE system that is an evolution of the 3rd mobile communication system, the CS and PS sub-domains have been unified into a single IP domain. That is, in the 3GPP LTE system, a connection between UEs having IP capabilities can be configured via an IP-based base station (e.g., evolved Node B (eNodeB)), an EPC, and an application domain (e.g., IP multimedia subsystem (IMS)). In other words, the EPC is an essential architecture to implement end-to-end IP services.

The EPC may include various components, and FIG. 1 illustrates some of the EPC components, including a serving gateway (SGW), a packet data network gateway (PDN GW), a mobility management entity (MME), a SGSN (serving GPRS (general packet radio service) supporting node), and an enhanced packet data gateway (ePDG).

The SGW (or S-GW) operates as a boundary point between a radio access network (RAN) and a core network, and is an element that functions to maintain a data path between the eNB and the PDN GW. Further, if the UE moves across areas served by the eNB, the SGW serves as a local mobility anchor point. That is, packets can be routed through the SGW for mobility within the E-UTRAN (evolved-universal mobile telecommunications system (UMTS) terrestrial radio access network defined in 3GPP Release-8 or later). The SGW may also serve as an anchor point for mobility with other 3GPP networks (RAN defined before 3GPP Release-8, for example, UTRAN or GERAN (global system for mobile communication (GSM)/enhanced data rates for global evolution (EDGE) radio access network).

The PDN GW (or P-GW) corresponds to a termination point of a data interface to a packet data network. The PDN GW can support policy enforcement features, packet filtering, charging support, and the like. In addition, the PDN GW can serve as an anchor point for mobility management between the 3GPP network and a non-3GPP network (e.g., untrusted networks such as an interworking wireless local area network (I-WLAN) or trusted networks such as a code division multiple access (CDMA) network and Wimax).

Hereinafter, the present disclosure is described based on the terms defined as above.

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive occasion in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

Embodiments of the present disclosure to be described below can be implemented through the combination or the modification in order to meet the 5G requirements described above.

The following is described in detail in relation to the technical field to which embodiments of the present disclosure to be described below can be applied.

Artificial Intelligence (AI)

Artificial intelligence means the field in which artificial intelligence or methodology capable of producing artificial intelligence is researched. Machine learning means the field in which various problems handled in the artificial intelligence field are defined and methodology for solving the problems are researched. Machine learning is also defined as an algorithm for improving performance of a task through continuous experiences for the task.

An artificial neural network (ANN) is a model used in machine learning, and is configured with artificial neurons (nodes) forming a network through a combination of synapses, and may mean the entire model having a problem-solving ability. The artificial neural network may be defined by a connection pattern between the neurons of different layers, a learning process of updating a model parameter, and an activation function for generating an output value.

The artificial neural network may include an input layer, an output layer, and optionally one or more hidden layers. Each layer includes one or more neurons. The artificial neural network may include a synapse connecting neurons. In the artificial neural network, each neuron may output a function value of an activation function for input signals, weight, and a bias input through a synapse.

A model parameter means a parameter determined through learning, and includes the weight of a synapse connection and the bias of a neuron. Furthermore, a hyper parameter means a parameter that needs to be configured prior to learning in the machine learning algorithm, and includes a learning rate, the number of times of repetitions, a mini-deployment size, and an initialization function.

An object of the training of the artificial neural network may be considered to determine a model parameter that minimizes a loss function. The loss function may be used as an index for determining an optimal model parameter in the learning process of an artificial neural network.

Machine learning may be classified into supervised learning, unsupervised learning, and reinforcement learning based on a learning method.

Supervised learning means a method of training an artificial neural network in the state in which a label for learning data has been given. The label may mean an answer (or a result value) that must be deduced by an artificial neural network when learning data is input to the artificial neural network. Unsupervised learning may mean a method of training an artificial neural network in the state in which a label for learning data has not been given. Reinforcement learning may mean a learning method in which an agent defined within an environment is trained to select a behavior or behavior sequence that maximizes accumulated compensation in each state.

Machine learning implemented as a deep neural network (DNN) including a plurality of hidden layers, among artificial neural networks, is also called deep learning. Deep learning is part of machine learning. Hereinafter, machine learning is used as a meaning including deep learning.

<Robot>

A robot may mean a machine that automatically processes a given task or operates based on an autonomously owned ability. Particularly, a robot having a function for recognizing an environment and autonomously determining and performing an operation may be called an intelligence type robot.

A robot may be classified for industry, medical treatment, home, and military based on its use purpose or field.

A robot includes a driving unit including an actuator or motor, and may perform various physical operations, such as moving a robot joint. Furthermore, a movable robot includes a wheel, a brake, a propeller, etc. in a driving unit, and may run on the ground or fly in the air through the driving unit.

<Self-Driving or Autonomous-Driving>

Self-driving means a technology for autonomous driving. A self-driving vehicle means a vehicle that runs without a user manipulation or by a user's minimum manipulation.

For example, self-driving may include all of a technology for maintaining a driving lane, a technology for automatically controlling speed, such as adaptive cruise control, a technology for automatic driving along a predetermined path, a technology for automatically configuring a path when a destination is set and driving.

A vehicle includes all of a vehicle having only an internal combustion engine, a hybrid vehicle including both an internal combustion engine and an electric motor, and an electric vehicle having only an electric motor, and may include a train, a motorcycle, etc. in addition to the vehicles.

In this case, the self-driving vehicle may be considered to be a robot having a self-driving function.

<Extended Reality (XR)>

Extended reality collectively refers to virtual reality (VR), augmented reality (AR), and mixed reality (MR). The VR technology provides an object or background of the real world as a CG image only. The AR technology provides a virtually produced CG image on an actual thing image. The MR technology is a computer graphics technology for mixing and combining virtual objects with the real world and providing them.

The MR technology is similar to the AR technology in that it shows a real object and a virtual object. However, in the AR technology, a virtual object is used in a form to supplement a real object. In contrast, unlike in the AR technology, in the MR technology, a virtual object and a real object are used as the same character.

The XR technology may be applied to a head-mount display (HMD), a head-up display (HUD), a mobile phone, a tablet PC, a laptop, a desktop, TV, and a digital signage. A device to which the XR technology has been applied may be called an XR device.

FIG. 1 illustrates an AI device 100 according to an embodiment of the present disclosure.

The AI device 100 may be implemented as a stationary device or mobile device, such as TV, a projector, a mobile phone, a smartphone, a desktop computer, a notebook, a terminal for digital broadcasting, a personal digital assistants (PDA), a portable multimedia player (PMP), a navigator, a tablet PC, a wearable device, a set-top box (STB), a DMB receiver, a radio, a washing machine, a refrigerator, a desktop computer, digital signage, a robot, and a vehicle.

Referring to FIG. 1, a terminal 100 may include a communication unit 110, an input unit 120, a learning processor 130, a sensing unit 140, an output unit 150, a memory 170 and a processor 180.

The communication unit 110 may transmit and receive data to and from external devices, such as other AI devices 100a to 100e or an AI server 200 using wired/wireless communication technologies. For example, the communication unit 110 may transmit and receive sensor information, user input, a learning model, or a control signal to and from external devices.

In this case, communication technologies used by the communication unit 110 include a global system for mobile communication (GSM), code division multi access (CDMA), long term evolution (LTE), 5G, a wireless LAN (WLAN), wireless-fidelity (Wi-Fi), Bluetooth™, radio frequency identification (RFID), infrared data association (IrDA), ZigBee, and near field communication (NFC).

The input unit 120 may obtain various types of data.

In this case, the input unit 120 may include a camera for an image signal input, a microphone for receiving an audio signal, a user input unit for receiving information from a user, etc. In this case, the camera or the microphone is treated as a sensor, and a signal obtained from the camera or the microphone may be called sensing data or sensor information.

The input unit 120 may obtain learning data for model learning and input data to be used when an output is obtained using a learning model. The input unit 120 may obtain not-processed input data. In this case, the processor 180 or the learning processor 130 may extract an input feature by performing pre-processing on the input data.

The learning processor 130 may be trained by a model configured with an artificial neural network using learning data. In this case, the trained artificial neural network may be called a learning model. The learning model is used to deduce a result value of new input data not learning data. The deduced value may be used as a base for performing a given operation.

In this case, the learning processor 130 may perform AI processing along with the learning processor 240 of the AI server 200.

In this case, the learning processor 130 may include memory integrated or implemented in the AI device 100. Alternatively, the learning processor 130 may be implemented using the memory 170, external memory directly coupled to the AI device 100 or memory maintained in an external device.

The sensing unit 140 may obtain at least one of internal information of the AI device 100, surrounding environment information of the AI device 100, or user information using various sensors.

In this case, sensors included in the sensing unit 140 include a proximity sensor, an illumination sensor, an acceleration sensor, a magnetic sensor, a gyro sensor, an inertia sensor, an RGB sensor, an IR sensor, a fingerprint recognition sensor, an ultrasonic sensor, a photo sensor, a microphone, a lidar, and a radar.

The output unit 150 may generate an output related to a visual sense, an auditory sense or a tactile sense.

In this case, the output unit 150 may include a display unit for outputting visual information, a speaker for outputting auditory information, and a haptic module for outputting tactile information.

The memory 170 may store data supporting various functions of the AI device 100. For example, the memory 170 may store input data obtained by the input unit 120, learning data, a learning model, a learning history, etc.

The processor 180 may determine at least one executable operation of the AI device 100 based on information, determined or generated using a data analysis algorithm or a machine learning algorithm. Furthermore, the processor 180 may perform the determined operation by controlling elements of the AI device 100.

To this end, the processor 180 may request, search, receive, and use the data of the learning processor 130 or the memory 170, and may control elements of the AI device 100 to execute a predicted operation or an operation determined to be preferred, among the at least one executable operation.

In this case, if association with an external device is necessary to perform the determined operation, the processor 180 may generate a control signal for controlling the corresponding external device and transmit the generated control signal to the corresponding external device.

The processor 180 may obtain intention information for a user input and transmit user requirements based on the obtained intention information.

In this case, the processor 180 may obtain the intention information, corresponding to the user input, using at least one of a speech to text (STT) engine for converting a voice input into a text string or a natural language processing (NLP) engine for obtaining intention information of a natural language.

In this case, at least some of at least one of the STT engine or the NLP engine may be configured as an artificial neural network trained based on a machine learning algorithm. Furthermore, at least one of the STT engine or the NLP engine may have been trained by the learning processor 130, may have been trained by the learning processor 240 of the AI server 200 or may have been trained by distributed processing thereof.

The processor 180 may collect history information including the operation contents of the AI device 100 or the feedback of a user for an operation, may store the history information in the memory 170 or the learning processor 130, or may transmit the history information to an external device, such as the AI server 200. The collected history information may be used to update a learning model.

The processor 180 may control at least some of the elements of the AI device 100 in order to execute an application program stored in the memory 170. Moreover, the processor 180 may combine and drive two or more of the elements included in the AI device 100 in order to execute the application program.

FIG. 2 illustrates an AI server 200 according to an embodiment of the present disclosure.

Referring to FIG. 2, the AI server 200 may mean an apparatus which trains an artificial neural network using a machine learning algorithm or which uses a trained artificial neural network. In this case, the AI server 200 is configured with a plurality of servers and may perform distributed processing and may be defined as a 5G network. In this case, the AI server 200 may be included as a partial configuration of the AI device 100, and may perform at least some of AI processing.

The AI server 200 may include a communication unit 210, memory 230, a learning processor 240 and a processor 260.

The communication unit 210 may transmit and receive data to and from an external device, such as the AI device 100.

The memory 230 may include a model storage unit 231. The model storage unit 231 may store a model (or artificial neural network 231a) which is being trained or has been trained through the learning processor 240.

The learning processor 240 may train the artificial neural network 231a using learning data. The learning model may be used in the state in which it has been mounted on the AI server 200 of the artificial neural network or may be mounted on an external device, such as the AI device 100, and used.

The learning model may be implemented as hardware, software or a combination of hardware and software. If some of or the entire learning model is implemented as software, one or more instructions configuring the learning model may be stored in the memory 230.

The processor 260 may deduce a result value of new input data using the learning model, and may generate a response or control command based on the deduced result value.

FIG. 3 illustrates an AI system 1 according to an embodiment of the present disclosure.

Referring to FIG. 3, the AI system 1 is connected to at least one of the AI server 200, a robot 100a, a self-driving vehicle 100b, an XR device 100c, a smartphone 100d or home appliances 100e over a cloud network 10. In this case, the robot 100a, the self-driving vehicle 100b, the XR device 100c, the smartphone 100d or the home appliances 100e to which the AI technology has been applied may be called AI devices 100a to 100e.

The cloud network 10 may configure part of cloud computing infra or may mean a network present within cloud computing infra. In this case, the cloud network 10 may be configured using the 3G network, the 4G or long term evolution (LTE) network or the 5G network.

That is, the devices 100a to 100e (200) configuring the AI system 1 may be interconnected over the cloud network 10. Particularly, the devices 100a to 100e and 200 may communicate with each other through a base station, but may directly communicate with each other without the intervention of a base station.

The AI server 200 may include a server for performing AI processing and a server for performing calculation on big data.

The AI server 200 is connected to at least one of the robot 100a, the self-driving vehicle 100b, the XR device 100c, the smartphone 100d or the home appliances 100e, that is, AI devices configuring the AI system 1, over the cloud network 10, and may help at least some of the AI processing of the connected AI devices 100a to 100e.

In this case, the AI server 200 may train an artificial neural network based on a machine learning algorithm in place of the AI devices 100a to 100e, may directly store a learning model or may transmit the learning model to the AI devices 100a to 100e.

In this case, the AI server 200 may receive input data from the AI devices 100a to 100e, may deduce a result value of the received input data using the learning model, may generate a response or control command based on the deduced result value, and may transmit the response or control command to the AI devices 100a to 100e.

Alternatively, the AI devices 100a to 100e may directly deduce a result value of input data using a learning model, and may generate a response or control command based on the deduced result value.

Hereinafter, various embodiments of the AI devices 100a to 100e to which the above-described technology is applied are described. In this case, the AI devices 100a to 100e shown in FIG. 3 may be considered to be detailed embodiments of the AI device 100 shown in FIG. 1.

AI and Robot to which the Present Disclosure is Applicable

An AI technology is applied to the robot 100a, and the robot 100a may be implemented as a guidance robot, a transport robot, a cleaning robot, a wearable robot, an entertainment robot, a pet robot, an unmanned flight robot, etc.

The robot 100a may include a robot control module for controlling an operation. The robot control module may mean a software module or a chip in which a software module has been implemented using hardware.

The robot 100a may obtain state information of the robot 100a, may detect (recognize) a surrounding environment and object, may generate map data, may determine a moving path and a running plan, may determine a response to a user interaction, or may determine an operation using sensor information obtained from various types of sensors.

In this case, the robot 100a may use sensor information obtained by at least one sensor among a lidar, a radar, and a camera in order to determine the moving path and running plan.

The robot 100a may perform the above operations using a learning model configured with at least one artificial neural network. For example, the robot 100a may recognize a surrounding environment and object using a learning model, and may determine an operation using recognized surrounding environment information or object information. In this case, the learning model may have been directly trained in the robot 100a or may have been trained in an external device, such as the AI server 200.

In this case, the robot 100a may directly generate results using the learning model and perform an operation, but may perform an operation by transmitting sensor information to an external device, such as the AI server 200, and receiving results generated in response thereto.

The robot 100a may determine a moving path and running plan using at least one of map data, object information detected from sensor information, or object information obtained from an external device. The robot 100a may run along the determined moving path and running plan by controlling the driving unit.

The map data may include object identification information for various objects disposed in the space in which the robot 100a moves. For example, the map data may include object identification information for fixed objects, such as a wall and a door, and movable objects, such as a flowerpot and a desk. Furthermore, the object identification information may include a name, a type, a distance, a location, etc.

Furthermore, the robot 100a may perform an operation or run by controlling the driving unit based on a user's control/interaction. In this case, the robot 100a may obtain intention information of an interaction according to a user's behavior or voice speaking, may determine a response based on the obtained intention information, and may perform an operation.

AI and Self-Driving to which the Present Disclosure is Applicable

An AI technology is applied to the self-driving vehicle 100b, and the self-driving vehicle 100b may be implemented as a movable type robot, a vehicle, an unmanned flight body, etc.

The self-driving vehicle 100b may include a self-driving control module for controlling a self-driving function. The self-driving control module may mean a software module or a chip in which a software module has been implemented using hardware. The self-driving control module may be included in the self-driving vehicle 100b as an element of the self-driving vehicle 100b, but may be configured as separate hardware outside the self-driving vehicle 100b and connected to the self-driving vehicle 100b.

The self-driving vehicle 100b may obtain state information of the self-driving vehicle 100b, may detect (recognize) a surrounding environment and object, may generate map data, may determine a moving path and running plan, or may determine an operation using sensor information obtained from various types of sensors.

In this case, in order to determine the moving path and running plan, like the robot 100a, the self-driving vehicle 100b may use sensor information obtained from at least one sensor among LIDAR, a radar and a camera.

Particularly, the self-driving vehicle 100b may recognize an environment or object in an area whose view is blocked or an area of a given distance or more by receiving sensor information for the environment or object from external devices, or may directly receive recognized information for the environment or object from external devices.

The self-driving vehicle 100b may perform the above operations using a learning model configured with at least one artificial neural network. For example, the self-driving vehicle 100b may recognize a surrounding environment and object using a learning model, and may determine the flow of running using recognized surrounding environment information or object information. In this case, the learning model may have been directly trained in the self-driving vehicle 100b or may have been trained in an external device, such as the AI server 200.

In this case, the self-driving vehicle 100b may directly generate results using the learning model and perform an operation, but may perform an operation by transmitting sensor information to an external device, such as the AI server 200, and receiving results generated in response thereto.

The self-driving vehicle 100b may determine a moving path and running plan using at least one of map data, object information detected from sensor information or object information obtained from an external device. The self-driving vehicle 100b may run based on the determined moving path and running plan by controlling the driving unit.

The map data may include object identification information for various objects disposed in the space (e.g., road) in which the self-driving vehicle 100b runs. For example, the map data may include object identification information for fixed objects, such as a streetlight, a rock, and a building, etc., and movable objects, such as a vehicle and a pedestrian. Furthermore, the object identification information may include a name, a type, a distance, a location, etc.

Furthermore, the self-driving vehicle 100b may perform an operation or may run by controlling the driving unit based on a user's control/interaction. In this case, the self-driving vehicle 100b may obtain intention information of an interaction according to a user' behavior or voice speaking, may determine a response based on the obtained intention information, and may perform an operation.

AI and XR to which the Present Disclosure is Applicable

An AI technology is applied to the XR device 100c, and the XR device 100c may be implemented as a head-mount display, a head-up display provided in a vehicle, television, a mobile phone, a smartphone, a computer, a wearable device, home appliances, a digital signage, a vehicle, a fixed type robot or a movable type robot.

The XR device 100c may generate location data and attributes data for three-dimensional points by analyzing three-dimensional point cloud data or image data obtained through various sensors or from an external device, may obtain information on a surrounding space or real object based on the generated location data and attributes data, and may output an XR object by rendering the XR object. For example, the XR device 100c may output an XR object, including additional information for a recognized object, by making the XR object correspond to the corresponding recognized object.

The XR device 100c may perform the above operations using a learning model configured with at least one artificial neural network. For example, the XR device 100c may recognize a real object in three-dimensional point cloud data or image data using a learning model, and may provide information corresponding to the recognized real object. In this case, the learning model may have been directly trained in the XR device 100c or may have been trained in an external device, such as the AI server 200.

In this case, the XR device 100c may directly generate results using a learning model and perform an operation, but may perform an operation by transmitting sensor information to an external device, such as the AI server 200, and receiving results generated in response thereto.

AI, Robot and Self-Driving to which the Present Disclosure is Applicable

An AI technology and a self-driving technology are applied to the robot 100a, and the robot 100a may be implemented as a guidance robot, a transport robot, a cleaning robot, a wearable robot, an entertainment robot, a pet robot, an unmanned flight robot, etc.

The robot 100a to which the AI technology and the self-driving technology have been applied may mean a robot itself having a self-driving function or may mean the robot 100a interacting with the self-driving vehicle 100b.

The robot 100a having the self-driving function may collectively refer to devices that autonomously move along a given flow without control of a user or autonomously determine a flow and move.

The robot 100a and the self-driving vehicle 100b having the self-driving function may use a common sensing method in order to determine one or more of a moving path or a running plan. For example, the robot 100a and the self-driving vehicle 100b having the self-driving function may determine one or more of a moving path or a running plan using information sensed through LIDAR, a radar, a camera, etc.

The robot 100a interacting with the self-driving vehicle 100b is present separately from the self-driving vehicle 100b, and may perform an operation associated with a self-driving function inside or outside the self-driving vehicle 100b or associated with a user got in the self-driving vehicle 100b.

In this case, the robot 100a interacting with the self-driving vehicle 100b may control or assist the self-driving function of the self-driving vehicle 100b by obtaining sensor information in place of the self-driving vehicle 100b and providing the sensor information to the self-driving vehicle 100b, or by obtaining sensor information, generating surrounding environment information or object information, and providing the surrounding environment information or object information to the self-driving vehicle 100b.

Alternatively, the robot 100a interacting with the self-driving vehicle 100b may control the function of the self-driving vehicle 100b by monitoring a user got in the self-driving vehicle 100b or through an interaction with a user. For example, if a driver is determined to be a drowsiness state, the robot 100a may activate the self-driving function of the self-driving vehicle 100b or assist control of the driving unit of the self-driving vehicle 100b. In this case, the function of the self-driving vehicle 100b controlled by the robot 100a may include a function provided by a navigation system or audio system provided within the self-driving vehicle 100b, in addition to a self-driving function simply.

Alternatively, the robot 100a interacting with the self-driving vehicle 100b may provide information to the self-driving vehicle 100b or may assist a function outside the self-driving vehicle 100b. For example, the robot 100a may provide the self-driving vehicle 100b with traffic information, including signal information, as in a smart traffic light, and may automatically connect an electric charger to a filling inlet through an interaction with the self-driving vehicle 100b as in the automatic electric charger of an electric vehicle.

AI, Robot and XR to which the Present Disclosure is Applicable

An AI technology and an XR technology are applied to the robot 100a, and the robot 100a may be implemented as a guidance robot, a transport robot, a cleaning robot, a wearable robot, an entertainment robot, a pet robot, an unmanned flight robot, a drone, etc.

The robot 100a to which the XR technology has been applied may mean a robot, that is, a target of control/interaction within an XR image. In this case, the robot 100a is different from the XR device 100c, and they may operate in conjunction with each other.

When the robot 100a, that is, a target of control/interaction within an XR image, obtains sensor information from sensors including a camera, the robot 100a or the XR device 100c may generate an XR image based on the sensor information, and the XR device 100c may output the generated XR image. Furthermore, the robot 100a may operate based on a control signal received through the XR device 100c or a user's interaction.

For example, a user may identify a corresponding XR image at timing of the robot 100a, remotely operating in conjunction through an external device, such as the XR device 100c, may adjust the self-driving path of the robot 100a through an interaction, may control an operation or driving, or may identify information of a surrounding object.

AI, Self-Driving and XR to which the Present Disclosure is Applicable

An AI technology and an XR technology are applied to the self-driving vehicle 100b, and the self-driving vehicle 100b may be implemented as a movable type robot, a vehicle, an unmanned flight body, etc.

The self-driving vehicle 100b to which the XR technology has been applied may mean a self-driving vehicle equipped with means for providing an XR image or a self-driving vehicle, that is, a target of control/interaction within an XR image. Particularly, the self-driving vehicle 100b, that is, a target of control/interaction within an XR image, is different from the XR device 100c, and they may operate in conjunction with each other.

The self-driving vehicle 100b equipped with the means for providing an XR image may obtain sensor information from sensors including a camera, and may output an XR image generated based on the obtained sensor information. For example, the self-driving vehicle 100b includes an HUD, and may provide a passenger with an XR object corresponding to a real object or an object within a screen by outputting an XR image.

In this case, when the XR object is output to the HUD, at least some of the XR object may be output with it overlapping a real object toward which a passenger's view is directed. In contrast, when the XR object is displayed on a display included within the self-driving vehicle 100b, at least some of the XR object may be output so that it overlaps an object within a screen. For example, the self-driving vehicle 100b may output XR objects corresponding to objects, such as a carriageway, another vehicle, a traffic light, a signpost, a two-wheeled vehicle, a pedestrian, and a building.

When the self-driving vehicle 100b, that is, a target of control/interaction within an XR image, obtains sensor information from sensors including a camera, the self-driving vehicle 100b or the XR device 100c may generate an XR image based on the sensor information. The XR device 100c may output the generated XR image. Furthermore, the self-driving vehicle 100b may operate based on a control signal received through an external device, such as the XR device 100c, or a user's interaction.

5G System Architecture to which the Present Disclosure is Applicable

A 5G system is an advanced technology from 4G LTE mobile communication technology and supports a new radio access technology (RAT), extended long term evolution (eLTE) as an extended technology of LTE, non-3GPP access (e.g., wireless local area network (WLAN) access), etc. through the evolution of the existing mobile communication network structure or a clean-state structure.

The 5G system is defined based on a service, and an interaction between network functions (NFs) in an architecture for the 5G system can be represented in two ways as follows.

Reference point representation: indicates an interaction between NF services in NFs described by a point-to-point reference point (e.g., N11) between two NFs (e.g., AMF and SMF).

Service-based representation: network functions (e.g., AMF) within a control plane (CP) allow other authenticated network functions to access its services. The representation also includes a point-to-point reference point, if necessary.

Overview of 3GPP System

FIG. 4 illustrates various reference points.

In an example of a network structure illustrated in FIG. 4, the SGW and the PDN GW are configured as separate gateways, but the two gateways may be implemented according to a single gateway configuration option.

The MME is an element to perform signaling and control functions for supporting access to the network connection of the UE, allocation, tracking, paging, roaming, and handover of network resources, and so on. The MME controls control plane functions related to subscribers and session management. The MME manages a large number of eNBs and performs signaling of the conventional gateway selection for handover to other 2G/3G networks. Further, the MME performs functions of security procedures, terminal-to-network session handling, idle terminal location management, etc.

The SGSN handles all packet data such as mobility management and authentication of the user for another 3GPP network (e.g., GPRS network).

The ePDG serves as a security node for an untrusted non-3GPP network (e.g., I-WLAN, WiFi hotspot, etc.)

As described with reference to FIG. 4, the UE with IP capability can access the IP service network (e.g., IMS) provided by a service provider (i.e., operator) via various components within the EPC based on the non-3GPP access as well as the 3GPP access.

For example, reference points such as S1-U and S1-MME can connect two functions present in different functional entities. The 3GPP system defines a conceptual link connecting two functions present in different functional entities of E-UTRAN and EPC, as a reference point. The following Table 1 summarizes reference points illustrated in FIG. 4. In addition to the example of Table 1, various reference points can exist depending on the network structure.

TABLE 1

| Reference Point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |

TABLE 1-continued

| Reference Point | Description |
| --- | --- |
| S11 | Reference point for the control plane protocol between MME and SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points illustrated in FIG. 4, S2a and S2b correspond to non-3GPP interfaces. S2a is a reference point to provide a user plane with related control and mobility support between the trusted non-3GPP access and the PDN GW. S2b is a reference point to provide a user plane with related control and mobility support between the ePDG and the PDN GW.

FIG. 5 illustrates an example of a network structure of an evolved universal terrestrial radio access network (E-UTRAN) to which the present disclosure is applicable.

An E-UTRAN system is an evolved version of the existing UTRAN system and may be, for example, 3GPP LTE/LTE-A system. Communication networks are widely deployed to provide various communication services such as voice (e.g., voice over Internet protocol (VoIP)) through IMS and packet data.

Referring to FIG. 5, an E-UMTS network includes an E-UTRAN, an EPC, and one or more UEs. The E-UTRAN consists of eNBs that provide control plane and user plane protocols to the UE, and the eNBs are interconnected with each other by means of the X2 interface.

X2 user plane (X2-U) interface is defined between the eNBs. The X2-U interface provides non-guaranteed delivery of a user plane packet data unit (PDU). X2 control plane (X2-CP) interface is defined between two neighboring eNBs. The X2-CP performs functions of context delivery between the eNBs, control of user plane tunnel between a source eNB and a target eNB, delivery of handover-related messages, uplink load management, and the like.

The eNB is connected to the UE via a radio interface and is connected to an evolved packet core (EPC) by means of the S1 interface.

S1 user plane (S1-U) interface is defined between the eNB and a serving gateway (S-GW). S1 control plane interface (S1-MME) is defined between the eNB and a mobility management entity (MME). The S1 interface performs functions of evolved packet system (EPS) bearer service management, non-access stratum (NAS) signaling transport, network sharing, MME load balancing, and so on. The S1 interface supports many-to-many-relation between the eNB and the MME/S-GW.

The MME can perform various functions such as NAS signaling security, access stratum (AS) security control, inter-core network (CN) node signaling for supporting mobility between 3GPP access networks, idle mode UE reachability (including control and execution of paging retransmission), tracking area identity (TAI) management (for UE in idle and active modes), PDN GW and SGW selection, MME selection for handover with MME change, SGSN selection for handover to 2G or 3G 3GPP access networks, roaming, authentication, bearer management functions including dedicated bearer establishment, support of public warning system (PWS) (including earthquake and tsunami warning system (ETWS) and commercial mobile alert system (CMAS)) message transmission, and the like.

FIG. 6 illustrates an example of a general architecture of E-UTRAN and EPC.

As illustrated in FIG. 6, the eNB can perform functions such as routing to gateway while radio resource control (RRC) connection is activated, scheduling and transmission of paging messages, scheduling and transmission of a broadcast channel (BCH), dynamic allocation of resources in uplink and downlink to the UE, configuration and provision for the measurement of the eNB, radio bearer control, radio admission control, and connection mobility control. The eNB can perform functions such as paging generation in the EPC, management of an LTE IDLE state, ciphering of a user plane, SAE bearer control, and ciphering and integrity protection of NAS signaling.

Annex J of 3GPP TR 23.799 shows various architectures by combining 5G and 4G. An architecture using NR and NGC is disclosed in 3GPP TS 23.501.

FIG. 7 illustrates an example of a structure of a radio interface protocol in a control plane between a UE and eNB. FIG. 8 illustrates an example of a structure of a radio interface protocol in a user plane between a UE and eNB.

The radio interface protocol is based on 3GPP radio access network standard. The radio interface protocol horizontally consists of a physical layer, a data link layer, and a network layer, and is vertically divided into a user plane for data information transmission and a control plane for control signaling delivery.

The protocol layers may be divided into L1 (first layer), L2 (second layer), and L3 (third layer) based upon three lower layers of an open system interconnection (OSI) standard model that is well known in the art of communication systems.

The layers of the radio protocol in the control plane illustrated in FIG. 7 and the layers of the radio protocol in the user plane illustrated in FIG. 8 are described below.

The physical layer, the first layer, provides an information transfer service using a physical channel. The physical layer is connected with a medium access control (MAC) layer located at a higher level via a transport channel, and data between the MAC layer and the physical layer is transferred via the transport channel. Data is transferred between different physical layers, i.e., between physical layers of a transmission side and a reception side via the physical channel.

The physical channel consists of several subframes on a time axis and several subcarriers on a frequency axis. Here, one subframe consists of a plurality of OFDM symbols and a plurality of subcarriers on the time axis. One subframe consists of a plurality of resource blocks, and one resource block consists of a plurality of OFDM symbols and a plurality of subcarriers. A unit time, a transmission time interval (TTI), at which data is transmitted is 1 ms corresponding to one subframe.

Physical channels existing in the physical layers of the transmission side and the reception side may be divided into a physical downlink shared channel (PDSCH) and a physical uplink shared channel (PUSCH) that are data channels, and a physical downlink control channel (PDCCH), a physical control format indicator channel (PCFICH), a physical hybrid-ARQ indicator channel (PHICH), and a physical uplink control channel (PUCCH) that are control channels, according to 3GPP LTE.

There are several layers in the second layer. A medium access control (MAC) layer of the second layer functions to map various logical channels to various transfer channels, and also performs a function of logical channel multiplexing for mapping several logical channels to one transfer channel. The MAC layer is connected to a radio link control (RLC) layer, that is an upper layer, via the logical channel. The logical channel is roughly divided into a control channel used to transmit information of the control plane and a traffic channel used to transmit information of the user plane according to a type of transmitted information.

The MAC layer of the second layer segments and concatenate data received from the upper layer and adjusts a data size so that a lower layer is adapted to transmit data to a radio section.

A packet data convergence protocol (PDCP) layer of the second layer performs a header compression function of reducing an IP packet header size that has a relatively large size and contains unnecessary control information, in order to efficiently transmit data in a radio section having a small bandwidth upon transmission of IP packet such as IPv4 or IPv6. In addition, in the LTE system, the PDCP layer also performs a security function, which consists of ciphering for preventing data interception by a third party and integrity protection for preventing data manipulation by a third party.

A radio resource control (RRC) layer located at the uppermost part of the third layer is defined only in the control plane and is responsible for controlling logical channels, transport channels, and physical channels in relation to configuration, re-configuration, and release of radio bearers (RBs). The RB means services provided by the second layer to ensure data transfer between the UE and the E-UTRAN.

If an RRC connection is established between an RRC layer of the UE and an RRC layer of a wireless network, the UE is in an RRC connected mode. Otherwise, the UE is in an RRC idle mode.

An RRC state of the UE and an RRC connection method are described below. The RRC state refers to a state in which the RRC of the UE is or is not logically connected with the RRC of the E-UTRAN. The RRC state of the UE having logical connection with the RRC of the E-UTRAN is referred to as an RRC_CONNECTED state, and the RRC state of the UE not having logical connection with the RRC of the E-UTRAN is referred to as an RRC_IDLE state. Since the UE in the RRC_CONNECTED state has the RRC connection, the E-UTRAN can identify the presence of the corresponding UE on a per cell basis and thus efficiently control the UE. On the other hand, the E-UTRAN cannot identify the presence of the UE of the RRC_IDLE state, and the UE in the RRC_IDLE state is managed by a core network based on a tracking area (TA) which is an area unit larger than the cell. That is, for the UE in the RRC_IDLE state, only presence or absence of the corresponding UE is identified in an area unit larger than the cell. In order for the UE of the RRC_IDLE state to receive typical mobile communication services such as voice and data, the UE should transition to the RRC_CONNECTED state. Each TA is distinguished from another TA by a tracking area identity (TAI) thereof. The UE may configure the TAI through a tracking area code (TAC) which is information broadcasted from a cell.

When the user initially turns on the UE, the UE first searches for a proper cell, and then establishes RRC connection in the corresponding cell and registers information of the UE in the core network. Thereafter, the UE stays in the RRC_IDLE state. The UE staying in the RRC_IDLE state (re)selects a cell and checks system information or paging information, if necessary. This operation is called camping on a cell. Only when the UE staying in the RRC_IDLE state needs to establish the RRC connection, the UE establishes the RRC connection with the RRC layer of the E-UTRAN through a RRC connection procedure and transitions to the RRC_CONNECTED state. There are several cases where the UE remaining in the RRC_IDLE state needs to establish the RRC connection. For example, the cases may include an attempt of a user to make a phone call, an attempt to transmit data, or transmission of a response message when receiving a paging message from the E-UTRAN.

A non-access stratum (NAS) layer positioned over the RRC layer performs functions such as session management and mobility management.

The NAS layer shown in FIG. 7 is described in detail below.

The evolved session management (ESM) belonging to the NAS layer performs functions such as default bearer management and dedicated bearer management to control the UE to use a PS service from a network. The default bearer resources are allocated from a network when they are accessed to the network upon first access to a specific packet data network (PDN). In this instance, the network allocates an IP address available for the UE so that the UE can use a data service, and also allocates QoS of a default bearer. LTE roughly supports two types of bearers including a bearer with guaranteed bit rate (GBR) QoS characteristics for guaranteeing a specific bandwidth for data transmission/reception and a non-GBR bearer with best effort QoS characteristics without guaranteeing a bandwidth. The default bearer is allocated the non-GBR bearer. The dedicated bearer may be allocated a bearer with GBR or non-GBR QoS characteristics.

A bearer that the network allocates to the UE is referred to as an evolved packet service (EPS) bearer. When the network allocates the EPS bearer to the UE, the network assigns one ID. This ID is called an EPS bearer ID. One EPS bearer has QoS characteristics of a maximum bit rate (MBR) and/or a guaranteed bit rate (GBR).

UE's Network Selection Procedure

A UE being camped on a cell is described in detail as follow.

If the UE is switched on or intends to newly access a cell, the UE performs an initial cell search procedure including, for example, obtaining time and frequency synchronizations with the cell and detecting a physical layer cell identity of the cell. To this end, the UE may receive a downlink (DL) synchronization signal from the eNB to adjust the eNB to the DL synchronization, and may obtain information of a cell identity (ID), etc. If the UE is switched on, the PLMN is selected by the NAS. For the selected PLMN, associated RAT(s) may be set. The NAS provides the UE with a list of equivalent PLMNs, that an access stratum (AS) uses for the cell selection or the cell reselection, if available.

With the cell selection, the UE searches for a suitable cell of the selected PLMN and chooses a cell to provide available services. Further, the UE tunes to a control channel of the cell.

The choosing is known as "camping on the cell".

If the UE finds a more suitable cell according to a cell reselection criteria, the UE reselects the cell and camps on the cell. If the new cell does not belong to at least one tracking area in which the UE is registered, a location registration is performed.

The purpose of camping on a cell in an idle mode may be five:
- It enables the UE to receive system information from the PLMN.
- When registered and if the UE want to establish an RRC connection, the UE can perform this by initially accessing the network on a control channel of a cell on which the UE is camped.
- If the PLMN receives a call for the registered UE, the PLMN can know (in most cases) a set of tracking areas in which the UE is camped. Then, the PLMN can send a "paging" message for the UE on control channels of all the cells in this set of tracking areas. The UE will then receive the paging message because the UE is tuned to the control channel of the cell in one of the registered tracking areas, and the UE can respond on the control channel.
- It enables the UE to receive earthquake and tsunami warning system (ETWS) and commercial mobile alert system (CMAS) notifications.
- It enables the UE to receive MBMS services.

If the UE is camped on a cell, the UE regularly searches for a better cell according to the cell reselection criteria. If the better cell is found, the found cell is selected by the UE. A change of the cell may imply a change of the RAT.

For normal services, the UE camps on a suitable cell and tunes to a control channel of the cell so that the UE can:
- receive system information from the PLMN
- receive registration area information, for example, tracking area information from the PLMN
- receive other AS and NAS information
- if registered, the UE receives paging and notification messages from the PLMN and initiate transfer to a connected mode In the present disclosure, "barred cell" may refers to a cell on which a UE is not allowed to camp. "Camped on a cell" means that a UE has completed the cell selection/reselection process and has chosen a cell.

If the UE camps on a cell, the UE monitors system information and (in most cases) paging information on the corresponding cell. "Camped on any cell" means that the UE is in an idle mode and has completed the cell selection/reselection process and has chosen a cell irrespective of the PLMN identity. Further, a cell on which the UE camps is called a serving cell.

The description related to the PLMN selection is additionally described in 3GPP TS. 22.011 23.122, 36.304.

Restricted Local Operator Service (RLOS)

RLOS refers to service that allows a UE to temporarily access a network and to receive the configuration when the UE cannot register with the network in a normal method or cannot receive services due to a problem of the UE or the network.

For example, if there is an error in a SIM card installed in the UE, or if the configuration of the UE is wrong, it may be impossible for the UE to normally access the network. In this case, when the UE switches to an RLOS mode and attaches to the network, the UE informs that it requests the RLOS, and the network allows the access of the UE. In this instance, the network can provide appropriate configuration to the UE.

Afterward, if the configuration is completed, the UE terminates the RLOS mode and may perform again the network Attach and service Request in a general normal mode.

As mentioned above, the RLOS means that the UE accesses the network in an emergency under abnormal conditions and receives services over limited communication. In particular, in the RLOS condition, the network provides services in a state where it cannot properly authenticate the UE performing the RLOS access.

For example, if the SIM card of the UE is wrong, the network and the UE cannot properly configure the security until information on the SIM card is modified. Thus, in order to use the RLOS, if the UE accesses the network, the UE shall attempt to access the RLOS after completely recognizing that data transmitted by the UE is not secure, i.e., is at risk.

That is, the following method has been proposed to solve this.

At switch on, when in coverage of the last registered PLMN as stored in the SIM/USIM, the UE will attach to that network.

As an option, in automatic selection mode, when no EHPLMN list is present, the UE may select the HPLMN. When the EHPLMN list is present, the UE may select the highest priority EHPLMN among the available EHPLMNs. The operator shall be able to control the UE behaviour by USIM configuration.

As an option, if the UE is in manual network selection mode at switch-on
- if the last registered PLMN is unavailable and no equivalent PLMN is available,
- and the UE finds it is in coverage of either the HPLMN or an EHPLMN
- then the UE should register on the corresponding HPLMN or EHPLMN. The UE remains in manual mode.

If the UE returns to coverage of the PLMN on which it is already registered (as indicated by the registered PLMN stored in the SIM/USIM), the UE shall perform a location update to a new location area if necessary. As an alternative option to this, if the UE is in automatic network selection mode and it finds coverage of the HPLMN or any EHPLMN, the UE may register on the HPLMN (if the EHPLMN list is not present) or the highest priority EHPLMN of the available EHPLMNs (if the EHPLMN list is present) and not return to the last registered PLMN. If the EHPLMN list is present and not empty, it shall be used. The operator shall be able to control by USIM configuration whether an UE that supports this option shall follow this alternative behaviour.

NOTE: At switch-on and at recovery from lack of coverage, a UE in automatic network selection mode can attempt registration once the RPLMN or, if the above option is applicable, the HPLMN or EHPLMN is found on an access technology.

The default behaviour for a UE is to select the last registered PLMN.

If there is no registered PLMN stored in the SIM/USIM, or if this PLMN is unavailable and no equivalent PLMN is available, or the attempted registration fails, the UE shall follow one of the following procedures for network selection:

A) Automatic Network Selection Mode

The UE shall select and attempt registration on other PLMNs, if available and allowable, if the location area is not in the list of "forbidden LAs for roaming" and the tracking area is not in the list of "forbidden TAs for roaming" (see 3GPP TS 23.122 [3]), in the following order:

i) An EHPLMN if the EHPLMN list is present or the HPLMN (derived from the IMSI) if the EHPLMN list is not present for preferred access technologies in the order specified. In the case that there are multiple EHPLMNs present then the highest priority EHPLMN shall be selected. It shall be possible to configure a voice capable UE so that it shall not attempt registration on a PLMN if all cells identified as belonging to the PLMN do not support the corresponding voice service;

ii) each entry in the "User Controlled PLMN Selector with Access Technology" data field in the SIM/USIM (in priority order). It shall be possible to configure a voice capable UE so that it shall not attempt registration on a PLMN if all cells identified as belonging to the PLMN do not support the corresponding voice service;

iii) each entry in the "Operator Controlled PLMN Selector with Access Technology" data field in the SIM/USIM (in priority order). It shall be possible to configure a voice capable UE so that it shall not attempt registration on a PLMN if all cells identified as belonging to the PLMN do not support the corresponding voice service;

iv) other PLMN/access technology combinations with sufficient received signal quality (see 3GPP TS 23.122 [3]) in random order. It shall be possible to configure a voice capable UE so that it shall not attempt registration on a PLMN if all cells identified as belonging to the PLMN do not support the corresponding voice service;

v) all other PLMN/access technology combinations in order of decreasing signal quality. It shall be possible to configure a voice capable UE so that it shall not attempt registration on a PLMN if all cells identified as belonging to the PLMN do not support the corresponding voice service.

In the case of a UE operating in UE operation mode A or B, an allowable PLMN is one which is not in the "Forbidden PLMN" data field in the SIM/USIM. This data field may be extended in the ME memory (see clause 3.2.2.4). In the case of a UE operating in UE operation mode C, an allowable PLMN is one which is not in the "Forbidden PLMN" data field in the SIM/USIM or in the list of "forbidden PLMNs for GPRS service" in the ME.

If successful registration is achieved, the UE shall indicate the selected PLMN.

If registration cannot be achieved on any PLMN and at least one PLMN offering restricted local operator services has been found, the UE shall obtain user consent for RLOS service and use a list of default restricted local operator service PLMNs stored in the ME. If none of the default PLMNs offers restricted local operator service, the UE shall select an available PLMN offering restricted local operator services. If one of these networks is selected, the UE shall indicate the selected PLMN. If none are selected, the UE shall wait until a new PLMN is detected, or new location areas or tracking areas of an allowed PLMN are found which are not in the forbidden LA or TA list(s), and then repeat the procedure.

If registration cannot be achieved on any PLMN and no PLMN offering restricted local operator services is selected, the UE shall indicate "no service" to the user, wait until a new PLMN is detected, or new location areas or tracking areas of an allowed PLMN are found which are not in the forbidden LA or TA list(s), and then repeat the procedure. When registration cannot be achieved, different (discontinuous) PLMN search schemes may be used in order to minimize the access time while maintaining battery life, e.g. by prioritizing the search in favor of BCCH carriers which have a high probability of belonging to an available and allowable PLMN.

That is, the above method is a method that the UE obtains the user consent and attempts the RLOS service access on a network included in a separate list if the UE fails in the normal access attempt in the automatic network selection mode.

However, the above method has problems for the following reason.

Problem of consuming internal memory/processing resource of the UE because the UE additionally manages a separate list in addition to a network list managed for the normal access attempt Problem of generating additionally a service access failure time by determining whether a network included in a separate list is present or absent although the UE in the abnormal conditions shall be rapidly reconfigured through the RLOS service Problem that a separate list has to be used in spite of its low reliability even if the UE previously has the separate list because it is highly likely that the UE being in the abnormal conditions is caused by abnormal configuration information the UE has.

Accordingly, the present disclosure proposes a method that the UE rapidly accesses the network providing the RLOS service in the abnormal conditions and is reconfigured without the above-described problems.

Simply, an example of the RLOS service may include SIM card reconfiguration. The SIM card has information required to create security context between the user and the network, and calls, data services, etc. can no longer be used if an error occurs in the SIM card. In this case, after the UE has urgently accessed the RLOS service, the UE can correct the error of the SIM card and again use a normal service. In this case, the method can be processed as follows.

FIG. 9 is a flow chart illustrating a method for a UE to use a restricted local operator service (RLOS) in accordance with an embodiment of the present disclosure.

As shown in FIG. 9, a user 901 wants to use a general internet service, and thus a UE 902 sends an Attach Request to a 3GPP CN 904 (network) via a 3GPP RAN in 901.

Next, the UE and the network check whether the UE is valid, for example, verify information of a SIM card.

If it is assumed that authentication has failed due to an error of the SIM card, the network sends an Attach Reject to the UE in 902.

Afterwards, the UE and the network are disconnected.

Next, the UE attempts to access all networks allowed in an area in which the UE is located. However, if there is an error in the SIM card, the UE will fail to access all the networks.

In this instance, the UE receives, from each cell, that each cell has a network supporting the RLOS, via SIB, etc., in S903.

Next, the UE outputs information that there is a network supporting the RLOS service in S904.

The UE may display a user screen on a display. This is described in detail below with reference to FIG. 10.

FIG. 10 illustrates an example where a UE outputs a user screen on a display in accordance with an embodiment of the present disclosure.

As illustrated in FIG. 10, a UE 1000 according to an embodiment of the present disclosure may display a user screen through a display 1050.

The UE 1000 may display the user screen on the entire/part of the display 1050. The UE 1000 may display/notify the user screen through a separate pop-up window on the display 1050.

The user screen may be configured such that whether to use RLOS service can be selected. For example, the user screen may include a first window 1051 which displays information that access to normal internet service has been rejected, displays information that a PLMN providing/supporting RLOS has been searched, and asks whether to access RLOS. The user screen may further include an "OK" tab 1052 for the RLOS access and a "Cancel" tab 1053 for the RLOS access.

For example, if a touch input for the "OK" tab is received from the user, the UE may recognize the touch input for the "OK" tab as user's RLOS access accept. For example, if a touch input for the "Cancel" tab is received from the user, the UE may recognize the touch input for the "Cancel" tab as user's RLOS access reject.

That is, if the UE recognizes the RLOS access accept as the touch input for the "OK" tab from the user, the UE may select RLOS service. This may be selected from a separate configuration of the UE and may be utilized in the access based on this selection value.

The UE may display, on the display 1050, a first icon 1054 indicating that access to all the networks has failed.

Referring again to FIG. 9, after the step S904, the UE receives the use selection of RLOS from the user in S905.

Next, the UE stars/initiates Attach for RLOS service on 3GPP CN (network) in S906.

Next, the 3GPP CN (network) acknowledges the Attach for RLOS service of the UE in S907.

If the Attach for RLOS service is accepted by the network, the UE may inform the user that the Attach for RLOS service has been accepted. This is described in detail below with reference to FIG. 11.

FIG. 11 illustrates an example where a UE displays information indicating, that Attach for RLOS service has been accepted, through a display in accordance with an embodiment of the present disclosure.

As illustrated in FIG. 11, if the Attach for RLOS service is accepted by the network, a UE 1100 may display, on a display 1150, a second icon 1155 indicating that the Attach for RLOS service has been accepted.

The second icon 1155 may be displayed on an upper bar on the display 1150.

Although not shown in FIG. 11, the UE 1100 may display a text indicating that the Attach for RLOS service has been accepted, instead of the second icon 1155. Further, the UE 1100 may inform the user of information indicating, that the Attach for RLOS service has been accepted, through a combination of color and shade, instead of the second icon 1155.

In addition, the UE 1100 may display a pup-up window 1151 indicating that the Attach for RLOS service has been accepted by the network. The pup-up window 1151 may include a first text ("RLOS Service is ongoing") indicating that the Attach for RLOS service has been accepted and the UE has accessed RLOS service, a second text ("What do you want?") that inquires the user's selection, a third text ("1. Call RLOS center") 1152 that inquires whether to initiate a call to the RLOS center, a fourth text ("2. Connected RLOS server") 1153 that inquires whether to display the connected RLOS server (PLMN), and a fifth text ("3. Etc") 1154 that inquires whether to display other information. If a touch input for the third text 1152 is received, the UE may initiate a call to the connected RLOS center. If a touch input for the fourth text 1153 is received, the UE may display information related to the RLOS server on the display 1150.

Although not shown in FIG. 11, the UE may display default information related to the access of RLOS on the display. The UE may display, on the display, a list of default RLOS services or a list of available RLOS services provided according to the Attach accept.

Referring again to FIG. 9, the UE and the user are provided with RLOS service from an RLOS service entity 906 and use the RLOS service in S908.

For example, if a voice call is used, an RLOS counselor of the operator may start a call with the user and inform the user about how to change configuration of the UE. If data communication is used, configuration information of the UE may be automatically transmitted from the network to the UE.

The UE may display information related to an ongoing state of RLOS service through the display, and this is described in detail below with reference to FIG. 12.

FIG. 12 illustrates an example where a UE displays ongoing state information for RLOS service on a display in accordance with an embodiment of the present disclosure.

As illustrated in FIG. 12, a UE 1200 may display ongoing state information for RLOS service 1251 through a display 1250.

In the same manner as FIG. 11, the UE 1200 may display, on the display 1250, a second icon 1255 indicating that the UE has accessed RLOS service.

The UE 1200 may display, on the display 1250, a text ("RLOS Service is ongoing") indicating that the UE has accessed RLOS service, and a text ("SIM reprogramming is ongoing") indicating that programming for a SIM card stored in a memory of the UE is ongoing.

Although not shown in FIG. 11, the UE may display a list of RLOS services or a list of networks providing RLOS services. The UE may display other RLOS services or networks excluding some RLOS services or networks, that are pre-configured to be deactivated, from the RLOS services or the networks providing RLOS services. Some RLOS services or networks, that are pre-configured to be deactivated, may be pre-configured by the user. If a request for the pre-configured deactivation RLOS services or networks among the RLOS services or the networks providing RLOS service is received from the user, the UE may reject the request and display whether to reject the request and the reject content on the display.

Referring again to FIG. 9, if the RLOS service is completed, the UE and the network detach the RLOC access in S909.

The UE may inform, that the access for RLOS service has been detached, through the displays 1050, 1150, and 120 described with reference to FIGS. 10 to 12

Next, the UE initiates/requests again the access for using internet service provided by an internet entity 905 in S910.

Afterwards, if the authentication is successful, the network acknowledges access for internet service to the UE in S911.

Finally, the user is provided with regular internet service from the internet RLOS entity through the UE and uses the regular internet service in S912.

The UE may inform the user that the use of RLOS service has been terminated, and this is described in detail below with reference to FIG. 13.

FIG. 13 illustrates an example where a UE displays information indicating, that the use of RLOS service has been terminated, on a display in accordance with an embodiment of the present disclosure.

As illustrated in FIG. 13, according to an embodiment of the present disclosure, if the use of RLOS service is terminated, a UE 1300 may display, on a display 1350, information indicating that the use of RLOS service has been terminated.

For example, if the use of RLOS service is terminated, the UE may indicate that the use of RLOS service has been terminated through a blank screen.

In the above procedure, each cell may inform whether the cell supports the RLOS, via SIB, etc.

The following is a procedure of informing the UE about whether each cell (3GPP RAN) supports the RLOS via the SIB, etc.

5.2.2.7 Actions upon reception of the SystemInformationBlockType1 message

Upon receiving the SystemInformationBlockType1 or SystemInformationBlockType1-BR either via broadcast or via dedicated signalling, the UE shall:

1> if the cellAccessRelatedInfoList contains an entry with the PLMN-Identity of the selected PLMN:

2> in the remainder of the procedures use plmn-IdentityList, trackingAreaCode, and cellIdentity for the cell as received in the corresponding cellAccessRelatedInfoList containing the selected PLMN;

1> if in RRC_IDLE or in RRC_CONNECTED while T311 is running; and

1> if the UE is a category 0 UE according to TS 36.306 [5]; and

1> if category0Allowed is not included in SystemInformationBlockType1:

2> consider the cell as barred in accordance with TS 36.304 [4];

1> if in RRC_CONNECTED while T311 is not running, and the UE supports multi-band cells as defined by bit 31 in featureGroupindicators:

2> disregard the freqBandIndicator and multiBandInfoList, if received, while in RRC_CONNECTED;

2> forward the cellIdentity to upper layers;

2> forward the trackingAreaCode to upper layers;

1> else:

2> if the frequency band indicated in the freqBandIndicator is part of the frequency bands supported by the UE and it is not a downlink only band; or 2> if the UE supports multiBandInfoList, and if one or more of the frequency bands indicated in the multiBandInfoList are part of the frequency bands supported by the UE and they are not downlink only bands:

3> forward the cellIdentity to upper layers;

3> forward the trackingAreaCode to upper layers;

3> forward the ims-EmergencySupport or RLOS_Support to upper layers, if present;

3> forward the eCallOverIMS-Support to upper layers, if present;

3> if, for the frequency band selected by the UE (from freqBandIndicator or multiBandInfoList), the freqBandInfo or the multiBandInfoList-v10j0 is present and the UE capable of multiNS-Pmax supports at least one additionalSpectrumEmission in the NS-PmaxList within the freqBandInfo or multiBandInfoList-v10j0:

4> apply the first listed additionalSpectrumEmission which it supports among the values included in NS-PmaxList within freqBandInfo or multiBandInfolist-v10j0;

4> if the additionalPmax is present in the same entry of the selected additionalSpectrumEmission within NS-PmaxList:

5> apply the additionalPmax;

4> else:

5> apply the p-Max;

3> else:

4> apply the additionalSpectrumEmission in SystemInformationBlockType2 and the p-Max;

2> else:

3> consider the cell as barred in accordance with TS 36.304 [4]; and

3> perform barring as if intraFreqReselection is set to notAllowed, and as if the csg-Indication is set to FALSE;

The present disclosure proposes a method capable of reducing a service disconnect time and providing normal services by allowing any UE to rapidly select and register a network capable of providing RLOS service to the UE if all registration attempts for PLMNs selected by the UE fail in a procedure in which the UE selects a network capable of providing services to the UE.

To this end, the present disclosure proposes to select a network, that the UE attempts to access in order to receive the RLOS service, in the following method and to attempt the network registration.

First Embodiment

In a first embodiment, in order for a UE to register with a network capable of providing a normal service to the UE, the UE selects the network and then attempts the registration in the following order.

i) An EHPLMN if the EHPLMN list is present or the HPLMN (derived from the IMSI) if the EHPLMN list is not present for preferred access technologies in the order specified. In the case that there are multiple EHPLMNs present then the highest priority EHPLMN shall be selected. It shall be possible to configure a voice capable UE so that it shall not attempt registration on a PLMN if all cells identified as belonging to the PLMN do not support the corresponding voice service.

ii) Each entry in the "User Controlled PLMN Selector with Access Technology" data field in the SIM/USIM (in priority order). It shall be possible to configure a voice capable UE so that it shall not attempt registration on a PLMN if all cells identified as belonging to the PLMN do not support the corresponding voice service.

iii) Each entry in the "Operator Controlled PLMN Selector with Access Technology" data field in the SIM/USIM (in priority order). It shall be possible to configure a voice capable UE so that it shall not attempt registration on a PLMN if all cells identified as belonging to the PLMN do not support the corresponding voice service.

iv) Other PLMN/access technology combinations with sufficient received signal quality (see 3GPP TS 23.122 [3]) in random order. It shall be possible to configure a voice capable UE so that it shall not attempt registration on a PLMN if all cells identified as belonging to the PLMN do not support the corresponding voice service.

v) All other PLMN/access technology combinations in order of decreasing signal quality. It shall be possible to configure a voice capable UE so that it shall not attempt registration on a PLMN if all cells identified as belonging to the PLMN do not support the corresponding voice service.

If the UE attempts registration on the PLMN in the order described above and then does not succeed in registering on any PLMN, the UE searches whether there are PLMNs providing RLOS service among the PLMNs.

If there are PLMNs providing the RLOS service, the UE additionally searches whether there is a PLMN included in a PLMN list (RLOS PLMN list) for the RLOS service among the PLMNs.

If there is a PLMN included in the RLOS PLMN list, the UE additionally informs a user that a PLMN supporting the RLOS service has been found. If there is user consent, the UE proceeds with a registration procedure for the RLOS service on the PLMN included in the RLOS PLMN list among the found PLMNs supporting the RLOS service.

If there is no PLMN included in the RLOS PLMN list among the found PLMNs supporting the RLOS service, the UE does not perform the registration attempt on the found PLMNs supporting the RLOS service.

The following is an example of the above operation of the UE.

If registration cannot be achieved on any PLMN and at least one PLMN offering restricted local operator services has been found, the UE shall obtain user consent for RLOS service. If a user consents to the use of RLOS service, and the found PLMN offering restricted local operator service is included in the list of restricted local operator service PLMNs stored in the SIM/ME, the UE shall select the found PLMNs and try to registration for RLOS service. If the user does not consent to the use of RLOS service, the UE shall not select the found PLMNs for registration of RLOS service. If no PLMN offering restricted local operator service has been found, the UE shall not select a PLMN for registration for RLOS service. If none of the default PLMNs offers restricted local operator service, the UE shall select an available PLMN offering restricted local operator services. If one of these networks is selected, the UE shall indicate the selected PLMN. If none are selected, the UE shall wait until a new PLMN is detected, or new location areas or tracking areas of an allowed PLMN are found which are not in the forbidden LA or TA list(s), and then repeat the procedure.

1-1 Embodiment

In addition to a process of obtaining the user consent in the first embodiment, in a 1-1 embodiment, the UE can additionally obtain information related to whether the UE is able to attempt a registration procedure for RLOS service on all the found RLOS PLMNs or information related to whether the UE is able to attempt a registration procedure for RLOS service only on a specific RLOS PLMN selected by the user.

If it is informed that the UE is able to attempt the registration procedure for RLOS service on all the found RLOS PLMNs, the UE automatically attempts the registration on each RLOS PLMN until the registration for RLOS service is successful.

If the user consents to the registration procedure for RLOS service only on some PLMNs of the RLOS PLMNs found by the UE, the UE automatically attempts the registration on each RLOS PLMN until the registration for RLOS service only on the consented PLMNs is successful.

If registration cannot be achieved on any PLMN and at least one PLMN offering restricted local operator services has been found, the UE shall obtain user consent for RLOS service and tries to access a PLMN in list of default restricted local operator service PLMNs stored in the ME. If none of the PLMNs in the RLOS PLMN list offers restricted local operator service, and if there is a detected PLMNs which are not included in the RLOS PLMN list but offers RLOS service, the UE will ask whether user consents to the RLOS service or not. If the user consents to the RLOS service, the UE will start to access the RLOS PLMNs. If one of these networks is selected, the UE shall indicate the selected PLMN. If none are selected, the UE shall wait until a new PLMN is detected, or new location areas or tracking areas of an allowed PLMN are found which are not in the forbidden LA or TA list(s), and then repeat the procedure.

Alternatively, in the above process, if a plurality of RLOS PLMNs is found, the user selects one RLOS PLMN at a time, and the UE attempts a registration for RLOS service on the selected RLOS PLMN. If the registration on the PLMN fails, when the user selects another RLOS PLMN, the UE waits for user consent for an attempt of the new RLOS PLMN each time and attempts a registration procedure for the consented PLMN only when the UE obtains the user consent each time.

If registration cannot be achieved on any PLMN and at least one PLMN offering restricted local operator services has been found, the UE shall obtain user consent for RLOS service and tries to access a PLMN in list of default restricted local operator service PLMNs stored in the ME. If the try fails and another PLMN is available in the list, the UE shall obtain another user consent for RLOS and tries to access another PLMN. This process of user consent and trial for RLOS service repeats until there is no more PLMN in the RLOS PLMN list or the UE trial is successful. If none of the default PLMNs offers restricted local operator service, the UE shall select an available PLMN offering restricted local operator services. If one of these networks is selected, the UE shall indicate the selected PLMN. If none are selected, the UE shall wait until a new PLMN is detected, or new location areas or tracking areas of an allowed PLMN are found which are not in the forbidden LA or TA list(s), and then repeat the procedure.

That is, because the RLOS service occurs in a state where security context between the UE and the network is not properly achieved, each time the UE attempts the access to a new PLMN, the UE receives the user consent each time so that the user recognizes it, or the UE attempt RLOS service access for only lists specified by the user, thereby reducing a risk on security.

If registration cannot be achieved on any PLMN and at least one PLMN offering restricted local operator services has been found, the UE shall obtain user consent for RLOS service and tries to access a PLMN in list of default restricted local operator service PLMNs stored in the ME. If the try fails and another PLMN is available in the list, the UE shall obtain another user consent for RLOS and tries to access another PLMN. This process of user consent and trial for RLOS service repeats until there is no more PLMN in the RLOS PLMN list or the UE trial is successful. If none of the default PLMNs offers restricted local operator service, the UE shall select not a detected PLMN which is not included in the RLOS PLMN list but detected as to support RLOS service. That is, trying to access RLOS service is limited to the PLMNs which is included in the RLOS PLMN list. If none are selected, the UE shall wait until a new PLMN is detected, or new location areas or tracking areas of an allowed PLMN are found which are not in the forbidden LA or TA list(s), and then repeat the procedure.

However, in the above process, in order to prevent the UE from wasting power without the need, if an RLOS PLMN list is available, the use of the RLOS PLMN list may be limited to a case where the UE finds the RLOS service PLMN.

Further, in the above process, the PLMN attempting the RLOS registration may be additionally limited to being included in the RLOS PLMN list.

According to the 1-1 embodiment, the user selects RLOS with good service quality among RLOSs and accesses only a PLMN of a predetermined operator with high security, thereby increasing the security when receiving RLOS service and normal service.

According to the 1-1 embodiment, an example where the UE receives a selection input of RLOS service from the user is described below with reference to FIGS. 14 to 16.

FIGS. 14 to 16 illustrate an example where a UE receives selection of RLOS service in accordance with an embodiment of the present disclosure.

As illustrated in FIGS. 14 to 16, according to an embodiment of the present disclosure, a UE 1400 may display, on displays 1450, 1550 and 1650, first texts ("Network Selection Failed. Following RLOS PLMN is found") 1451, 1551 and 1651 indicating that network selection/registration for normal internet service has been rejected/failed and that PLMN providing RLOS has been searched.

The UE may display, on the displays, first tabs 1452 and 1552 indicating that Attach for RLOS service for all the searched PLMNs can be initiated, second tabs 1453 and 1553 indicating that Attach for RLOS service for PLMN A can be initiated, third tabs 1454 and 1554 indicating that Attach for RLOS service for PLMN B can be initiated, and fourth tabs 1455 and 1555 indicating that Attach for RLOS service for PLMN C can be initiated.

The UE may display, on the displays, first switches 1457A, 1557A and 1657A for receiving a user's selection that allows Attach for RLOS service for all the PLMNs to be initiated, second switches 1457B, 1557B and 1657B for receiving a user's selection that allows Attach for RLOS service for the PLMN A to be initiated, third switches 1457C, 1557C and 1657C for receiving a user's selection that allows Attach for RLOS service for the PLMN B to be initiated, and fourth switches 1457D, 1557D and 1657D for receiving a user's selection that allows Attach for RLOS service for the PLMN C to be initiated.

After at least one of the first to fourth switches is selected, the UE may then display, on the displays, OK tabs 1456, 1556 and 1656 for receiving a user's input that consents the Attach initiation for RLOS service of the PLMN corresponding to the selected switch, and Cancel tabs 1458, 1558 and 1658 for receiving a user's input that rejects the Attach initiation for RLOS service of the PLMN.

If the UE selects at least one of the first to fourth switches and then receives a user's input that consents the Attach initiation for RLOS service of the PLMN corresponding to the selected switch, the UE may initiate Attach for RLOS service of the PLMN corresponding to the switch selected among the first to fourth switches. For example, if the UE receives a user's input, that consents the Attach initiation for RLOS service of all the PLMNs, through the first switch, the UE may sequentially initiate Attach for RLOS service of PLMN A, PLMN B, and PLMN C that are all the searched PLMNs. As another example, if the UE receives a user's input, that consents the Attach initiation for RLOS service of the PLMN A, through the second switch, the UE may initiate Attach for RLOS service of the searched PLMN A. As another example, if the UE receives a user's input, that consents the Attach initiation for RLOS service of the PLMN B, through the third switch, the UE may initiate Attach for RLOS service of the searched PLMN B. As another example, if the UE receives a user's input, that consents the Attach initiation for RLOS service of the PLMN C, through the fourth switch, the UE may initiate Attach for RLOS service of the searched PLMN C.

As illustrated in FIG. 14, the UE 1400 may receive a selection for the Attach initiation for RLOS service of the PLMN B and the PLMN C as a user's touch input for the third switch 1457C and the fourth switch 1457D displayed through the display.

As illustrated in FIG. 15, the UE 1500 may receive, from the user, a selection for the attach initiation for RLOS service of all the PLMN A, the PLMN B, and the PLMN C as a user's touch input for the first switch 1457A displayed through the display.

As illustrated in FIG. 16, the UE 1600 may receive a selection for the attach initiation for RLOS service of the PLMN A, that is one PLMN, as a user's touch input for the second switch 1457B displayed through the display.

In the 1-1 embodiment, the UE may sequentially initiate the attach for RLOS service of one PLMN based on a predetermined condition (e.g., a priority of the PLMNs or a signal strength measured between the respective PLMNs and the UE, etc.) in at least one PLMN selected through a selection input for at least one of the first to fourth switches.

In the 1-1 embodiment, a process of receiving the user's selection is not limited to a time at which RLOS service is provided, and can be pre-configured using a variety types of information stored in a memory of the UE. The process may also be configured by previously obtaining information on any place (region or country) and using the information.

1-2 Embodiment

In the first and 1-1 embodiments, priority order information for each PLMN included in a RLOS PLMN list managed by the UE may be preferably included in the RLOS PLMN list.

In this case, in 1-2 embodiment, the UE first selects a high priority PLMN and attempts to register it, if there is a plurality of PLMN candidates in a process for selecting a PLMN for registration for RLOS in order to receive RLOS service.

If registration cannot be achieved on any PLMN and at least one PLMN offering restricted local operator services has been found, the UE shall obtain user consent for RLOS service and use a list of default restricted local operator service PLMNs stored in the ME. When the UE uses the list of restricted local operator service PLMNs, the UE tries to access the PLMN in the order of priority information associated to the PLMN. That is, the UE tries to access high priority RLOS PLMN before tries to access lower priority RLOS PLMN. In this case, the UE only tries RLOS PLMNs which is found. If none of the default PLMNs offers restricted local operator service, the UE shall select an available PLMN offering restricted local operator services. If one of these networks is selected, the UE shall indicate the selected PLMN. If none are selected, the UE shall wait until a new PLMN is detected, or new location areas or tracking areas of an allowed PLMN are found which are not in the forbidden LA or TA list(s), and then repeat the procedure.

However, configuring the priority order information as described above consumes additional resources in the UE. Thus, for the purpose of efficiency of the implementation, the high priority of the PLMN may also be assumed as that it first appears in the RLOS PLMN list.

According to the 1-2 embodiment, the user can preferentially select a PLMN, that is previously configured as high security, among the plurality of PLMNs, and thus manufacturers/network service providers of the SIM card can determine in advance that which service is used to provide the RLOS to the user. Therefore, there is also an advantage in terms of service marketing.

1-3 Embodiment

RLOS service is for emergency use. Thus, it is more likely that information itself on a PLMN capable of supporting the RLOS service is unavailable for the UE.

Alternatively, even if the UE has a RLOS PLMN list, it is highly likely that this information is not up to date. Thus, it is highly likely that the UE finds a PLMN that is not included in the RLOS PLMN list but can provide the RLOS service.

Accordingly, even in this case, a method for, by the UE, stably selecting a PLMN for RLOS shall be supported.

In 1-3 embodiment, as a procedure supporting the above method, if the UE fails in all registrations for a normal service, if the UE has a RLOS PLMN list, and if the UE searches for PLMNs included in the RLOS PLMN list and finds a PLMN, the UE attempts RLOS service registration for the PLMNs.

That is, the 1-3 embodiment illustrates an example of a procedure for selecting some PLMNs according to specific conditions in the searched PLMN list and a previously stored PLMN list.

If all the attempts for the PLMNs have failed, or if the PLMN included in the RLOS PLMN list has not been found, the UE additionally searches for the PLMN supporting the RLOS service and attempts the RLOS service registration.

That is, separately from a process for getting the user consent for attempting registration on the PLMN included in the existing RLOS PLMN list, the UE gets the user consent for the corresponding process before attempting the registration for RLOS on the PLMN not included in the RLOS PLMN list, and attempts the registration for RLOS even when there is the user consent.

If registration cannot be achieved on any PLMN, the UE shall obtain user consent for RLOS service. If the user consents for RLOS and if a list of default restricted local operator service PLMNs (RLOS PLMN list) is available, the UE tries registration for RLOS for the PLMNs in the RLOS PLMN list. If registration for RLOS service was not achieved for the PLMNs in the RLOS PLMN list or if no PLMN in the RLOS PLMN list is found, the UE shall search for PLMNs supporting RLOS service, which are not in the list of RLOS PLMN list. If such PLMNs are found, the UE requests for user consent. If the user agree RLOS registration attempt for this found PLMNs, the UE shall try RLOS registration attempt for this PLMNs. If one of these networks is selected, the UE shall indicate the selected PLMN. If none are selected, the UE shall wait until a new PLMN is detected, or new location areas or tracking areas of an allowed PLMN are found which are not in the forbidden LA or TA list(s), and then repeat the procedure.

However, in the above process, if HPLMN of the UE constructs the RLOS PLMN list considering security threats, the HPLMN can forbid the UE from attaching to the RLOS service except PLMNs specified by the HPLMN.

In this case, even if the UE cannot register all the PLMNs included in the RLOS PLMN list and has additionally found the PLMN, outside the RLOS PLMN list, supporting the RLOS service, the HPLMN shall be able to control the RLOS registration attempt for RLOS PLMN, outside the RLOS PLMN list, additionally found by the user.

Thus, the HPLMN informs the UE of information about whether the UE can attempt access/registration for the PLMN supporting the RLOS outside the RLOS PLMN list, and the UE attempts access/registration for the additionally found PLMN supporting the RLOS outside the RLOS PLMN list only when this has been allowed.

If registration cannot be achieved on any PLMN and at least one PLMN offering restricted local operator services has been found, the UE shall obtain user consent for RLOS service and use a list of default restricted local operator service PLMNs (RLOS PLMN list) stored in the ME. If none of the default PLMNs offers restricted local operator service, and if the UE is configured to be allowed to attempt for RLOS registration/service for the PLMN not listed in the RLOS PLMN list, the UE shall select an available PLMN offering restricted local operator services and try to RLOS registration for the PLMN. If the UE is configured to be not allowed to attempt for RLOS registration/service for the PLMN not listed in the RLOS PLMN list, the UE shall not attempt for RLOS registration/service for the PLMN not listed in the RLOS PLMN list. If one of these networks is selected, the UE shall indicate the selected PLMN. If none are selected, the UE shall wait until a new PLMN is detected, or new location areas or tracking areas of an allowed PLMN are found which are not in the forbidden LA or TA list(s), and then repeat the procedure.

Second Embodiment

If RLOS service is provided, an operator to which a UE is subscribed can limit a wireless technology that the UE can use, in order to prevent the leakage of information of the UE. That is, the home operator identifies security threats for each of wireless technologies provided by other operators, and then can specify, based on this, that which operator allows the UE to access RLOS service, and that which wireless access technology of the operator can attempt the RLOS service. This is because as each wireless access technology evolves, the vulnerabilities inherent in security are different, and because circumstances under which a network of each operator is deployed are different.

Accordingly, in the second embodiment, the present disclosure suggests that the UE manages PLMN information and RAT, i.e., radio access technology information allowed to each PLMN in addition to a RLOS PLMN list when managing the RLOS PLMN list.

In this case, the UE attempts the access to receive RLOS service for only the RAT allowed to each PLMN in each item of the RLOS PLMN list, and does not attempt the RLOS service for combinations of other PLMNs and RAT.

Third Embodiment

In a third embodiment together with the second embodiment, if a UE is in a manual network selection mode, the UE shows a user a list of searched PLMNs. In this instance, the UE can additionally show whether each PLMN supports RLOS service, in addition to the list of searched PLMNs.

If the user selects any PLMN, the UE attempts registration on the corresponding PLMN. If the registration fails, the UE checks whether the corresponding PLMN supports RLOS service. If the PLMN supports the RLOS service, the UE additionally asks the user to access the RLOS service for the PLMN. If the user accepts it, the UE additionally attempts registration for the RLOS service.

Alternatively, if the user selects a PLMN, the UE in the manual network selection mode attempts registration on the PLMN. However, if the registration fails, the UE shows PLMNs that have not been yet registered among the searched PLMNs, and attempts another registration on a PLMN selected by the user. If such a manner proceeds and the registration on all PLMNs among the searched PLMNs fails, the UE checks whether a PLMN supporting RLOS among the searched PLMNs is available or unavailable. The UE shows it to the user and attempts RLOS PLMN registration on the selected PLMN if the user selects it.

In the above process, if the UE has a RLOS PLMN list, the UE can show the user only searched PLMNs informing the support of RLOS service via SIB among the PLMNs included in the above process, and the PLMN selected by the user can operate.

In the above, the RLOS PLMN list may be previously stored in a SIM card or a ME of the UE.

Fourth Embodiment

A current network selection includes an automatic PLMN selection mode and a manual PLMN selection mode. If normal service registration for an internet service on an actually found PLMN fails even when a UE is in the automatic PLMN selection mode, the UE can perform an Attach for RLOS service only when the UE obtains user consent.

Accordingly, as another method of the present disclosure, a fourth embodiment proposes a method that if the UE in the automatic PLMN network selection mode or the manual PLMN network selection mode selects RLOS PLMN for RLOS service, the UE transitions to a new state, for example, an RLOS network selection mode, and in this state, performs the Attach for RLOS and RLOS service, and if this process ends, the UE originally returns to the automatic PLMN network selection mode or the manual PLMN network selection mode.

Further, if registration on the PLMN selected by the user in the manual mode fails, the UE additionally checks whether the PLMN selected by the corresponding user supports RLOS. If the PLMN supports RLOS, the UE additionally asks the user whether it wants to attempt RLOS. If the user selects the RLOS, the UE performs the Attach for RLOS for the corresponding PLMN. If the user does not select the RLOS, the UE does not act on a separate operation until the user selects another PLMN.

For example, the following method may be considered.

A) Automatic Network Selection Mode

The UE shall select and attempt registration on other PLMNs, if available and allowable, if the location area is not in the list of "forbidden LAs for roaming" and the tracking area is not in the list of "forbidden TAs for roaming" (see 3GPP TS 23.122 [3]), in the following order:

i) An EHPLMN if the EHPLMN list is present or the HPLMN (derived from the IMSI) if the EHPLMN list is not present for preferred access technologies in the order specified. In the case that there are multiple EHPLMNs present then the highest priority EHPLMN shall be selected. It shall be possible to configure a voice capable UE so that it shall not attempt registration on a PLMN if all cells identified as belonging to the PLMN do not support the corresponding voice service.

ii) Each entry in the "User Controlled PLMN Selector with Access Technology" data field in the SIM/USIM (in priority order). It shall be possible to configure a voice capable UE so that it shall not attempt registration on a PLMN if all cells identified as belonging to the PLMN do not support the corresponding voice service.

iii) Each entry in the "Operator Controlled PLMN Selector with Access Technology" data field in the SIM/USIM (in priority order). It shall be possible to configure a voice capable UE so that it shall not attempt registration on a PLMN if all cells identified as belonging to the PLMN do not support the corresponding voice service.

iv) Other PLMN/access technology combinations with sufficient received signal quality (see 3GPP TS 23.122 [3]) in random order. It shall be possible to configure a voice capable UE so that it shall not attempt registration on a PLMN if all cells identified as belonging to the PLMN do not support the corresponding voice service.

v) All other PLMN/access technology combinations in order of decreasing signal quality. It shall be possible to configure a voice capable UE so that it shall not attempt registration on a PLMN if all cells identified as belonging to the PLMN do not support the corresponding voice service.

In the case of a UE operating in UE operation mode A or B, an allowable PLMN is one which is not in the "Forbidden PLMN" data field in the SIM/USIM. This data field may be extended in the ME memory (see clause 3.2.2.4). In the case of a UE operating in UE operation mode C, an allowable PLMN is one which is not in the "Forbidden PLMN" data field in the SIM/USIM or in the list of "forbidden PLMNs for GPRS service" in the ME.

If successful registration is achieved, the UE shall indicate the selected PLMN.

If registration cannot be achieved on any PLMN and at least one PLMN offering restricted local operator services has been found, the UE shall offer the user to select one of these networks (i.e. user consent for RLOS PLMN selection is necessary). If one of these networks is selected, the UE shall switch to RLOS network selection mode and indicate the selected PLMN. If none are selected, the UE shall wait until a new PLMN is detected, or new location areas or tracking areas of an allowed PLMN are found which are not in the forbidden LA or TA list(s), and then repeat the procedure.

If registration cannot be achieved on any PLMN and no PLMN offering restricted local operator services has been found, the UE shall indicate "no service" to the user, wait until a new PLMN is detected, or new location areas or tracking areas of an allowed PLMN are found which are not in the forbidden LA or TA list(s), and then repeat the procedure.

When registration cannot be achieved, different (discontinuous) PLMN search schemes may be used in order to minimize the access time while maintaining battery life, e.g. by prioritising the search in favour of BCCH carriers which have a high probability of belonging to an available and allowable PLMN.

B) Manual Network Selection Mode

The UE shall indicate PLMNs, including "Forbidden PLMNs", which are available. If there are none, this shall also be indicated. The HPLMN of the user may provide on the USIM additional information about the available PLMNs, if this is provided then the UE shall indicate that information to the user. This information, provided as free text may include:

Preferred partner,
Roaming agreement status,
Supported services

Furthermore, the UE may indicate whether the available PLMNs are present on one of the PLMN selector lists (e.g. EHPLMN, User Controlled, Operator Controlled or Forbidden) as well as not being present on any of the lists.

For the purpose of presenting the names of the available PLMNs to the user, the ME shall use the USIM defined names if available or other PLMN naming rules in priority order as defined in 3GPP TS 22.101 [7] (Country/PLMN indication).

Any available PLMNs shall be presented in the following order:

i) HPLMN (if the EHPLMN list is not present); or if one or more of the EHPLMNs are available then based on an optional data field on the USIM either the highest priority available EHPLMN is to be presented to the user or all available EHPLMNs are presented to the user in priority order; if the data field is not present, then only the highest priority available EHPLMN is presented;

ii) PLMNs contained in the "User Controlled PLMN Selector" data field in the SIM/USIM (in priority order);

iii) PLMNs contained in the "Operator Controlled PLMN Selector" data field in the SIM/USIM (in priority order);

iv) Other PLMN/access technology combinations with sufficient received signal level (see 3GPP TS 23.122 [3]) in random order;

v) All other PLMN/access technology combinations in order of decreasing signal strength.

If a PLMN does not support voice services, then this shall be indicated to the user.

The user may select the desired PLMN and the UE shall attempt registration on this PLMN (This may take place at any time during the presentation of PLMNs).

If registration cannot be achieved on the selected PLMN and if the selected PLMN offers restricted local operator services, the UE shall offer the user to select RLOS network selection mode for the selected network. If the user selects RLOS network selection mode for the selected network, the UE shall switch to RLOS network selection mode and indicate the selected PLMN.

If the registration cannot be achieved on any PLMN, the UE shall indicate "No Service". The user may then select and attempt to register on another or the same PLMN following the above procedure. The UE shall not attempt to register on a PLMN which has not been selected by the user.

Once the UE has registered on a PLMN selected by the user, the UE shall not automatically register on a different PLMN unless:

i) The new PLMN is declared as an equivalent PLMN by the registered PLMN;

or, ii) The user selects automatic mode.

If a PLMN is selected but the UE cannot register on it because registration is rejected with the cause "PLMN not allowed", the UE shall add the PLMN to the "Forbidden PLMN" list (clause 3.2.2.4.1). The UE shall not re-attempt to register on that network unless the same PLMN is selected again by the user.

If a PLMN is selected but the UE cannot register for PS services on it because registration is rejected with the cause "GPRS services not allowed in this PLMN", the UE shall not re-attempt to register for E-UTRAN or UTRAN PS or GERAN PS on that network. The PLMN is added to the list "Forbidden PLMN's for GPRS services". The UE shall not re-attempt to register for E-UTRAN or UTRAN PS or GERAN PS on that network unless the same PLMN is selected again by the user. The reception of the cause "GPRS services not allowed in this PLMN", does not affect the CS service.

For requirements to restrict the access of a UE to one or several specific RATs see section 7.1.

If a PLMN is selected but the UE cannot register on it for other reasons, the UE shall, upon detection of a new LA (not in a forbidden LA list) of the selected PLMN, attempt to register on the PLMN.

If the UE is registered on a PLMN but loses coverage, different (discontinuous) carrier search schemes may be used to minimize the time to find a new valid BCCH carrier and maintain battery life, e.g. by prioritizing the search in favour of BCCH carriers of the registered PLMN.

C) RLOS Network Selection Mode

In this mode, the UE shall attempt to register the selected PLMN offering restricted local operator services.

If the UE fails to register the selected PLMN offering restricted local operator services, the UE switches to the either automatic network selection mode or manual network selection mode, from which the UE switched to RLOS network selection mode.

When the UE de-registers from the selected PLMN offering restricted local operator services, the UE switches to the either automatic network selection mode or manual network selection mode, from which the UE switched to RLOS network selection mode.

When the UE leaves RLOS network selection mode, the UE shall indicate "no service" to the user.

That is, if the UE in the automatic network selection mode fails in accessing the allowed PLMN, the UE obtains the user consent for the PLMN supporting RLOS, selects an RLOS PLMN, and moves to an RLOS network selection mode. Further, the UE attempts to register on the RLOS PLMN selected in the RLOS network selection mode. If the UE successfully registers on the RLOS PLMN and then receives RLOS service to register on the RLOS PLMN, the UE again returns to the automatic or manual PLMN selection mode that the UE has used previously. To this end, before the UE switches to the RLOS network selection mode, the UE stores information about the mode that the UE has used. When the UE terminates the RLOS network selection mode, the UE can determine whether to use the automatic or manual PLMN selection mode based on the information thus stored.

If the registration on the selected RLOS PLMN fails, the UE again returns to the automatic or manual PLMN selection mode that the UE has used previously.

4-1 Embodiment

In 4-1 embodiment, in the above process, optionally, if the registration on the selected RLOS PLMN fails, the UE additionally asks the user whether to attempt registration on other PLMN before immediately returning to the automatic mode or the manual mode. If the user selects the other RLOS PLMN, the UE can additionally attempt registration on the other RLOS PLMN. If the user does not select the other RLOS PLMN, the UE can terminate the RLOS mode and transition to another mode.

C) RLOS Network Selection Mode

In this mode, the UE shall attempt to register the selected PLMN offering restricted local operator services.

If the UE fails to register the selected PLMN offering restricted local operator services, and if the UE detects other PLMNs offering restricted local operator services, the UE shall offer the user to select one of these networks. If the user selects a PLMN offering restricted local operator services, the UE shall indicate the selected PLMN and attempt to register the selected PLMN offering restricted local operator services.

If there is no more PLMN offering restricted local operator services or if the user selects not to attempt PLMNs offering restricted local operator services, the UE switches to the either automatic network selection mode or manual network selection mode, from which the UE switched to RLOS network selection mode.

When the UE de-registers from the selected PLMN offering restricted local operator services, the UE switches to the either automatic network selection mode or manual network selection mode, from which the UE switched to RLOS network selection mode.

When the UE leaves RLOS network selection mode, the UE shall indicate "no service" to the user.

In the fourth and 4-1 embodiments, the present disclosure has separately specified the RLOS network selection mode, but can perform each of the depicted operations in the automatic mode or the manual mode in another implementation method.

Fifth Embodiment

According to an existing operation, if a UE fails in registration in an automatic mode and searches an RLOS PLMN, the UE obtains user consent and has attempted registration on the RLOS PLMN. However, if the UE fails in registration on the RLOS PLMN, the UE waits until a new PLMN is searched or TA/LA changes, and the UE has again attempted the RLOS registration if such an even occurs. However, in this case, if the occurring event is the new PLMN, and the UE is able to receive a normal service not the RLOS service in the new PLMN, the fact that the UE first performs the RLOS registration is disadvantageous in terms of user experience and also generates problem of additional power consumption. In the same manner, if the new event is new TA/LA entry, and the normal service is able to be provided in the TA/LA according to an existing contract of the user, it is not preferable that the UE performs the RLOS registration.

Accordingly, in the fifth embodiment, if a UE that obtains the user consent and attempts the RLOS registration fails in the RLOS registration on all PLMNs available in a current area, and if the UE enters the new TA/RA or finds the new PLMN, the UE stops attempting the RLOS registration and preferentially attempts a normal registration procedure. If the UE fails in the normal registration procedure, the UE can attempt the RLOS registration depending on a consent state of the user.

As mentioned above, if the UE fails in the normal service registration on available PLMNs in an automatic PLMN selection mode, and if the UE finds a PLMN supporting RLOS among the available PLMNs, the UE obtains user consent and attempts RLOS registration. If the UE has an RLOS PLMN list in this process, the UE attempts RLOS registration on an actually found PLMN in the RLOS PLMN list. If it is informed, via SIN, etc., that the found PLMN does not support the RLOS in this process, the UE does not attempt the RLOS registration on the PLMN. The following is an example of an operation according to the present disclosure.

3.2.2.2 at Switch-on or Recovery from Lack of Coverage

At switch on, when in coverage of the last registered PLMN as stored in the SIM/USIM, the UE will attach to that network.

As an option, in automatic selection mode, when no EHPLMN list is present, the UE may select the HPLMN. When the EHPLMN list is present, the UE may select the highest priority EHPLMN among the available EHPLMNs. The operator shall be able to control the UE behaviour by USIM configuration.

As an option, if the UE is in manual network selection mode at switch-on
if the last registered PLMN is unavailable and no equivalent PLMN is available,
and the UE finds it is in coverage of either the HPLMN or an EHPLMN
then, the UE should register on the corresponding HPLMN or EHPLMN. The UE remains in manual mode.

If the UE returns to coverage of the PLMN on which it is already registered (as indicated by the registered PLMN stored in the SIM/USIM), the UE shall perform a location update to a new location area if necessary. As an alternative option to this, if the UE is in automatic network selection mode and it finds coverage of the HPLMN or any EHPLMN, the UE may register on the HPLMN (if the EHPLMN list is not present) or the highest priority EHPLMN of the available EHPLMNs (if the EHPLMN list is present) and not return to the last registered PLMN. If the EHPLMN list is present and not empty, it shall be used. The operator shall be able to control by USIM configuration whether an UE that supports this option shall follow this alternative behaviour.

NOTE: At switch-on and at recovery from lack of coverage, a UE in automatic network selection mode can attempt registration once the RPLMN or, if the above option is applicable, the HPLMN or EHPLMN is found on an access technology.

The default behaviour for a UE is to select the last registered PLMN.

If there is no registered PLMN stored in the SIM/USIM, or if this PLMN is unavailable and no equivalent PLMN is available, or the attempted registration fails, the UE shall follow one of the following procedures for network selection:

A) Automatic Network Selection Mode

The UE shall select and attempt registration for other services than restricted local operator service on other PLMNs, if available and allowable, if the location area is not in the list of "forbidden LAs for roaming" and the tracking area is not in the list of "forbidden TAs for roaming" (see 3GPP TS 23.122 [3]), in the following order:

i) An EHPLMN if the EHPLMN list is present or the HPLMN (derived from the IMSI) if the EHPLMN list is not present for preferred access technologies in the order specified. In the case that there are multiple EHPLMNs present then the highest priority EHPLMN shall be selected. It shall be possible to configure a voice capable UE so that it shall not attempt registration on a PLMN if all cells identified as belonging to the PLMN do not support the corresponding voice service.

ii) Each entry in the "User Controlled PLMN Selector with Access Technology" data field in the SIM/USIM (in priority order). It shall be possible to configure a voice capable UE so that it shall not attempt registration on a PLMN if all cells identified as belonging to the PLMN do not support the corresponding voice service.

iii) Each entry in the "Operator Controlled PLMN Selector with Access Technology" data field in the SIM/USIM (in priority order). It shall be possible to configure a voice capable UE so that it shall not attempt registration on a PLMN if all cells identified as belonging to the PLMN do not support the corresponding voice service.

iv) Other PLMN/access technology combinations with sufficient received signal quality (see 3GPP TS 23.122 [3]) in random order. It shall be possible to configure a voice capable UE so that it shall not attempt registration on a PLMN if all cells identified as belonging to the PLMN do not support the corresponding voice service.

v) All other PLMN/access technology combinations in order of decreasing signal quality. It shall be possible to configure a voice capable UE so that it shall not attempt registration on a PLMN if all cells identified as belonging to the PLMN do not support the corresponding voice service.

In the case of a UE operating in UE operation mode A or B, an allowable PLMN is one which is not in the "Forbidden PLMN" data field in the SIM/USIM. This data field may be extended in the ME memory (see clause 3.2.2.4). In the case of a UE operating in UE operation mode C, an allowable PLMN is one which is not in the "Forbidden PLMN" data field in the SIM/USIM or in the list of "forbidden PLMNs for GPRS service" in the ME.

If successful registration for other services than restricted local operator services is achieved, the UE shall indicate the selected PLMN.

If registration for other services than restricted local operator services cannot be achieved on any PLMN and at least one PLMN offering restricted local operator services has been found, the UE shall obtain user consent for restricted local operator services. If the UE obtains user consent for restricted local operator service, the UE shall select and attempt registration for restricted local operator services for the found PLMNs. For the order of attempt among found PLMNs, the UE may use a list of preferred PLMNs for restricted local operator services stored in the ME If successful registration for restricted local operator services is achieved, the UE shall indicate the selected PLMN.

If registration cannot be achieved on any PLMN, the UE shall indicate "no service" to the user, wait until a new PLMN is detected, or new location areas or tracking areas of an allowed PLMN are found which are not in the forbidden LA or TA list(s), and then repeat the procedure. When registration cannot be achieved, different (discontinuous) PLMN search schemes may be used in order to minimize the access time while maintaining battery life, e.g. by prioritising the search in favour of BCCH carriers which have a high probability of belonging to an available and allowable PLMN.

B) Manual Network Selection Mode

The UE shall indicate PLMNs, including "Forbidden PLMNs", which are available. If there are none, this shall also be indicated. The HPLMN of the user may provide on the USIM additional information about the available PLMNs, if this is provided then the UE shall indicate that information to the user. This information, provided as free text may include:

Preferred partner,
Roaming agreement status,
Supported services

Furthermore, the UE may indicate whether the available PLMNs are present on one of the PLMN selector lists (e.g. EHPLMN, User Controlled, Operator Controlled or Forbidden) as well as not being present on any of the lists.

For the purpose of presenting the names of the available PLMNs to the user, the ME shall use the USIM defined names if available or other PLMN naming rules in priority order as defined in 3GPP TS 22.101 [7] (Country/PLMN indication).

Any available PLMNs shall be presented in the following order:

i) HPLMN (if the EHPLMN list is not present); or if one or more of the EHPLMNs are available then based on an optional data field on the USIM either the highest priority available EHPLMN is to be presented to the user or all available EHPLMNs are presented to the user in priority order; if the data field is not present, then only the highest priority available EHPLMN is presented;

ii) PLMNs contained in the "User Controlled PLMN Selector" data field in the SIM/USIM (in priority order);

iii) PLMNs contained in the "Operator Controlled PLMN Selector" data field in the SIM/USIM (in priority order);

iv) Other PLMN/access technology combinations with sufficient received signal level (see 3GPP TS 23.122 [3]) in random order;

v) All other PLMN/access technology combinations in order of decreasing signal strength.

If a PLMN does not support voice services then this shall be indicated to the user.

The user may select the desired PLMN and the UE shall attempt registration on this PLMN (This may take place at any time during the presentation of PLMNs).

If registration for other service than restricted local operator service cannot be achieved on the selected PLMN and the PLMN offers restricted local operator services, the UE shall obtain user consent for restricted local operator services for the selected PLMN. If user consent is obtained for restricted local operator services, the UE shall attempt registration on this PLMN for restricted local operator services.

If the registration cannot be achieved on the selected PLMN, the UE shall indicate "No Service". The user may then select and attempt to register on another or the same PLMN following the above procedure. The UE shall not attempt to register on a PLMN which has not been selected by the user.

Once the UE has registered on a PLMN selected by the user, the UE shall not automatically register on a different PLMN unless:

i) The new PLMN is declared as an equivalent PLMN by the registered PLMN;

or, ii) The user selects automatic mode.

If a PLMN is selected but the UE cannot register on it because registration is rejected with the cause "PLMN not allowed", the UE shall add the PLMN to the "Forbidden PLMN" list (clause 3.2.2.4.1). The UE shall not re-attempt to register on that network unless the same PLMN is selected again by the user.

If a PLMN is selected but the UE cannot register for PS services on it because registration is rejected with the cause "GPRS services not allowed in this PLMN", the UE shall not re-attempt to register for E-UTRAN or UTRAN PS or GERAN PS on that network. The PLMN is added to the list "Forbidden PLMN's for GPRS services". The UE shall not re-attempt to register for E-UTRAN or UTRAN PS or GERAN PS on that network unless the same PLMN is selected again by the user. The reception of the cause "GPRS services not allowed in this PLMN", does not affect the CS service.

For requirements to restrict the access of a UE to one or several specific RATs see section 7.1.

If a PLMN is selected but the UE cannot register on it for other reasons, the UE shall, upon detection of a new LA (not in a forbidden LA list) of the selected PLMN, attempt to register on the PLMN.

If the UE is registered on a PLMN but loses coverage, different (discontinuous) carrier search schemes may be used to minimize the time to find a new valid BCCH carrier and maintain battery life, e.g. by prioritizing the search in favour of BCCH carriers of the registered PLMN.

Sixth Embodiment

As described in the fourth embodiment, a current network selection includes an automatic PLMN selection mode and a manual PLMN selection mode. If a UE is in the manual PLMN selection mode, the UE may select specific PLMN and RAT selected by a user, attempt to a normal registration for the selected PLMN and RAT, check whether or not the PLMN supports a RLOS if the normal registration fails, and inform the user about whether to perform Attach for RLOS if the PLMN supports the RLOS. If the user selects the Attach for RLOS, the UE may attempt to RLOS attach for the PLMN.

With regard to this, a process for the UE to receive a selection of PLMN from the user is described in detail with reference to FIG. 17.

FIG. 17 illustrates an example where a UE receives selection of some PLMNs of a plurality of PLMNs from a user in accordance with an embodiment of the present disclosure.

As illustrated in FIG. 17, a UE 1700 may display, on a display 1750, information ("Manual Selection mode/Select PLMN for Access") 1751 indicating that a current network selection mode is set to a manual PLMN selection mode.

If the PLMN registration fails, the UE may display a plurality of searched PLMN lists 1752, 1753 and 1754 through the display. If a touch input for one PLMN item of the plurality of PLMN lists is received from the user, the UE may initiate Attach for a normal service of a PLMN corresponding to the PLMN item from which the touch input is received.

The UE may display, on the display, a reject button 1755 for receiving a user's input that rejects the Attach for the normal service of the PLMN.

If Attach for a normal service of PLMN A selected by a touch input of the user is rejected by the corresponding PLMN A, the UE may check/determine whether or not the PLMN A supports/provides RLOS service.

If the PLMN A supports/provides the RLOS service as a result of checking/determining, the UE may display a screen, that indicates whether to initiate the Attach for RLOS service, to the user. This is described in detail below with reference to FIG. 18.

FIG. 18 illustrates an example where a UE receives, from a user, a selection for whether to initiate Attach for RLOS service in accordance with an embodiment of the present disclosure.

As illustrated in FIG. 18, according to an embodiment of the present disclosure, a UE 1800 may display, on a display 1850, a text ("Registration failed. RLOS is possible. Do you want to try RLOS?") 1851 indicating that the Attach for the normal service of the PLMN A of FIG. 17 is rejected, and that RLOS service is possible, and inquiring whether to initiate Attach to RLOS service.

The UE may display, on the display, an OK button 1852 for receiving an OK input for Attach initiation for RLOS service from the user, and a Cancel button 1853 for receiving a Cancel input for Attach initiation for RLOS service from the user.

If a user's touch input for the OK button 1852 is received, the UE may initiate Attach for RLOS service of the PLMN A searched in the case of FIG. 17.

If a user's touch input for the Cancel button 1853 is received, or the PLMN A does not support the RLOS service, the UE may display a selectable PLMN list, may display another general screen, or may not perform an additional operation.

FIG. 19 is a flow chart illustrating a method for a UE to select a network (PLMN) providing RLOS service in accordance with an embodiment of the present disclosure.

FIG. 19 illustrates an example of signalling between a user equipment (UE)/base station (BS) based on the above-described proposal methods (e.g., the first, second, third, fourth, fifth, and sixth embodiments) (here, the UE/BS is merely an example and can be replaced by various devices as described in the present disclosure or as illustrated in FIGS. 20 to 25 to be described below). FIG. 19 is merely for convenience of explanation and is not intended to limit the scope of the present disclosure. In addition, some step(s) illustrated in FIG. 19 may be omitted depending on conditions and/or configuration, etc.

As illustrated in FIG. 19, first, a UE may display, on a display of the UE, at least one first PLMN item respectively corresponding to at least one first PLMN in a manual network selection mode, in S1910. For example, based on the first, second, third, fourth, fifth, and sixth embodiments, etc., the UE may display, on the display of the UE, at least one first PLMN item respectively corresponding to at least one first PLMN. For example, an operation where the UE (2000, 2110, 2310, 2320, 2410, 2420, 2501 and 2502 in FIGS. 20 to 25) in the step S1910 displays, on the display, at least one first PLMN item respectively corresponding to at least one first PLMN may be implemented by devices of FIGS. 20 to 22 to be described below. For example, referring to FIG. 20, one or more controllers 2080 may display at least one first PLMN item on a display 2051 (see FIG. 20). As another example, referring to FIG. 22, one or more controllers 2212 may display at least one first PLMN item on a display 2215 (see FIG. 22).

As illustrated in FIG. 19, if a registration on PLMN selected by the user fails, the UE may control a communication unit of the UE and attempt to a registration on a second PLMN corresponding to a second PLMN item if the UE receives an input for a second PLMN item of at least one first PLMN item, in S1930. For example, the UE may attempt to registration on the second PLMN corresponding to the second PLMN item through a BS (2120, 2310, 2320, 2410, 2420, 2501 and 2502 in FIGS. 21 to 25). For example, an operation of the UE for the second PLMN registration attempt may include a PLMN registration attempt operation of the UE related to the operation of the first, second, third, fourth, fifth, and sixth embodiments. For example, an operation of the UE (2000, 2110, 2310, 2320, 2410, 2420, 2501 and 2502 in FIGS. 20 to 25) of the step S1930 for attempting registration on the second PLMN through the BS (2120, 2310, 2320, 2410, 2420, 2501 and 2502 in FIGS. 21 to 25) may be implemented by devices of FIGS. 20 to 25 to be described below. For example, referring to FIG. 20, one or more controllers 2080 may control one or more wireless communication units 2010 and/or one or more memories 2070, etc. so as to attempt registration on the second PLMN, and the one or more wireless communication units 2010 may attempt registration on the second PLMN through the BS. As another example, referring to FIG. 21, one or more processors 2112 may control one or more Tx/Rx modules 2111 and/or one or more memories 2113, etc. so as to attempt registration on the second PLMN, and the one or more Tx/Rx modules 2111 may attempt registration on the second PLMN through the BS. As another example, referring to FIG. 23, one or more processors 2312 may control one or more transceivers 2316 and/or one or more memories 2314, etc. so as to attempt registration on the second PLMN, and the one or more transceivers 2316 may attempt registration on the second PLMN through the BS.

The UE (2110, 2310, 2320, 2410, 2420, 2501 and 2502 in FIGS. 21 to 25) may display, on the display, at least one third PLMN item corresponding to at least one third PLMN included in an RLOS PLMN list configured to a universal subscriber identity module (USIM) of the UE, in S1950. For example, based on the first, second, third, fourth, fifth, and sixth embodiments, etc., the UE may display, on the display, at least one third PLMN item corresponding to at least one third PLMN included in an RLOS PLMN list configured to a USIM of the UE. For example, an operation of the UE (2000, 2110, 2310, 2320, 2410, 2420, 2501 and 2502 in FIGS. 20 to 25) of the step S1950 for displaying, on the display, at least one third PLMN item corresponding to at least one third PLMN included in the RLOS PLMN list configured to the USIM of the UE may be implemented by devices of FIGS. 20 and 22 to be described below. For example, referring to FIG. 20, one or more controllers 2080 may display at least one third PLMN item on a display 2051 (see FIG. 20). As another example, referring to FIG. 22, one or more processors 2212 may display at least one third PLMN item on a display 2215 (see FIG. 22).

If an input for a fourth PLMN item of at least one third PLMN item is received, the UE (2110, 2310, 2320, 2410, 2420, 2501 and 2502 in FIGS. 21 to 25) may control the communication unit and initiate registration for Attach for RLOS of a fourth PLMN corresponding to the fourth PLMN item, in S1970. For example, based on the first, second, third, fourth, fifth, and sixth embodiments, etc., the UE may receive an input for the fourth PLMN item of at least one third PLMN item. For example, an operation of the UE (2000, 2110, 2310, 2320, 2410, 2420, 2501 and 2502 in FIGS. 20 to 25) of the step S1970 for receiving an input for the fourth PLMN item of at least one third PLMN item may be implemented by devices of FIGS. 20 and 22 to be described below. For example, referring to FIGS. 20 and 22, one or more controllers 2080 and/or one or more processors 2212 may receive an input for the fourth PLMN item of at least one third PLMN item through the display (2051 of FIGS. 20 and/or 2215 of FIG. 22).

As mentioned above, the above-described BS/UE signaling and operation (e.g., the first, second, third, fourth, fifth, and sixth embodiments/FIG. 19, etc.) may be implemented by devices (e.g., FIGS. 20 to 25) to be described below. For example, the BS may correspond to a network node device, and the UE may correspond to a UE device. Further, the BS may correspond to a first wireless device, and the UE may correspond to a second wireless device, and vice versa.

For example, the above-described BS/UE signaling and operation (e.g., the first, second, third, fourth, fifth, and sixth embodiments/FIG. 19, etc.) may be processed by one or more processors 2112, 2122, 2312 and 2322 illustrated in FIGS. 20 to 25. The above-described BS/UE signaling and operation (e.g., the first, second, third, fourth, fifth, and sixth embodiments/FIG. 19, etc.) may also be stored in a memory (e.g., one or more memories 2113, 2123, 2314 and 2324 in FIGS. 21 and 23) in the form of a command/program (e.g. instruction, executable code) for driving at least one controller/processor (e.g. 2112, 2122, 2312 and 2322) illustrated in FIGS. 20 to 25.

Overview of Device to which the Present Invention is Applicable

Mobile terminals described in the present disclosure may include cellular phones, smart phones, laptop computers, digital broadcast terminals, personal digital assistants (PDAs), portable multimedia players (PMPs), navigators, slate personal computers (PCs), tablet PCs, ultra-books, wearable devices (e.g., smart watches, smart glasses, head mounted displays (HMDs)), and the like. Furthermore, the mobile terminals may be used for controlling at least one device in an Internet of Things (IoT) environment or a smart greenhouse.

However, except for the case that the configuration according to embodiments disclosed in the present disclosure is applicable to only the mobile terminal, it can be readily apparent to those skilled in the art that embodiments may also be applied to stationary terminals such as digital TV, desktop computers, digital signage, and the like.

FIG. 20 is a block diagram illustrating a mobile terminal related to the present disclosure.

A mobile terminal 2000 may include a wireless communication unit 2010, a controller 2080, a memory 2070, a sensing unit 2040, an output unit 2050, an interface unit 2060, an input unit 2020, and a power supply unit 2090, and the like. It is understood that implementing all the components illustrated in FIG. 20 is not a requirement for the mobile terminal, and that more or fewer components may be alternatively implemented for the mobile terminal.

More specifically, the wireless communication unit 2010 may include one or more modules which enable wireless communications between the mobile terminal 2000 and a wireless communication system, between the mobile terminal 2000 and another mobile terminal 2000, or between the mobile terminal 2000 and an external server. Further, the wireless communication unit 2010 may include one or more modules which connect the mobile terminal 2000 to one or more networks.

The wireless communication unit 2010 may include at least one of a broadcast receiving module 2011, a mobile communication module 2012, a wireless Internet module 2013, a short-range communication module 2014, and a location information module 2015.

The input unit 2020 may include a camera 2021 or a video input unit for inputting a video signal, a microphone 2022 or an audio input unit for inputting an audio signal, and a user input unit 2023 (e.g., a touch key, a push key, etc.) for allowing a user to input information. Audio data or image data obtained by the input unit 2020 may be analyzed and processed by user control commands.

The sensing unit 2040 may include one or more sensors for sensing at least one of internal information of the mobile terminal, information about a surrounding environment of the mobile terminal, and user information. For example, the sensing unit 2040 may include at least one of a proximity sensor 2041, an illumination sensor 2042, a touch sensor, an acceleration sensor, a magnetic sensor, a G-sensor, a gyroscope sensor, a motion sensor, an RGB sensor, an infrared (IR) sensor, a fingerprint scan sensor, a ultrasonic sensor, an optical sensor (e.g., the camera 2021), the microphone 2022, a battery gauge, an environment sensor (e.g., a barometer, a hygrometer, a thermometer, a radiation detection sensor, a thermal sensor, a gas sensor, etc.), and a chemical sensor (e.g., an electronic nose, a health care sensor, a biometric sensor, etc.). The mobile terminal disclosed herein may combine and utilize information sensed by at least two of the abovementioned sensors.

The output unit 2050 may be configured to output various types of information, such as audio, video, tactile output, and the like. The output unit 2050 may include at least one of a display 2051, an audio output unit 2052, a haptic module 2053, and an optical output unit 2054. The display 2051 may form an inter-layered structure or an integrated structure with a touch sensor to implement a touch screen. The touch screen may function as the user input unit 2023 that provides an input interface between the mobile terminal

2000 and the user, and at the same time provide an output interface between the mobile terminal 2000 and the user.

The interface unit 2060 serves as an interface with various types of external devices connected to the mobile terminal 2000. The interface unit 2060 may include at least one of wired or wireless headset ports, external charger ports, wired or wireless data ports, memory card ports, ports for connecting a device having an identification module, audio input/output (I/O) ports, video I/O ports, and earphone ports. The mobile terminal 2000 may perform assorted control functions associated with a connected external device, in response to the external device being connected to the interface unit 2060.

The memory 2070 stores data to support various functions of the mobile terminal 2000. The memory 2070 may store multiple application programs or applications executed in the mobile terminal 2000, and data or instructions for operations of the mobile terminal 2000. At least a part of these application programs may be downloaded from an external server via wireless communication. At least a part of these application programs may be installed within the mobile terminal 2000 at time of manufacturing or shipping, which is the case for basic functions (e.g., receiving a call, placing a call, receiving a message, sending a message, etc.) of the mobile terminal 2000. It is common for application programs to be stored in the memory 2070, installed in the mobile terminal 2000, and executed by the controller 2080 to perform an operation (or function) of the mobile terminal 2000.

The controller 2080 typically functions to control overall operation of the mobile terminal 2000, in addition to the operations associated with the application programs. The controller 2080 may provide or process information or functions appropriate for a user by processing signals, data, information and the like which are input or output by the components described above, or running application programs stored in the memory 2070.

Further, the controller 2080 may control at least some of the components illustrated in FIG. 20 in order to run application programs that have been stored in the memory 2070. In addition, the controller 2080 may combine and operate at least two of the components included in the mobile terminal 2000 for the execution of the application programs.

The power supply unit 2090 receives external power and internal power and supplies the power to the respective components included in the mobile terminal 2000 under the control of the controller 2080. The power supply unit 2090 may include a battery, and the battery may be embedded in the terminal body or be detachable from the terminal body.

At least some of the above components may be combined with one another and operate, in order to implement an operation, a control, or a control method of a mobile terminal according to various embodiments described below. Further, an operation, a control, or a control method of a mobile terminal according to various embodiments may be implemented by running at least one application program stored in the memory 2070.

Before describing various embodiments implemented by the mobile terminal 2000 described above, the components depicted above will now be described in more detail with reference to FIG. 20.

Regarding the wireless communication unit 2010, the broadcast receiving module 2011 of the wireless communication unit 2010 receives broadcast signals and/or broadcast related information from an external broadcast management server via a broadcast channel. The broadcast channel may include a satellite channel, a terrestrial channel, etc. The two or more broadcast receiving modules 2011 may be provided to the mobile terminal 2000 for the simultaneous broadcast reception of at least two broadcast channels or the switching of broadcast channels.

The mobile communication module 2012 exchanges radio signals with at least one of a base station, an external terminal, and a server on a mobile communication network constructed according to technical standards or communication methods for mobile communications (e.g., global system for mobile communication (GSM), code division multiple access (CDMA), CDMA 2000, EV-DO (Enhanced Voice-Data Optimized or Enhanced Voice-Data Only), Wideband CDMA (WCDMA), high speed downlink packet access (HSDPA), high speed uplink packet access (HSUPA), long term evolution (LTE), LTE-A (long term evolution-advanced), 3GPP NR (New Radio access technology), and the like).

Examples of the radio signals may include audio call signals, video call signals, or various formats of data according to the exchange of text/multimedia messages.

The wireless Internet module 2013 is configured to facilitate wireless Internet access. The wireless Internet module 2013 may be embedded in the mobile terminal 2000 or externally coupled to the mobile terminal 2000. The wireless Internet module 2013 is configured to transmit and/or receive radio signals via communication networks according to wireless Internet technologies.

Examples of the wireless Internet technology include wireless LAN (WLAN), wireless fidelity (Wi-Fi), Wi-Fi Direct, digital living network alliance (DLNA), wireless broadband (WiBro), worldwide interoperability for microwave access (WiMAX), high speed downlink packet access (HSDPA), high speed uplink packet access (HSUPA), long term Evolution (LTE), LTE-A (Long Term Evolution-Advanced), 3GPP NR, and the like. The wireless Internet module 2013 may transmit/receive data according to one or more of such wireless Internet technologies, and other Internet technologies as well.

From the viewpoint that the wireless Internet access according to WiBro, HSDPA, HSUPA, GSM, CDMA, WCDMA, LTE, LTE-A, 3GPP NR and the like, is implemented via a mobile communication network, the wireless Internet module 2013 performing the wireless Internet access via the mobile communication network may be understood as part of the mobile communication module 2012.

The short-range communication module 2014 is configured to facilitate short-range communications and can support short-range communications using at least one of Bluetooth™, radio frequency Identification (RFID), Infrared data association (IrDA), ultra-WideBand (UWB), ZigBee, near field communication (NFC), Wireless-Fidelity (Wi-Fi), Wi-Fi direct, and wireless USB (Wireless Universal Serial Bus) technologies. The short-range communication module 2014 can support wireless communications between the mobile terminal 2000 and a wireless communication system, between the mobile terminal 2000 and another mobile terminal 2000, or between the mobile terminal 2000 and a network where another mobile terminal 2000 (or an external server) is located, via wireless area networks. The wireless area networks may be wireless personal area networks.

In embodiments disclosed herein, another mobile terminal 2000 may be a wearable device (e.g., a smart watch, a smart glass, a neckband, or a head mounted display (HMD)) which is able to exchange data with the mobile terminal 2000 according to the present invention. The short-range communication module 2014 may sense (or recognize) the wearable device that is located around the mobile terminal 2000 and can communicate with the mobile terminal 2000. In addition, when the sensed wearable device is a device which is authenticated to communicate with the mobile terminal 2000 according to the present invention, the controller 2080 can transmit at least a part of data processed by the mobile terminal 2000 to the wearable device via the short-range communication module 2014. Thus, a user of the wearable device may use data processed by the mobile terminal 2000 through the wearable device. For example, when a call is received at the mobile terminal 2000, the user can answer the call using the wearable device. Also, when a message is received at the mobile terminal 2000, the user can check the received message using the wearable device.

Furthermore, screen mirroring with a TV located in the house or a display inside a car, etc. is implemented through the short-range communication module 2014, and the corresponding function is performed based on, for example, MirrorLink or Miracast standard or the like. Further, the user can directly control the TV or the display inside the car using the mobile terminal 2000.

The location information module 2015 is a module for obtaining a position (or a current position) of the mobile terminal. Representative examples of the location information module 2015 include a global position system (GPS) module or a wireless fidelity (Wi-Fi) module. For example, if the mobile terminal utilizes a GPS module, a position of the mobile terminal can be acquired using a signal sent from a GPS satellite. As another example, if the mobile terminal utilizes the Wi-Fi module, a position of the mobile terminal can be acquired based on information related to a wireless access point (AP) which transmits or receives a radio signal to or from the Wi-Fi module. If necessary or desired, the location information module 2015 may alternatively or additionally functions of the other modules of the wireless communication unit 2010 to obtain data related to the position of the mobile terminal. The location information module 2015 is a module used to obtain a position (or current position) of the mobile terminal and is not limited to a module that directly calculates or obtains the position of the mobile terminal.

Each of the broadcast receiving module 2011, the mobile communication module 2012, the short-range communication module 2014, and the location information module 2015 may be implemented as a separate module performing the corresponding function. Alternatively, two or more of the broadcast receiving module 2011, the mobile communication module 2012, the short-range communication module 2014, and the location information module 2015 may be implemented as one module performing the corresponding functions.

The input unit 2020 is configured to input video information (or signal), audio information (or signal), data, or information input from the user. The mobile terminal 2000 may include one camera 2021 or a plurality of cameras 2021 to input video information. The camera 2021 processes image frames of still pictures or video obtained by an image sensor in a video call mode or a video recording mode. The processed image frames may be displayed on the display 2051 or stored in the memory 2070. The plurality of cameras 2021 included in the mobile terminal 2000 may be arranged to form a matrix structure, and various video information with various angles or focal points may be input to the mobile terminal 2000 through the cameras 2021 forming the matrix structure. Alternatively, the plurality of cameras 2021 may be disposed in a stereoscopic structure to obtain left and right images for implementing a stereoscopic image.

The microphone 2022 processes external audio signals into electrical voice data. The processed voice data can be variously utilized according to a function that is performing by the mobile terminal 2000 (or an application program that is running on the mobile terminal 2000). The microphone 2022 can implement various noise removing algorithms for removing a noise generated in a process for receiving the external audio signals.

The user input unit 2023 is a component that allows information input by a user. If information is input via the user input unit 2023, the controller 2080 can control an operation of the mobile terminal 2000 in conformity with the input information. The user input unit 2023 may include mechanical input means (or a mechanical key, for example, a button located on a front or rear surface or a side of the mobile terminal 2000, a dome switch, a jog wheel, a jog switch, etc.) and touch input means. As one example, the touch input means may include a virtual key, a soft key, or a visual key which is displayed on a touch screen through software processing, or a touch key which is disposed on other portions of the mobile terminal except the touch screen. The virtual key or the visual key can be displayed on the touch screen in various shapes, for example, graphic, text, icon, video, or a combination thereof.

The sensing unit 2040 senses at least one of internal information of the mobile terminal, surrounding environment information of the mobile terminal, and user information and generates a sensing signal corresponding to the sensed information. The controller 2080 may control a drive or an operation of the mobile terminal 2000 based on the sensing signal, or perform data processing, a function or an operation related to an application program installed in the mobile terminal 2000 based on the sensing signal. The sensing unit 2040 may be implemented using some various sensors, some of which will now be described in more detail.

The proximity sensor 2041 refers to a sensor that senses presence or absence of an object approaching a predetermined detection surface or an object located around the predetermined detection surface, by using an electromagnetic force, infrared rays, or the like without a mechanical contact. The proximity sensor 2041 may be disposed in an inner region of the mobile terminal covered by the touch screen described above or disposed around the touch screen.

Examples of the proximity sensor 2041 include a transmissive photoelectric sensor, a direct reflective photoelectric sensor, a mirror reflective photoelectric sensor, a high-frequency oscillation proximity sensor, a capacitive proximity sensor, a magnetic proximity sensor, an infrared proximity sensor, and the like. When the touch screen is implemented as a capacitive touch sensor, the proximity sensor 2041 may be configured to sense proximity of an object with conductivity using changes in an electromagnetic field which is responsive to an approach of the object with conductivity. In this instance, the touch screen (or the touch sensor) itself may be categorized as a proximity sensor.

For convenience of explanation, the term "proximity touch" refers to a scenario in which an object is proximate to the touch screen without contacting the touch screen and is recognized to be positioned on the touch screen, and the term "contact touch" refers to a scenario in which an object actually contacts the touch screen. A position corresponding to the proximity touch of the object relative to the touch screen corresponds to a position where the object is perpendicular to the touch screen upon the proximity touch of the object. The proximity sensor 2041 can sense proximity touch and proximity touch patterns (e.g., a proximity touch distance, a proximity touch direction, a proximity touch speed, a proximity touch time, a proximity touch position, a proximity touch moving status, etc.). The controller 2080 can process data (or information) corresponding to proximity touch operations and proximity touch patterns sensed by the proximity sensor 2041, and also output visual information corresponding to the processed data on the touch screen. In addition, the controller 2080 can control the mobile terminal 2000 so that different operations or data (or information) are processed according to whether a touch of the same portion on the touch screen is either a proximity touch or a contact touch.

A touch sensor senses a touch (or a touch input) applied to the touch screen (or the display 2051) using at least one of various touch methods including a resistive type, a capacitive type, an infrared type, an ultrasonic type, a magnetic field type, and the like.

As an example, the touch sensor may be configured to convert changes in a pressure applied to a specific part of the touch screen or changes in a capacitance occurring in a specific part of the touch screen into electrical input signals. The touch sensor may also be configured so that a touch object applying a touch input to the touch screen can sense a touched position or a touched area on the touch sensor, a touch pressure, a touch capacitance, or the like. In embodiments disclosed herein, the touch object is generally used to apply a touch input to the touch sensor. Examples of the touch object may include a finger, a touch pen, a stylus pen, a pointer, or the like.

When there is a touch input with respect to the touch sensor as described above, signal(s) corresponding to the touch input may be transmitted to a touch controller. The touch controller may process the received signal(s) and then transmit corresponding data to the controller 2080. Thus, the controller 2080 may sense which region of the display 2051 has been touched. In embodiments disclosed herein, the touch controller may be configured separately from the controller 2080, or may be the controller 2080 itself.

The controller 2080 may execute the same control or different controls in accordance with a kind of a touch object that touches the touch screen (or a touch key provided in addition to the touch screen). Whether to perform the same control or different controls in accordance with the kind of the touch object may be determined based on a current operating state of the mobile terminal 2000 or an application program that is running.

The touch sensor and the proximity sensor described above may be individually implemented or combined to sense various types of touches with respect to the touch screen including a short (or tap) touch, a long touch, a multi-touch, a drag touch, a flick touch, a pinch-in touch, a pinch-out touch, a swipe touch, a hovering touch, and the like.

The ultrasonic sensor may recognize location information of a touch object using ultrasonic waves. The controller 2080 can calculate a location of a wave generation source based on information sensed by an optical sensor and a plurality of ultrasonic sensors. The location of the wave generation source can be calculated using the fact that light is much faster than ultrasonic waves, namely, the time it takes for the light to reach the optical sensor is much shorter than the time it takes for the ultrasonic wave to reach the ultrasonic sensor. More specifically, the location of the wave generation source can be calculated using a difference in the reaching time described above between the light and the ultrasonic wave.

In the configuration of the input unit 2020, the camera 2021 includes at least one of a camera sensor (e.g., CCD, CMOS etc.), a photo sensor (or image sensors), and a laser sensor.

The camera 2021 and a laser sensor may be combined and may sense a touch of a sensing object with respect to a 3D stereoscopic image. The photo sensor may be stacked on the display device. The photo sensor may be configured to scan a movement of the sensing object in proximity to the touch screen. More specifically, the photo sensor may mount photo diodes and transistors on rows/columns and scan contents mounted on the photo sensor using an electrical signal that changes depending on an amount of light applied to the photo diodes. That is, the photo sensor can calculate coordinates of the sensing object depending on a variation of light and obtain location information of the sensing object through the coordinates.

The display 2051 displays (or outputs) information processed by the mobile terminal 2000. For example, the display 2051 may display execution screen information of an application program running on the mobile terminal 2000 or display user interface (UI) information and graphic user interface (GUI) information in response to the execution screen information.

Further, the display 2051 may be implemented as a stereoscopic display for displaying a stereoscopic image.

The stereoscopic display may employ a 3D display scheme such as a stereoscopic scheme (a glass scheme), an auto-stereoscopic scheme (glassless scheme), a projection scheme (holographic scheme), or the like.

The audio output unit 2052 may output audio data, that is received from the wireless communication unit 2010 or is stored in the memory 2070, in a call signal reception mode, a call mode or a record mode, a voice recognition mode, a broadcast reception mode, and the like. The audio output unit 2052 may output an audio signal related to a function (e.g., a call signal reception sound, a message reception sound, etc.) performed by the mobile terminal 2000. The audio output unit 2052 may also include a receiver, a speaker, a buzzer, or the like.

The haptic module 2053 generates various tactile effects that the user can feel. A typical example of the tactile effect generated by the haptic module 2053 may be a vibration. A strength, a pattern, etc. of the vibration generated by the haptic module 2053 can be controlled by the selection of the user or setting of the controller. For example, the haptic module 2053 may output different vibrations in a combination manner or a sequential manner.

In addition to the vibration, the haptic module 2053 may generate various tactile effects including an effect by stimulation such as a pin arrangement moving vertically to a contact skin, a spray force or a suction force of air through a jet orifice or a suction opening, a touch of the skin, a contact of an electrode, and an electrostatic force, an effect by reproducing the sense of cold and warmth using an element that can absorb or generate heat, and the like.

The haptic module 2053 may also be implemented to allow the user to feel a tactile effect through a muscle sensation such as the user's fingers or arm, as well as transferring the tactile effect through the direct contact. Two or more haptic modules 2053 may be provided according to the particular configuration of the mobile terminal 2000.

The optical output unit 2054 outputs a signal for indicating an event generation using light of a light source of the mobile terminal 2000. Examples of events generated in the mobile terminal 2000 may include message reception, call signal reception, a missed call, an alarm, a schedule notice, an email reception, information reception through an application, and the like.

A signal output by the optical output unit 2054 is implemented in such a manner that the mobile terminal 2000 emits light or light with single color or a plurality of colors to a front surface or a rear surface. The signal output may be terminated as the mobile terminal senses that the user has checked the generated event.

The interface unit 2060 serves as an interface for all of external devices connected to the mobile terminal 2000. The interface unit 2060 is configured to receive data from the external device, receive power to transfer the power to the respective components of the mobile terminal 2000, or transmit internal data of the mobile terminal 2000 to the external device. For example, the interface unit 2060 may include wired or wireless headset ports, external charger ports, wired or wireless data ports, memory card ports, ports for connecting a device with an identification module, audio input/output (I/O) ports, video I/O ports, earphone ports, or the like.

The identification module may be a chip that stores various types of information for authenticating usage authority of the mobile terminal 2000 and may include a user identity module (UIM), a subscriber identity module (SIM), a universal subscriber identity module (USIM), and the like. In addition, the device with the identification module (hereinafter referred to as "identification device") may be manufactured as a smart card. Thus, the identification device may be connected to the mobile terminal 2000 via the interface unit 2060.

When the mobile terminal 2000 is connected to an external cradle, the interface unit 2060 may serve as a passage to allow power from the cradle to be supplied to the mobile terminal 2000 or a passage to allow various command signals input by the user from the cradle to be transferred to the mobile terminal. The various command signals or the power input from the cradle may operate as signals for recognizing that the mobile terminal 2000 is properly mounted on the cradle.

The memory 2070 may store programs for operations of the controller 2080 and temporarily store input/output data (e.g., phonebook, messages, still images, videos, etc.). The memory 2070 may store data about various patterns of vibration and audio which are output in response to a touch input on the touch screen.

The memory 2070 may include at least one type of storage medium of a flash memory, a hard disk, a solid state disk (SSD), a silicon disk drive (SDD), a multimedia card micro type, a card type memory (e.g., SD or DX memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The mobile terminal 2000 may also be operated in relation to a web storage that performs a storage function of the memory 2070 over Internet.

As described above, the controller 2080 typically controls operations related to application programs and the overall operations of the mobile terminal 2000. For example, if a state of the mobile terminal 2000 satisfies determined conditions, the controller 2080 may execute or release a lock state for restricting an input of user's control command with respect to applications.

The controller 2080 can perform control and processing related to voice call, data communication, video call, and the like, or perform pattern recognition processing capable of recognizing a handwriting input or a picture drawing input performed on the touch screen as characters or images, respectively. In addition, the controller 2080 can control one or a combination of the abovementioned components in order to implement various embodiments disclosed herein through the mobile terminal 2000.

The power supply unit 2090 receives external power and internal power and supplies power necessary for operation of the respective components included in the mobile terminal 2000 under the control of the controller 2080. The power supply unit 2090 may include a battery, and the battery may be an embedded rechargeable battery or be detachable from the terminal body for charging.

The power supply unit 2090 may include a connection port. The connection port may be configured as an example of the interface unit 2060 to which an external charger for supplying power to charge the battery is electrically connected.

As another example, the power supply unit 2090 may be configured to charge the battery in a wireless manner without using the connection port. In this case, the power supply unit 2090 can receive power from an external wireless power transmitter using one or more of an inductive coupling method based on a magnetic induction phenomenon or a magnetic resonance coupling method based on an electromagnetic resonance phenomenon.

Various embodiments described herein may be implemented in a recording medium readable by a computer or devices similar to the computer.

The mobile terminal may be expanded to a wearable device the user can directly wear beyond a hand-held device, which the user carries and uses in his or her hand. Examples of the wearable device include a smart watch, a smart glass, and a head mounted display (HMD). Examples of the mobile terminal expanded to the wearable device will now be described in more detail.

The wearable device may be configured to exchange (or interwork) data with another mobile terminal 2000. The short-range communication module 2014 may sense (or recognize) the wearable device, which is positioned around the mobile terminal 2000 and can communicate with the mobile terminal 2000. Furthermore, when the sensed wearable device is a device which is authenticated to communicate with the mobile terminal 2000, the controller 2080 may transmit at least a portion of data processed in the mobile terminal 2000 to the wearable device via the short-range communication module 2014. Thus, the user of the wearable device may use the data processed in the mobile terminal 2000 on the wearable device. For example, when a call is received at the mobile terminal 2000, the user can answer the call using the wearable device. Also, when a message is received at the mobile terminal 2000, the user can check the received message using the wearable device.

Hereinafter, embodiments related to a control method which can be implemented by the mobile terminal configured as above are described with reference to the accompanying drawings. It is apparent to those skilled in the art that various modifications can be made to within the range without departing from the spirit and essential features of the present invention.

FIG. 21 illustrates an example of configuration of a node device applied to implementations of the present disclosure.

Referring to FIG. 21, a network node device 2120 according to an embodiment may include a transceiver 2121, a processor 2122, and a memory 2123. The transceiver 2121 may be called a radio frequency (RF) unit. The transceiver 2121 may be configured to transmit various signals, data, and information to an external device and receive various signals, data, and information from the external device. The network node device 2120 may be connected to the external device wirelessly and/or wiredly. The transceiver 2121 may be implemented by being divided into a transmitter and a receiver. The processor 2122 may control overall operations of the network node device 2120 and may be configured to perform a function of computing and processing information, etc. that will be transmitted and received between the network node device 2120 and the external device. In addition, the processor 2122 may be configured to perform a network node operation proposed in the present disclosure. The processor 2122 may control the transceiver 2121 to transmit data or a message to a UE 2110 or other network node according to implementations of the present disclosure. The memory 2123 may store computed or processed information, etc. for a predetermined time and may be replaced by components such as a buffer.

Further, referring to FIG. 21, a UE 2110 according to an embodiment may include a transceiver 2111, a processor 2112, and a memory 2113. The transceiver 2111 may be called a radio frequency (RF) unit. The transceiver 2111 may be configured to transmit various signals, data, and information to an external device and receive various signals, data, and information from the external device. The UE 2110 may be connected to the external device wirelessly and/or wiredly. The transceiver 2111 may be implemented by being divided into a transmitter and a receiver. The processor 2112 may control overall operations of the UE 2110 and may be configured to perform a function of computing and processing information, etc. that will be transmitted and received between the UE 2110 and the external device. In addition, the processor 2112 may be configured to perform a UE operation proposed in the present disclosure. The processor 2112 may control the transceiver 2111 to transmit data or a message to a UE 2110 or other network node according to implementations of the present disclosure. The memory 2113 may store computed or processed information, etc. for a predetermined time and may be replaced by components such as a buffer.

The detailed configurations of the UE 2110 and the network node device 2120 can be implemented such that the descriptions described in various embodiments of the present disclosure are independently applied, or two or more embodiments are simultaneously applied, and duplicate description is omitted for clarity.

FIG. 22 is a block configuration diagram illustrating in more detail the UE illustrated in FIG. 21.

Referring to FIG. 22, the UE may include a processor (or digital signal processor (DSP)) 2210, an RF module (or RF unit) 2235, a power management module 2205, an antenna 2240, a battery 2255, a display 2215, a keypad 2220, a memory 2230, a subscriber identification module (SIM) card 2225 (which is optional), a speaker 2245, and a microphone 2250. The UE may also include a single antenna or multiple antennas.

The processor 2210 implements functions, processes, and/or methods described above. Layers of a radio interface protocol may be implemented by the processor 2210.

The memory 2230 is connected to the processor 2210 and stores information related to operations of the processor 2210. The memory 2230 may be inside or outside of the processor 2210 and may be connected to the processors 2210 through various well-known means.

A user inputs instructional information, such as a telephone number, for example, by pushing (or touching) buttons of the keypad 2220 or by voice activation using the microphone 2250. The processor 2210 receives and processes the instructional information to perform an appropriate function, such as to dial the telephone number. Operational data may be extracted from the SIM card 2225 or the memory 2230. Further, the processor 2210 may display instructional information or operational information on the display 2215 for the user's reference and convenience.

The RF module 2235 is connected to the processor 2210 and transmits and/or receives a RF signal. The processor 2210 sends instructional information to the RF module 2235 in order to initiate communication, for example, transmit a radio signal configuring voice communication data. The RF module 2235 consists of a receiver and a transmitter to receive and transmit the radio signal. The antenna 2240 functions to transmit and receive the radio signal. Upon reception of the radio signal, the RF module 2235 may send a signal to be processed by the processor 2210 and convert the signal into a baseband. The processed signal may be converted into audible or readable information output via the speaker 2245.

Example of Communication System to which the Present Disclosure is Applied

FIG. 23 illustrates a wireless device applicable to the present disclosure.

Referring to FIG. 23, a first wireless device 2310 and a second wireless device 2320 may transmit/receive radio signals through various wireless access technologies (e.g., LTE and NR).

The first wireless device 2310 may include one or more processors 2312 and one or more memories 2314 and may further include one or more transceivers 2316 and/or one or more antennas 2318. The processor 2312 may control the memory 2314 and/or the transceiver 2316 and may be configured to implement descriptions, functions, procedures, proposals, methods, and/or operation flows described in the present disclosure. For example, the processor 2312 may process information in the memory 2314 and generate first information/signal and then transmit a radio signal including the first information/signal through the transceiver 2316. Further, the processor 2312 may receive a radio signal including second information/signal through the transceiver 2316 and then store in the memory 2314 information obtained from signal processing of the second information/signal. The memory 2314 may be connected to the processor 2312 and store various information related to an operation of the processor 2312. For example, the memory 2314 may store a software code including instructions for performing some or all of processes controlled by the processor 2312 or performing the descriptions, functions, procedures, proposals, methods, and/or operation flowcharts described in the present disclosure. The processor 2312 and the memory 2314 may be a part of a communication modem/circuit/chip designed to implement the wireless communication technology (e.g., LTE and NR). The transceiver 2316 may be connected to the processor 2312 and may transmit and/or receive the radio signals through one or more antennas 2318. The transceiver 2316 may include a transmitter and/or a receiver. The transceiver 2316 may be mixed with a radio frequency (RF) unit. In the present disclosure, the wireless device may mean the communication modem/circuit/chip.

The second wireless device 2320 may include one or more processors 2322 and one or more memories 2324 and may further include one or more transceivers 2326 and/or one or more antennas 2328. The processor 2322 may control the memory 2324 and/or the transceiver 2326 and may be configured to implement descriptions, functions, procedures, proposals, methods, and/or operation flows described in the present disclosure. For example, the processor 2322 may process information in the memory 2324 and generate third information/signal and then transmit a radio signal including the third information/signal through the transceiver 2326. Further, the processor 2322 may receive a radio signal including fourth information/signal through the transceiver 2326 and then store in the memory 2324 information obtained from signal processing of the fourth information/signal. The memory 2324 may be connected to the processor 2322 and store various information related to an operation of the processor 2322. For example, the memory 2324 may store a software code including instructions for performing some or all of processes controlled by the processor 2322 or performing the descriptions, functions, procedures, proposals, methods, and/or operation flowcharts described in the present disclosure. The processor 2322 and the memory 2324 may be a part of a communication modem/circuit/chip designated to implement the wireless communication technology (e.g., LTE and NR). The transceiver 2326 may be connected to the processor 2322 and may transmit and/or receive the radio signals through one or more antennas 2328. The transceiver 2326 may include a transmitter and/or a receiver, and the transceiver 2326 may be mixed with the RF unit. In the present disclosure, the wireless device may mean the communication modem/circuit/chip.

Hereinafter, hardware elements of the wireless devices 2310 and 2320 will be described in more detail. Although not limited thereto, one or more protocol layers may be implemented by one or more processors 2312 and 2322. For example, one or more processors 2312 and 2322 may implement one or more layers (e.g., functional layers such as PHY, MAC, RLC, PDCP, RRC, and SDAP). One or more processors 2312 and 2322 may generate one or more protocol data units (PDUs) and/or one or more service data units (SDUs) according to the descriptions, functions, procedures, proposals, methods, and/or operation flowcharts described in the present disclosure. One or more processors 2312 and 2322 may generate a message, control information, data, or information according to the descriptions, functions, procedures, proposals, methods, and/or operation flowcharts described in the present disclosure. One or more processors 2312 and 2322 may generate a signal (e.g., a baseband signal) including the PDU, the SDU, the message, the control information, the data, or the information according to the function, the procedure, the proposal, and/or the method described in the present disclosure and provide the generated signal to one or more transceivers 2316 and 2326. One or more processors 2312 and 2322 may receive the signal (e.g. baseband signal) from one or more transceivers 2316 and 2326 and acquire the PDU, the SDU, the message, the control information, the data, or the information according to the descriptions, functions, procedures, proposals, methods, and/or operation flowcharts described in the present disclosure.

One or more processors 2312 and 2322 may be referred to as a controller, a microcontroller, a microprocessor, or a microcomputer. One or more processors 2312 and 2322 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in one or more processors 2312 and 2322. The descriptions, functions, procedures, proposals, and/or operation flowcharts described in the present disclosure may be implemented by using firmware or software and the firmware or software may be implemented to include modules, procedures, functions, and the like. Firmware or software configured to perform the descriptions, functions, procedures, proposals, and/or operation flowcharts described in the present disclosure may be included in one or more processors 2312 and 2322 or stored in one or more memories 2314 and 2324 and driven by one or more processors 2312 and 2322. The descriptions, functions, procedures, proposals, and/or operation flowcharts described in the present disclosure may be implemented by using firmware or software in the form of a code, the instruction and/or a set form of the instruction.

One or more memories 2314 and 2324 may be connected to one or more processors 2312 and 2322 and may store various types of data, signals, messages, information, programs, codes, indications and/or instructions. One or more memories 2314 and 2324 may be comprised of a ROM, a RAM, an EPROM, a flash memory, a hard drive, a register, a cache memory, a computer reading storage medium and/or a combination thereof. One or more memories 2314 and 2324 may be positioned inside and/or outside one or more processors 2312 and 2322. Further, one or more memories 2314 and 2324 may be connected to one or more processors 2312 and 2322 through various technologies such as wired or wireless connection.

One or more transceivers 2316 and 2326 may transmit to one or more other devices user data, control information, a wireless signal/channel, etc., mentioned in the methods and/or operation flowcharts of the present disclosure. One or more transceivers 2316 and 2326 may receive from one or more other devices user data, control information, a wireless signal/channel, etc., mentioned in the descriptions, functions, procedures, proposals, methods, and/or operation flowcharts described in the present disclosure. For example, one or more transceivers 2316 and 2326 may be connected to one or more processors 2312 and 2322 and transmit and receive the radio signals. For example, one or more processors 2312 and 2322 may control one or more transceivers 2316 and 2326 to transmit the user data, the control information, or the radio signal to one or more other devices. Further, one or more processors 2312 and 2322 may control one or more transceivers 2316 and 2326 to receive the user data, the control information, or the radio signal from one or more other devices. Further, one or more transceivers 2316 and 2326 may be connected to one or more antennas 2318 and 2328, and one or more transceivers 2316 and 2326 may be configured to transmit and receive the user data, control information, wireless signal/channel, etc., mentioned in the descriptions, functions, procedures, proposals, methods, and/or operation flowcharts described in the present disclosure through one or more antennas 2318 and 2328. In the present disclosure, one or more antennas may be a plurality of physical antennas or a plurality of logical antennas (e.g., antenna ports). One or more transceivers 2316 and 2326 may convert the received radio signal/channel from an RF band signal into a baseband signal, in order to process the received user data, control information, radio signal/channel, etc., using one or more processors 2312 and 2322. One or more transceivers 2316 and 2326 may convert the user data, control information, radio signal/channel, etc., processed using one or more processors 2312 and 2322, from the baseband signal into the RF band signal. To this end, one or more transceivers 2316 and 2326 may include an (analog) oscillator and/or filter.

Example of Signal Processing Circuit to which the Present Disclosure is Applied

FIG. 24 illustrates a signal processing circuit for a transmission signal.

Referring to FIG. 24 a signal processing circuit 2400 may include a scrambler 2410, a modulator 2420, a layer mapper 2430, a precoder 2440, a resource mapper 2450, and a signal generator 2460. Although not limited thereto, an operation/function of FIG. 24 may be performed by the processors 2312 and 2322 and/or the transceivers 2316 and 2326 of FIG. 23. Hardware elements of FIG. 24 may be implemented in the processors 2312 and 2322 and/or the transceivers 2316 and 2326 of FIG. 23. For example, blocks 2410 to 2460 may be implemented in the processors 2312 and 2322 of FIG. 23. Further, blocks 2410 to 2450 may be implemented in the processors 2312 and 2322 of FIG. 23, and the block 2460 may be implemented in the transceivers 2316 and 2326 of FIG. 23.

A codeword may be transformed into a radio signal via the signal processing circuit 2400 of FIG. 24. The codeword is an encoded bit sequence of an information block. The information block may include transport blocks (e.g., a UL-SCH transport block, a DL-SCH transport block, etc.). The radio signal may be transmitted on various physical channels (e.g., PUSCH, PDSCH, etc.).

Specifically, the codeword may be transformed into a bit sequence scrambled by the scrambler 2410. A scramble sequence used for scrambling may be generated based on an initialization value, and the initialization value may include ID information, etc. of a wireless device. The scrambled bit sequence may be modulated into a modulated symbol sequence by the modulator 2420. A modulation scheme may include pi/2-binary phase shift keying (BPSK), m-phase shift keying (PSK), m-quadrature amplitude modulation (QAM), etc. A complex modulated symbol sequence may be mapped to one or more transport layers by the layer mapper 2430. Modulated symbols of each transport layer may be mapped to a corresponding antenna port(s) by the precoder 2440 (precoding). An output z of the precoder 2440 may be obtained by multiplying an output y of the layer mapper 2430 by a precoding matrix W of N*M, where N is the number of antenna ports, and M is the number of transport layers. The precoder 2440 may perform precoding after performing transform precoding (e.g., DFT transform) on complex modulated symbols. Further, the precoder 2440 may perform the precoding without performing the transform precoding.

The resource mapper 2450 may map the modulated symbols of each antenna port to time-frequency resources. The time-frequency resources may include a plurality of symbols (e.g., CP-OFDMA symbol and DFT-s-OFDMA symbol) in a time domain and include a plurality of subcarriers in a frequency domain. The signal generator 2460 may generate the radio signal from the mapped modulated symbols, and the generated radio signal may be transmitted to another device over each antenna. To this end, the signal generator 2460 may include an inverse fast Fourier transform (IFFT) module, a cyclic prefix (CP) insertor, a digital-to-analog converter (DAC), a frequency uplink converter, and the like.

A signal processing process for a received signal in the wireless device may be configured in the reverse of the signal processing processes (2410 to 2460) of FIG. 24. For example, the wireless device (e.g., 2310 and 2320 of FIG. 23) may receive the radio signal from the outside through the antenna port/transceiver. The received radio signal may be converted into a baseband signal through a signal reconstructor. To this end, the signal reconstructor may include a frequency downlink converter, an analog-to-digital converter (ADC), a CP remover, and a Fast Fourier Transform (FFT) module. Thereafter, the baseband signal may be reconstructed into the codeword through a resource demapper process, a postcoding process, a demodulation process, and a de-scrambling process. The codeword may be reconstructed into an original information block via decoding. Accordingly, a signal processing circuit (not illustrated) for the receive signal may include a signal reconstructer, a resource demapper, a postcoder, a demodulator, a descrambler, and a decoder.

Utilization Example of Wireless Device to which the Present Disclosure is Applied FIG. 25 illustrates another example of a wireless device applied to the present disclosure.

The wireless device illustrated in FIG. 25 may be implemented in various types of devices according to usage examples/services.

Referring to FIG. 25, wireless devices 2501 and 2502 may correspond to the wireless devices 2310 and 2320 of FIG. 23 and may be comprised of various elements, components, units, and/or modules. For example, the wireless devices 2501 and 2502 may include a communication unit 2510, a control unit 2520, and a memory unit 2530, and an additional element 2540. The communication unit 2510 may include a communication circuit 2512 and a transceiver(s) 2514. For example, the communication circuit 2512 may include one or more processors 2312 and 2322 and/or one or more memories 2314 and 2324 of FIG. 23. For example, the transceiver(s) 2514 may include one or more transceivers 2316 and 2326 and/or one or more antennas 2318 and 2328 of FIG. 23. The control unit 2520 is electrically connected to the communication unit 2510, the memory unit 2530, and the additional element 2540 and controls an overall operation of the wireless device. For example, the control unit 2520 may an electrical/mechanical operation of the wireless device based on a program/code/instruction/information stored in the memory unit 2530. Further, the control unit 2520 may transmit the information stored in the memory unit 2530 to the outside (e.g., other communication devices) through the communication unit 2510 via a wireless/wired interface, or store information received from the outside (e.g., other communication devices) via the wireless/wired interface through the communication unit 2510.

The additional element 2540 may be variously configured according to the type of wireless device. For example, the additional element 2540 may include at least one of a power unit/battery, an input/output (I/O) unit, a driving unit, and a computing unit. Although not limited thereto, the wireless device may be implemented as a form such as the robot 100a of FIG. 3, the vehicle 100b of FIG. 3, the XR device 100c of FIG. 3, the portable device 100d of FIG. 3, the home appliance 100e of FIG. 3, the IoT device 100f of FIG. 3, a digital broadcasting terminal, a hologram device, a public safety device, an MTC device, a medical device, a FinTech device (or financial device), a security device, a climate/environment device, an AI server/device 200 of FIG. 3, the base station, a network node, etc. The wireless device may be movable or may be used at a fixed place according to use examples/services.

In FIG. 25, all of various elements, components, units, and/or modules in the wireless devices 2501 and 2502 may be interconnected via the wired interface or at least may be wirelessly connected through the communication unit 2510. For example, the control unit 2520 and the communication 2510 in the wireless devices 2501 and 2502 may be wiredly connected and the control unit 2520 and the first unit (e.g., 2530 or 2540) may be wirelessly connected through the communication unit 2510. Further, each element, component, unit, and/or module in the wireless devices 2501 and 2502 may further include one or more elements. For example, the control unit 2520 may be constituted by one or more processor sets. For example, the control unit 2520 may be configured a set of a communication control processor, an application processor, an electronic control unit (ECU), a graphic processing processor, a memory control processor, etc. As another example, the memory unit 2530 may be configured as a random access memory (RAM), a dynamic RAM (DRAM), a read only memory (ROM), a flash memory, a volatile memory, a non-volatile memory, and/or combinations thereof.

A wireless device in the present disclosure may be a base station, a network node, a transmitter UE, a receiver UE, a radio device, a wireless communication device, a vehicle, a vehicle with a self-driving function, a drone (unmanned aerial vehicle (UAV)), an artificial intelligence (AI) module, a robot, an augmented reality (AR) device, a virtual reality (VR) device, an MTC device, an IoT device, a medical device, a FinTech device (or financial device), a security device, a climate/environment device, or a device related to the fourth industrial revolution field or 5G service, or the like. For example, the drone may be an airborne vehicle that flies by a radio control signal without a person being on the flight vehicle. For example, the MTC device and the IoT device may be a device that does not require a person's direct intervention or manipulation, and may include a smart meter, a vending machine, a thermometer, a smart bulb, a door lock, a variety of sensors, or the like. For example, the medical device may be a device used for the purpose of diagnosing, treating, reducing, handling or preventing a disease and a device used for the purpose of testing, substituting or modifying a structure or function, and may include a device for medical treatment, a device for operation, a device for (external) diagnosis, a hearing aid, or a device for a surgical procedure, or the like. For example, the security device may be a device installed to prevent a possible danger and to maintain safety, and may include a camera, CCTV, a black box, or the like. For example, the FinTech device may be a device capable of providing financial services, such as mobile payment, and may include a payment device, point of sales (POS), or the like. For example, the climate/environment device may refer to a device for monitoring and predicting the climate/environment.

Mobile terminals disclosed in the present disclosure may include cellular phones, smart phones, laptop computers, digital broadcast terminals, personal digital assistants (PDAs), portable multimedia players (PMPs), navigators, slate PCs, tablet PCs, ultra-books, wearable devices (e.g., smart watches, smart glasses, head mounted displays (HMDs)), and the like. Furthermore, the mobile terminals may be used for controlling at least one device in an Internet of Things (IoT) environment or a smart greenhouse.

By way of non-limiting example only, further description will be made with reference to particular types of mobile terminals. However, such teachings may be equally applied to other types of mobile terminals, such as those types noted above. In addition, it can be readily apparent to those skilled in the art that these teachings can also be applied to stationary terminals such as digital TV, desktop computers, digital signage, and the like. Hereinafter, embodiments related to a control method which can be implemented by the mobile terminal configured as above were described with reference to the accompanying drawings. It is apparent to those skilled in the art that various modifications can be made to within the range without departing from the spirit and essential features of the present invention.

The embodiments described above are implemented by combinations of components and features of the present disclosure in predetermined forms. Each component or feature should be considered selectively unless specified separately. Each component or feature can be carried out without being combined with another component or feature. Moreover, some components and/or features are combined with each other and can implement embodiments of the present disclosure. The order of operations described in embodiments of the present disclosure can be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the present disclosure can be implemented by various means, for example, hardware, firmware, software, or combinations thereof. When embodiments are implemented by hardware, one embodiment of the present disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present disclosure can be implemented by modules, procedures, functions, etc. performing functions or operations described above. Software code can be stored in a memory and can be driven by a processor. The memory is provided inside or outside the processor and can exchange data with the processor by various well-known means.

In the present disclosure, 'A and/or B' may mean at least one of A and/or B.

It is apparent to those skilled in the art that the present disclosure can be embodied in other specific forms without departing from essential features of the present disclosure. Accordingly, the aforementioned detailed description should not be construed as limiting in all aspects and should be considered as illustrative. The scope of the present disclosure should be determined by rational construing of the appended claims, and all modifications within an equivalent scope of the present disclosure are included in the scope of the present disclosure.

INDUSTRIAL APPLICABILITY

Although the present disclosure has been described focusing on examples applying to the 3GPP LTE/LTE-A/NR (5G) system, it can be applied to various wireless communication systems other than the 3GPP LTE/LTE-A/NR (5G) system.

What is claimed is:
1. A method for selecting, by a user equipment (UE), a public land mobile network (PLMN) in a wireless communication system, the method comprising:
in a manual network selection mode, displaying at least one first PLMN item respectively corresponding to at least one first PLMN on a display of the UE;

based on an input for a second PLMN item of the at least one first PLMN item being received, controlling a communication module of the UE to attempt to a registration on a second PLMN corresponding to the second PLMN item;

based on the registration on the second PLMN failing, displaying, on the display, at least one third PLMN item that provides attach for a restricted local operator service (RLOS) and respectively corresponds to at least one third PLMN included in an RLOS PLMN list configured to a universal subscriber identity module (USIM) of the UE; and based on an input for at least one fourth PLMN item of the at least one third PLMN item being received, controlling the communication module to initiate a registration for attach for at least one RLOS of at least one fourth PLMN corresponding to the at least one fourth PLMN item, wherein the at least one third PLMN item is displayed based on the at least one third PLMN being found by the UE, wherein the registration for attach for the at least one RLOS of the at least one fourth PLMN is initiated sequentially in order of at least one signal strengths measured between each of the at least one fourth PLMN and the UE.

2. The method of claim 1, wherein displaying the at least one third PLMN item comprises:
displaying, on the display, the at least one third PLMN item and at least one switch for selecting each of the at least one third PLMN item.

3. The method of claim 2, wherein initiating the registration for the attach for the at least one RLOS of the at least one fourth PLMN comprises:
based on an input for a switch for selecting the at least one fourth PLMN item among the at least one switch being received, initiating the registration for the attach for the at least one RLOS of the at least one fourth PLMN.

4. The method of claim 3, wherein the at least one switch includes:
all selection switches configured to select all the at least one third PLMN item; and
at least one individual selection switch configured to select each of the at least one third PLMN item.

5. The method of claim 1, further comprising:
displaying, on the display, a first icon indicating that a registration on the first PLMN has failed.

6. The method of claim 1, further comprising:
displaying, on one area of the display, a second icon indicating that the attach for the at least one RLOS of the at least one fourth PLMN has been accepted.

7. The method of claim 1, wherein displaying, on the display, the at least one third PLMN item comprises:
based on the registration on the second PLMN failing, displaying, on the display, a first tab for receiving whether there is attach for an RLOS; and
based on an input for the first tab being received, displaying the at least one third PLMN item on the display.

8. The method of claim 1, further comprising:
based on the attach for the at least one RLOS of the at least one fourth PLMN being accepted, displaying, on the display, a first text for receiving whether to initiate a call to a RLOS center of the at least one fourth PLMN; and
based on an input for the first text being received, controlling the communication module to initiate the call to the RLOS center of the at least one fourth PLMN.

9. The method of claim 1, further comprising:
based on the attach for the at least one RLOS of the at least one fourth PLMN being accepted, displaying a second text for inquiring whether to display information related to the at least one fourth PLMN; and
based on an input for the second text being received, displaying information related to the at least one fourth PLMN on the display.

10. The method of claim 1, further comprising:
based on the attach for the at least one RLOS of the at least one fourth PLMN being accepted, displaying, on the display, ongoing state information for the at least one RLOS of the at least one fourth PLMN.

11. A user equipment (UE) selecting a public land mobile network (PLMN) in a wireless communication system, the UE comprising:
a communication module;
a display;
at least one processor; and
at least one computer memory operationally connected to the at least one processor,
wherein the at least one computer memory is configured to store instructions that allow the at least one processor to:
in a manual network selection mode, display at least one first PLMN item respectively corresponding to at least one first PLMN on the display;
based on an input for a second PLMN item of the at least one first PLMN item being received, control the communication module and attempt to a registration on a second PLMN corresponding to the second PLMN item;
based on the registration on the second PLMN failing, display, on the display, at least one third PLMN item, that provides attach for a restricted local operator service (RLOS) and respectively corresponds to at least one third PLMN included in an RLOS PLMN list configured to a universal subscriber identity module (USIM) of the UE; and
based on an input for at least one fourth PLMN item of the at least one third PLMN item being received, control the communication module and initiate a registration for attach for at least one RLOS of at least one fourth PLMN corresponding to the at least one fourth PLMN item,
wherein the at least one third PLMN item is displayed based on the at least one third PLMN being found by the UE,
wherein the registration for attach for the at least one RLOS of the at least one fourth PLMN is initiated sequentially in order of at least one signal strengths measured between each of the at least one fourth PLMN and the UE.

12. The UE of claim 11, wherein displaying the at least one third PLMN item comprises:
displaying, on the display, the at least one third PLMN item and at least one switch for selecting each of the at least one third PLMN item.

13. The UE of claim 12, wherein initiating the registration for the attach for the at least one RLOS of the at least one fourth PLMN comprises:
based on an input for a switch for selecting the at least one fourth PLMN item among the at least one switch being received, initiating the registration for the attach for the at least one RLOS of the at least one fourth PLMN.

14. The UE of claim 13, wherein the at least one switch includes:
   all selection switches configured to select all the at least one third PLMN item; and
   at least one individual selection switch configured to select each of the at least one third PLMN item.

15. The UE of claim 11, further comprising:
   displaying, on the display, a first icon indicating that a registration on the first PLMN has failed.

16. The UE of claim 11, further comprising:
   displaying, on one area of the display, a second icon indicating that the attach for the at least one RLOS of the at least one fourth PLMN has been accepted.

17. The UE of claim 11, wherein displaying, on the display, the at least one third PLMN item comprises:
   based on the registration on the second PLMN failing, displaying, on the display, a first tab for receiving whether there is attach for an RLOS; and
   based on an input for the first tab being received, displaying the at least one third PLMN item on the display.

18. The UE of claim 11, further comprising:
   based on the attach for the at least one RLOS of the at least one fourth PLMN being accepted, displaying, on the display, a first text for receiving whether to initiate a call to a RLOS center of the at least one fourth PLMN; and
   based on an input for the first text being received, controlling the communication module to initiate the call to the RLOS center of the at least one fourth PLMN.

19. The UE of claim 11, further comprising:
   based on the attach for the at least one RLOS of the at least one fourth PLMN being accepted, displaying a second text for inquiring whether to display information related to the at least one fourth PLMN; and
   based on an input for the second text being received, displaying information related to the at least one fourth PLMN on the display.

20. The UE of claim 11, further comprising:
   based on the attach for the at least one RLOS of the at least one fourth PLMN being accepted, displaying, on the display, ongoing state information for the at least one RLOS of the at least one fourth PLMN.

\* \* \* \* \*